US012650658B2

(12) United States Patent
Munetsugu et al.

(10) Patent No.: US 12,650,658 B2
(45) Date of Patent: Jun. 9, 2026

(54) TONER CONTAINER TO FACILITATE TONER DISCHARGE

(71) Applicant: CANON KABUSHIKI KAISHA, Tokyo (JP)

(72) Inventors: Hiroyuki Munetsugu, Kanagawa (JP); Mitsuhiro Sato, Tokyo (JP); Daisuke Baba, Shizuoka (JP); Masatake Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/749,245

(22) Filed: Jun. 20, 2024

(65) Prior Publication Data

US 2024/0337967 A1 Oct. 10, 2024

Related U.S. Application Data

(63) Continuation of application No. PCT/JP2022/047285, filed on Dec. 22, 2022.

(30) Foreign Application Priority Data

Dec. 24, 2021 (JP) ................................ 2021-210639
Mar. 29, 2022 (JP) ................................ 2022-052873
Mar. 29, 2022 (JP) ................................ 2022-052874

(51) Int. Cl.
*G03G 15/08* (2006.01)
*B65D 33/16* (2006.01)
(Continued)

(52) U.S. Cl.
CPC ......... *G03G 15/0874* (2013.01); *B65D 33/16* (2013.01); *B65D 83/06* (2013.01);
(Continued)

(58) Field of Classification Search
CPC ........... G03G 15/0874; G03G 15/0886; G03G 15/0877; G03G 2215/0682;
(Continued)

(56) References Cited

U.S. PATENT DOCUMENTS 5,449,095 A * 9/1995 Kobayashi ......... G03G 15/0865 222/DIG. 1
11,774,881 B2 * 10/2023 Sato ......................... B65D 1/06 399/260
(Continued)

FOREIGN PATENT DOCUMENTS

EP 701181 A2 * 3/1996 ........... B65D 1/0223
JP 2003015395 A 1/2003
(Continued)

*Primary Examiner* — Robert B Beatty
(74) *Attorney, Agent, or Firm* — Canon U.S.A., Inc. IP Division

(57) ABSTRACT

A toner container includes: a bag having an opening; a discharge member having a receiving port aligned with the bag in a first direction and for receiving toner, and a discharge port for discharging the toner; and a shutting member shutting the discharge port. The receiving port is provided on an inner side with respect to the opening in a second direction orthogonal to the first direction. The receiving port is open in the first direction and has an area greater than or equal to 25 $mm^2$. The discharge member has a fixing portion to which the opening is fixed, and a surface between the fixing portion and the receiving port. A filling amount [g] of the toner with respect to a total volume [$cm^3$] up to which the toner in the toner container is allowed to be contained is less than or equal to 0.547 [$g/cm^3$].

13 Claims, 28 Drawing Sheets

(51) Int. Cl.
*B65D 83/00* (2006.01)
*B65D 83/06* (2006.01)

(52) U.S. Cl.
CPC ....... *B65D 83/771* (2025.01); *G03G 15/0886* (2013.01); *G03G 2215/0673* (2013.01); *G03G 2215/0678* (2013.01); *G03G 2215/0682* (2013.01); *G03G 2215/0692* (2013.01)

(58) Field of Classification Search
CPC ... G03G 2215/0692; G03G 2215/0673; G03G 2215/0678; B65D 33/16; B65D 35/44; B65D 47/2093; B65D 47/26; B65D 47/263; B65D 83/06; B65D 83/771; B65D 2539/00; B65D 2547/06; B65D 2583/005
USPC ...... 399/258, 260, 262; 222/92, 485, DIG. 1
See application file for complete search history.

(56) References Cited

U.S. PATENT DOCUMENTS

| | | | | |
|---|---|---|---|---|
| 2004/0146309 | A1* | 7/2004 | Shu | G03G 15/0877 399/53 |
| 2014/0348551 | A1* | 11/2014 | Yamabe | G03G 15/0872 399/263 |
| 2015/0055985 | A1* | 2/2015 | Suzuki | G03G 15/0879 399/258 |
| 2017/0060027 | A1* | 3/2017 | Yomoda | G03G 15/087 |
| 2022/0404738 | A1* | 12/2022 | Toba | G03G 15/0868 |
| 2023/0324829 | A1* | 10/2023 | Munetsugu | G03G 15/0891 |
| 2024/0126188 | A1* | 4/2024 | Sugimoto | G03G 15/0889 |
| 2025/0004398 | A1* | 1/2025 | Munetsugu | G03G 15/0874 |

FOREIGN PATENT DOCUMENTS

| | | | |
|---|---|---|---|
| JP | 2004161372 | A | 6/2004 |
| JP | 2004299785 | A | 10/2004 |
| JP | 2005148559 | A | 6/2005 |
| JP | 2006258928 | A | 9/2006 |
| JP | 2013137522 | A | 7/2013 |
| JP | 2014228635 | A | 12/2014 |
| JP | 2020085450 | A | 6/2020 |
| JP | 2020086450 | A | 6/2020 |
| JP | 2021124712 | A | 8/2021 |
| JP | 2021193442 | A | 12/2021 |
| WO | 2021250983 | A1 | 12/2021 |
| WO | 2022131311 | A1 | 6/2022 |

* cited by examiner

TONER CONTAINER TO FACILITATE TONER DISCHARGE

CROSS-REFERENCE TO RELATED APPLICATIONS

This application is a Continuation of International Patent Application No. PCT/JP2022/047285, filed Dec. 22, 2022, which claims the benefit of Japanese Patent Application No. 2021-210639, filed Dec. 24, 2021, Japanese Patent Application No. 2022-052873, filed Mar. 29, 2022, and Japanese Patent Application No. 2022-052874, filed Mar. 29, 2022, all of which are hereby incorporated by reference herein in their entirety.

TECHNICAL FIELD

The present invention relates to a toner container that contains toner.

BACKGROUND ART

An electrophotographic image forming apparatus forms an image by transferring a toner image, formed on the surface of a photoconductor drum by using toner as a developer, to a transfer material (recording medium) as a recording medium. Then, a toner supply method is known as a method to supply toner to the image forming apparatus (Japanese Patent Laid-Open No. 2020-086450). A toner supply method is a method in which, when toner in a toner containing portion of the image forming apparatus is exhausted, process members, such as a photoconductor drum and a development roller, are not replaced and toner is supplied to the toner containing portion of the image forming apparatus by using a toner container in which toner is contained.

CITATION LIST

Patent Literature

PTL 1 Japanese Patent Laid-Open No. 2020-086450

SUMMARY OF INVENTION

An aspect of the present invention provides a toner container. The toner container includes: a bag configured to contain the toner and having an opening; a discharge member provided to align with the bag in a first direction, the discharge member having a receiving port and a discharge port, the receiving port being configured to receive the toner in the bag via the opening, the discharge port being configured to discharge the toner, received from the receiving port, to outside the toner container; and a shutting member shutting the discharge port. The receiving port is provided on an inner side with respect to the opening in a second direction orthogonal to the first direction, the receiving port is open in the first direction, the receiving port has an area greater than or equal to 25 $mm^2$. The discharge member has a fixing portion to which the opening of the bag is fixed and a surface extending in a direction that intersects with the first direction between the fixing portion and the receiving port. A filling amount [g] of the toner to a total volume [$cm^3$] up to which the toner in the toner container is allowed to be contained is less than or equal to 0.547 [$g/cm^3$].

Further features of the present invention will become apparent from the following description of exemplary embodiments with reference to the attached drawings.

DESCRIPTION OF EMBODIMENTS

Hereinafter, exemplary embodiments of the present disclosure will be described with reference to the attached drawings.

First Embodiment

[Image Forming Apparatus]

Figure 1A:
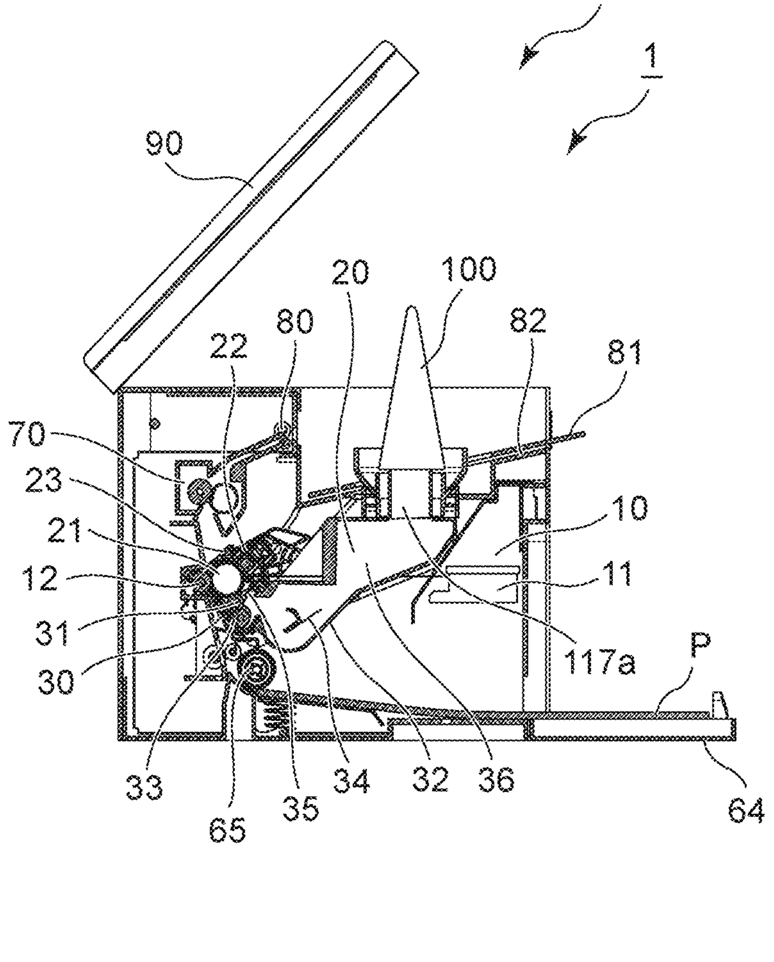
FIG. 1A is a schematic sectional view of an image forming apparatus according to a first embodiment.
Figure 1B:
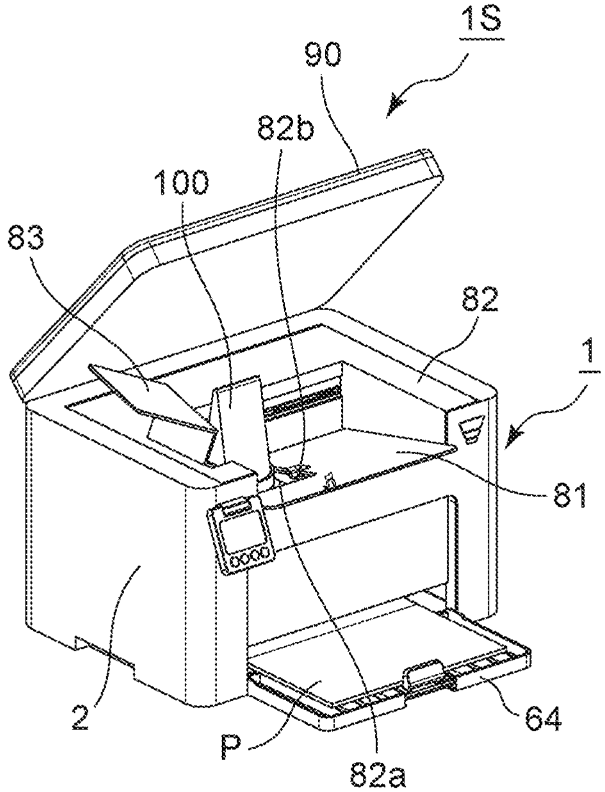
FIG. 1B is a perspective view of the image forming apparatus according to the first embodiment.
Figure 2A:
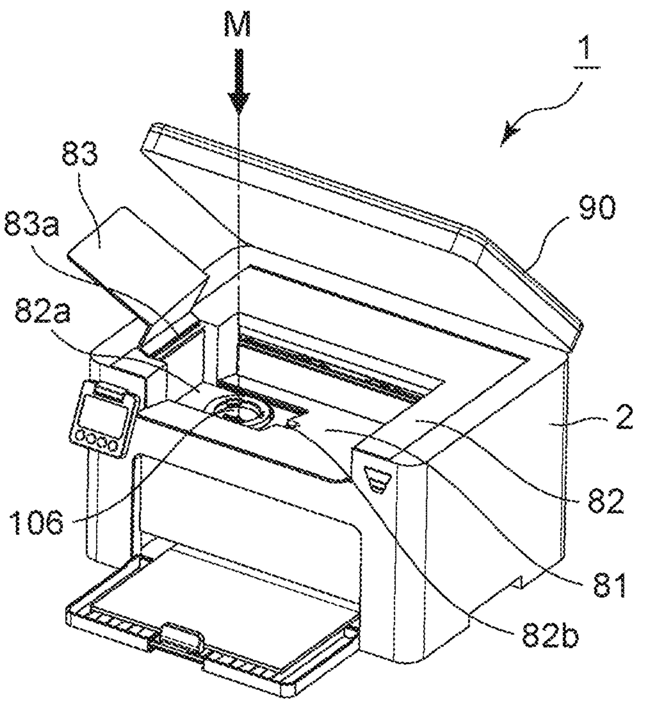
FIG. 2A is a schematic perspective view of the image forming apparatus according to the first embodiment.

An image forming apparatus 1 according to the present embodiment will be described with reference to FIGS. 1A, 1B to 3A, 3B, and 3C. FIG. 1A is a schematic sectional view of the image forming apparatus 1 in a state where a toner pack 100 is mounted. FIG. 1B is a perspective view of the image forming apparatus 1 in a state where the toner pack 100 is mounted. FIG. 2A is a perspective view of the image forming apparatus 1 in a state where the toner pack 100 is not mounted.

Figure 2B:
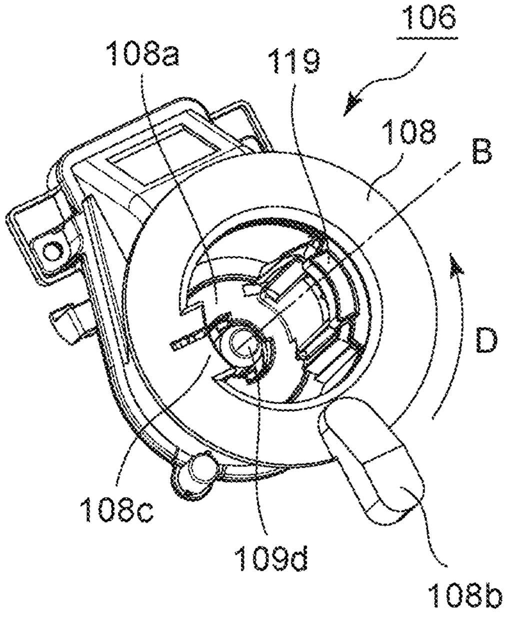
FIG. 2B is a perspective view of the mounting portion according to the first embodiment.
Figure 2C:
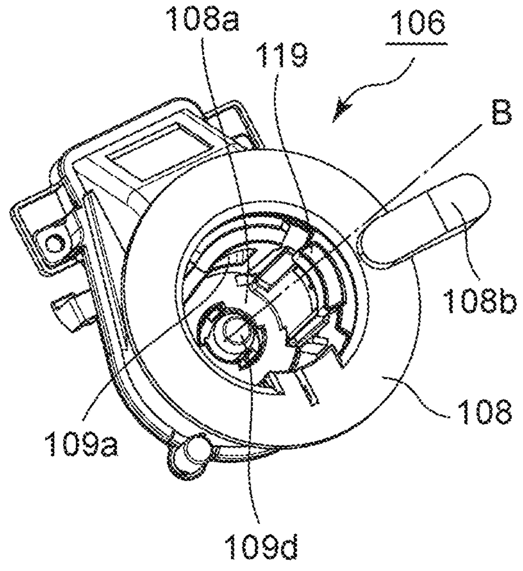
FIG. 2C is a perspective view of the mounting portion according to the first embodiment.
Figure 3A:
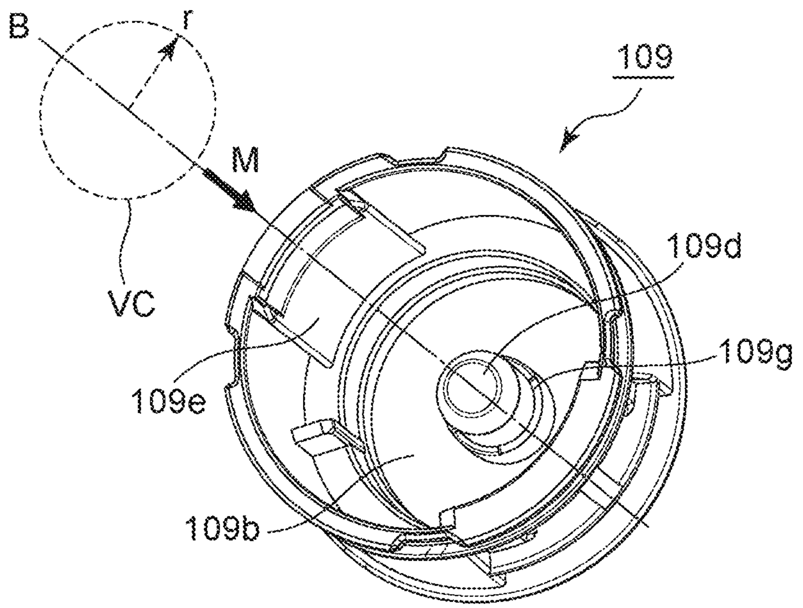
FIG. 3A is a perspective view of an apparatus-side shutter according to the first embodiment.
Figure 3B:
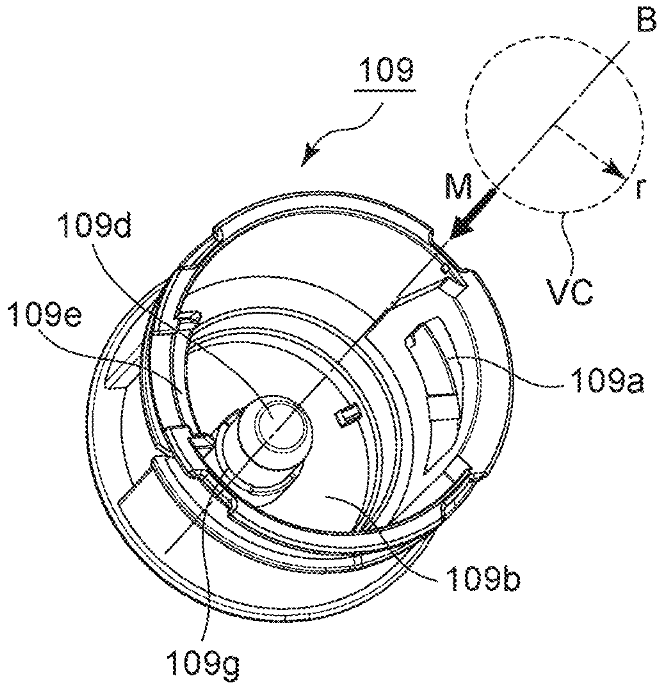
FIG. 3B is a perspective view of the apparatus-side shutter according to the first embodiment.
Figure 3C:
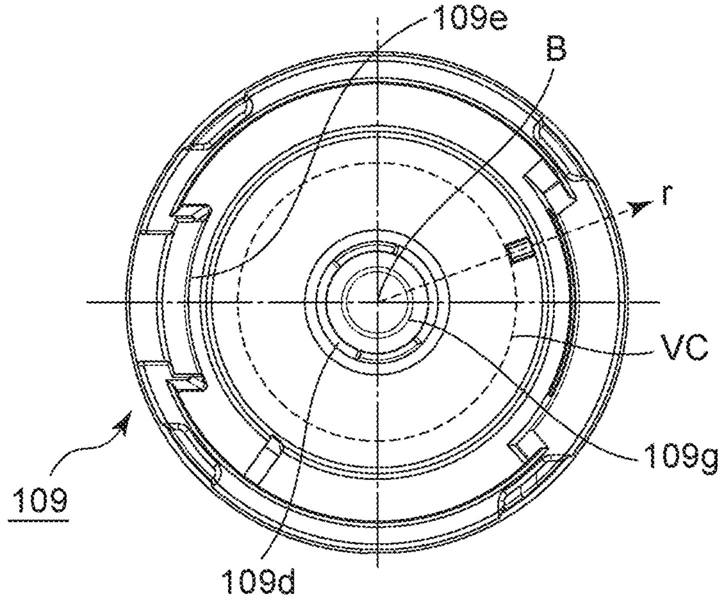
FIG. 3C is a top view of the apparatus-side shutter according to the first embodiment.

FIGS. 2B and 2C each are enlarged perspective views of a mounting portion 106 for a toner pack. FIGS. 3A and 3B are perspective views of an apparatus-side shutter 109 provided in the mounting portion 106. FIG. 3C is a top view of the apparatus-side shutter 109.

The image forming apparatus 1 is a black and white printer that forms an image on a recording medium P in accordance with image information input from an external device. Recording media P include a variety of different sheet materials, including paper, such as plain paper and thick paper, plastic films, such as sheets for an overhead projector, specially-shaped sheets, such as envelopes and index paper, and cloth.

As shown in FIG. 1A, the image forming apparatus 1 includes an image forming section 10 that forms a toner image on a recording medium P, a tray 64 that supports recording media P, and a pick-up roller 65 serving as a sheet feeding means that feeds a recording medium P to the image forming section 10. The image forming apparatus 1 includes a fusing section 70 that fuses a toner image formed by the image forming section 10, onto a recording medium P, and a discharge roller pair 80 that discharges a recording medium P subjected to a process of fusing a toner image to outside the image forming apparatus 1.

The image forming section 10 includes a scanner unit 11, a process unit 20, and a transfer roller 12 that transfers a toner image as a developer image formed on a photoconductor drum 21 of the process unit 20 onto a recording medium P.

The process unit 20 includes the photoconductor drum 21, a charging roller 22 disposed around the photoconductor drum 21, a pre-exposure apparatus 23, and a development apparatus 30. The process unit 20 of the present embodiment is attached to the image forming apparatus 1. The process unit 20 may be configured to be capable of connecting to and disconnecting from the image forming apparatus 1.

The photoconductor drum 21 is an image bearing member (electrophotographic photoconductor member) formed in a cylindrical shape. The photoconductor drum 21 of the present embodiment has a photoconductor layer made of a negatively-charged organic photoconductor member on a drum-shaped substrate molded by using aluminum. The photoconductor drum 21 is driven to rotate at a predetermined process speed in a predetermined direction (clockwise direction in the drawing) by a motor.

The charging roller 22 contacts with the photoconductor drum 21 at a predetermined pressure contact force and forms a charging portion. The surface of the photoconductor drum 21 is uniformly charged at a predetermined potential by being applied with a desired charging voltage from a charging high voltage power supply. In the present embodiment, the photoconductor drum 21 is charged with negative polarity by the charging roller 22.

The pre-exposure apparatus 23 eliminates surface charge on the photoconductor drum 21 before reaching the charging portion in order to generate stable discharge at the charging portion. The scanner unit 11 serving as an exposure means performs scanning exposure of the surface of the photoconductor drum 21 by applying laser light L corresponding to image information input from the external device, to the photoconductor drum 21 with a polygon mirror. Through the exposure, an electrostatic latent image based on the image information is formed on the surface of the photoconductor drum 21. The scanner unit 11 is not limited to a laser scanner apparatus. For example, an LED exposure apparatus including an LED array in which a plurality of LEDs is arranged along a longitudinal direction of the photoconductor drum 21 may be adopted as the scanner unit 11.

The development apparatus 30 includes a development roller 31 as a developer carrier that carries a developer, a developer container 32 that contains toner as a developer, and a supply roller 33 that supplies a developer to the development roller 31.

The development roller 31 and the supply roller 33 are rotatably supported by the developer container 32 that is a frame of the development apparatus 30. The development roller 31 is disposed at an opening of the developer container

32 so as to face the photoconductor drum 21. The supply roller 33 is in contact with the development roller 31 so as to be rotatable, and toner contained in the developer container 32 is applied to the surface of the development roller 31 by the supply roller 33. As long as it is possible to sufficiently supply toner to the development roller 31, the supply roller 33 is not necessarily needed.

The development apparatus 30 of the present embodiment uses a contact developing system as a developing system. In other words, a toner layer on the development roller 31 contacts with the photoconductor drum 21 in a developing portion (developing region) in which the photoconductor drum 21 and the development roller 31 face each other. A developing voltage is applied to the development roller 31 by a developing high-voltage power supply. Under the developing voltage, toner on the development roller 31 is transferred from the development roller 31 to the drum surface in accordance with a potential distribution on the surface of the photoconductor drum 21. Thus, an electrostatic latent image is developed into a toner image. In the present embodiment, a reversal developing system is adopted. In other words, after the photoconductor drum 21 is charged in a charging step, toner adheres to a surface region of the photoconductor drum 21 in which the amount of electric charge is attenuated as a result of exposure in an exposure step, with the result that a toner image is formed.

A toner containing chamber 36 (toner containing portion) that contains toner and an agitating member 34 as an agitating means disposed inside the toner containing chamber 36 are provided in the developer container 32. When the agitating member 34 is driven by a motor (not shown) to rotate, the agitating member 34 agitates toner in the developer container 32 and feeds toner toward the development roller 31 and the supply roller 33. The agitating member 34 plays a role in equalizing toner in the developer container 32 by agitating toner, not used for developing and stripped from the development roller 31, and toner, supplied from the outside with the toner pack 100 (described later).

A developing blade 35 is disposed at the opening of the developer container 32 in which the development roller 31 is disposed. The developing blade 35 restricts the amount of toner on the development roller 31. Toner supplied to the surface of the development roller 31 is formed into a thin layer with a uniform thickness by passing a portion facing the developing blade 35 with rotation of the development roller 31, and is negatively charged through triboelectric charging.

(Image Forming Operation)

The image forming operation of the image forming apparatus 1 will be described. When an image formation command is input to the image forming apparatus 1, an image forming process is started by the image forming section 10 in accordance with image information input from an external computer connected to the image forming apparatus 1.

The scanner unit 11 applies laser light toward the photoconductor drum 21 in accordance with the input image information. At this time, the photoconductor drum 21 is preliminarily charged by the charging roller 22, and an electrostatic latent image is formed on the photoconductor drum 21 when laser light is applied to the photoconductor drum 21. After that, the electrostatic latent image is developed by the development roller 31, and a toner image is formed on the photoconductor drum 21.

In parallel with the above-described image forming process, recording media P on the tray 64 are fed out one by one with the pick-up roller 65 and transferred toward a transfer nip as a transfer section made up of the transfer roller 12 and the photoconductor drum 21. A transfer voltage in an opposite polarity from the normal charge polarity of toner is applied from a transfer voltage power supply to the transfer roller 12. Thus, the toner image on the photoconductor drum 21 is transferred onto the recording medium P that passes through the transfer nip. When the recording medium P onto which the toner image has been transferred passes through the fusing section 70, the toner image is heated and pressurized. Thus, toner particles melt and then fix, with the result that the toner image is fused onto the recording medium P. The recording medium P having passed through the fusing section 70 is discharged to the outside of the printer main body 2 by the discharge roller pair 80 as a discharging means, and is stacked on a discharge tray 81 as a stacking section formed at the top part of the printer main body 2.

A top cover 82 that is a component of a casing upper surface of the image forming apparatus 1 is provided above the process unit 20. The discharge tray 81 as the stacking section is formed at the upper surface of the top cover 82. As shown in FIGS. 1B and 2A, at the top cover 82, an opening/closing member 83 is supported so as to be openable about a pivot shaft 83*a* extending in a front and rear direction. The front side (front) of the image forming apparatus 1 is the right-hand side in FIG. 1A, and a front discharge system in which recording media P are stacked on the discharge tray 81 extending forward of the discharge roller pair 80 is adopted in the present embodiment. The discharge tray 81 of the top cover 82 has an opening 82*a* that is open upward. A mounting portion 106 to which the toner pack 100 (described later) is mounted is provided at the opening 82*a*.

(Mounting Portion)

The mounting portion 106 will be described. As shown in FIGS. 2B and 2C, the mounting portion 106 includes an apparatus-side shutter 109, an operating lever 108, and a nozzle positioning part 119.

As shown in FIGS. 3A, 3B, and 3C, the apparatus-side shutter 109 is a top-open cylindrical member with a bottom 109*b* and is rotatable about a rotational axis B with respect to the nozzle positioning part 119. The apparatus-side shutter 109 has an apparatus-side shutter opening 109*a*, an engaged portion 109*e*, a positioning shaft 109*d*, and a positioning surface 109*g*. The apparatus-side shutter opening 109*a* is provided in a side portion that extends in the direction of the rotational axis B. The engaged portion 109*e* is a protrusion that protrudes inward in a radial direction r of an imaginary circle VC of which the center coincides with the rotational axis B. The positioning shaft 109*d* has the center that coincides with the rotational axis B and extends upward. The positioning surface 109*g* is a surface perpendicular to the rotational axis B and facing upward.

As shown in FIGS. 2B and 2C, the nozzle positioning part 119 of the mounting portion 106 is a protrusion that protrudes inward in the radial direction r of the imaginary circle VC.

The operating lever 108 is configured to be rotatable about the rotational axis B and is a member for a user to operate in a state where the toner pack 100 is mounted. The operating lever 108 has a center hole 108*a*, an operating portion 108*b*, and a lever engagement portion 108*c*. The center hole 108*a* is a hole for mounting a distal end part (a nozzle 102 and a pack-side shutter 103) of the toner pack 100. The operating portion 108*b* is a part where the user holds to rotate the operating lever 108. The operating portion 108*b* extends outward in the radial direction r. The lever engagement portion 108*c* is a protrusion that protrudes inward in the radial direction r from an inner peripheral surface that defines the center hole 108*a*.

When the operating lever 108 is rotated in a rotation direction D shown in FIG. 2B in a state where the toner pack 100 is mounted at the mounting portion 106, the apparatus-side shutter 109 is moved (rotated) from a closed position of FIG. 2B to an open position of FIG. 2C. In a state where the toner pack 100 is not mounted at the mounting portion 106, the operating lever 108 and the apparatus-side shutter 109 are configured not to interlock with each other. This will be described later.

The opening/closing member 83 shown in FIGS. 1B and 2A is configured to be movable between the closed position to cover the mounting portion 106 so that the toner pack 100 cannot be mounted at the mounting portion 106 and the open position to expose the mounting portion 106 so that the toner pack 100 can be mounted at the mounting portion 106.

FIGS. 1B and 2A show a state where the opening/closing member 83 is placed in the open position. The above-described image forming operation is executable in a state where the opening/closing member 83 is placed in the closed position.

The opening/closing member 83 functions as part of the discharge tray 81 in the closed position. The opening/closing member 83 and the opening 82*a* are formed at the left side of the discharge tray 81 when viewed from the front side of the image forming apparatus 1. The opening/closing member 83 is opened to the left by hooking the finger from a groove 82*b* provided at the top cover 82. The opening/closing member 83 is formed in a substantially L-shape along the shape of the top cover 82. In other words, when the opening/closing member 83 is viewed in a direction in which the discharge roller pair 80 discharges a recording medium P, the opening/closing member 83 includes a part extending in a substantially horizontal direction to form a stacking surface substantially flush with the discharge tray 81 and a part extending upward in a substantially vertical direction from an end of the stacking surface in the horizontal direction to form a side wall of the discharge tray 81. The opening 82*a* of the discharge tray 81 is open such that the mounting portion 106 is exposed when viewed from above. When the opening/closing member 83 is opened, the user is able to access the mounting portion 106. In the present embodiment, a reading apparatus 90 as an openable (pivotable) upper unit is provided above the top cover 82. The reading apparatus 90 includes an original base plate on which an original is placed and an image sensor that reads image information from an original placed on the original base plate. Alternatively, a configuration in which no upper unit is provided and the discharge tray 81 is constantly exposed when viewed from above in the vertical direction may be applied.

In the present embodiment, as shown in FIG. 1A, a method (direct supply method) in which the user supplies toner from the toner pack 100 filled with supply toner to the toner containing chamber 36 of the development apparatus 30 inside the image forming apparatus 1 is adopted. In other words, the image forming apparatus 1 and the toner pack 100 make up a direct supply image forming system 1S.

At least part of the toner pack 100 is exposed to the outside of the image forming apparatus 1 in a state where the toner pack 100 is mounted at the mounting portion 106 of the image forming apparatus 1. When a toner residual amount of the process unit 20 is small, work for removing the process unit 20 to the outside of the image forming apparatus 1 to be replaced with a new process unit is not required, so usability is improved. Toner can be supplied to the development apparatus 30 at low cost as compared to when the process unit 20 is replaced. In comparison with a case where only the development apparatus 30 of the process unit 20 is replaced, the direct supply method does not require replacement of various rollers including the development roller 31 and the like, gears, and the like, so cost can be reduced.

[Configuration of Toner Pack]

Figure 4A:
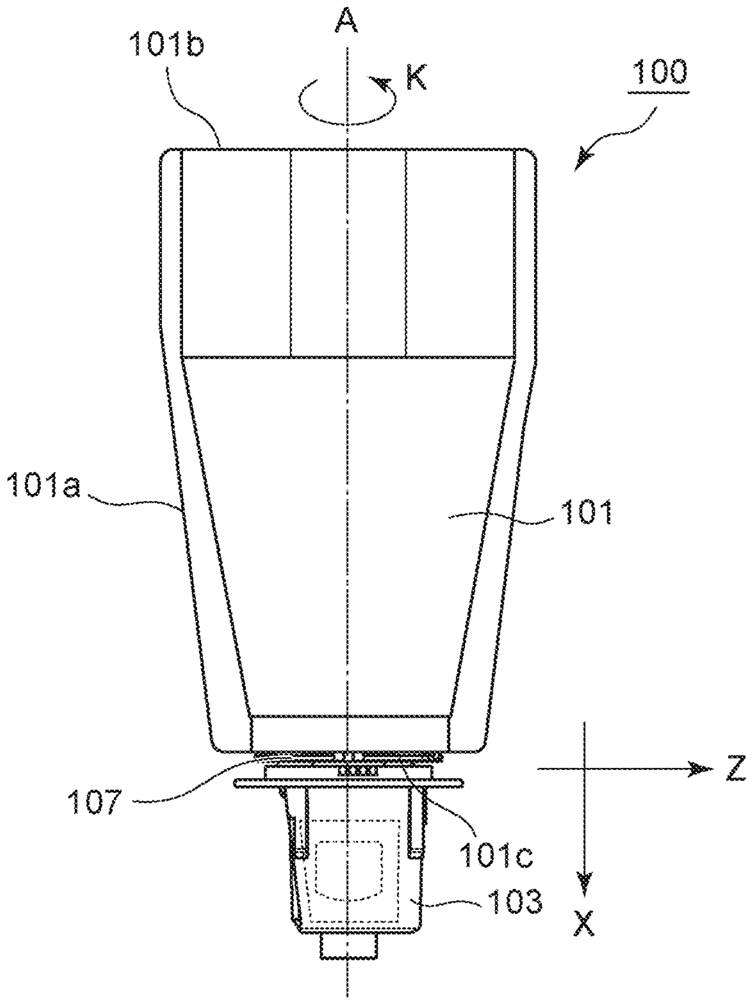
FIG. 4A is a front view of a toner pack according to the first embodiment.
Figure 4B:
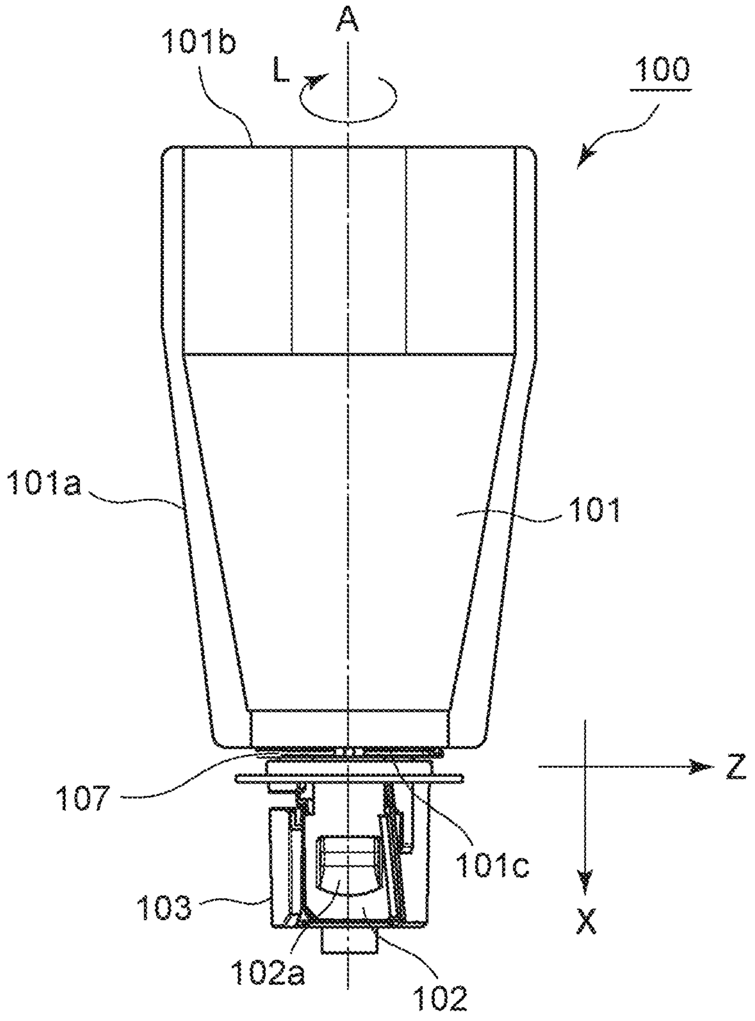
FIG. 4B is a front view of the toner pack according to the first embodiment.
Figure 5:
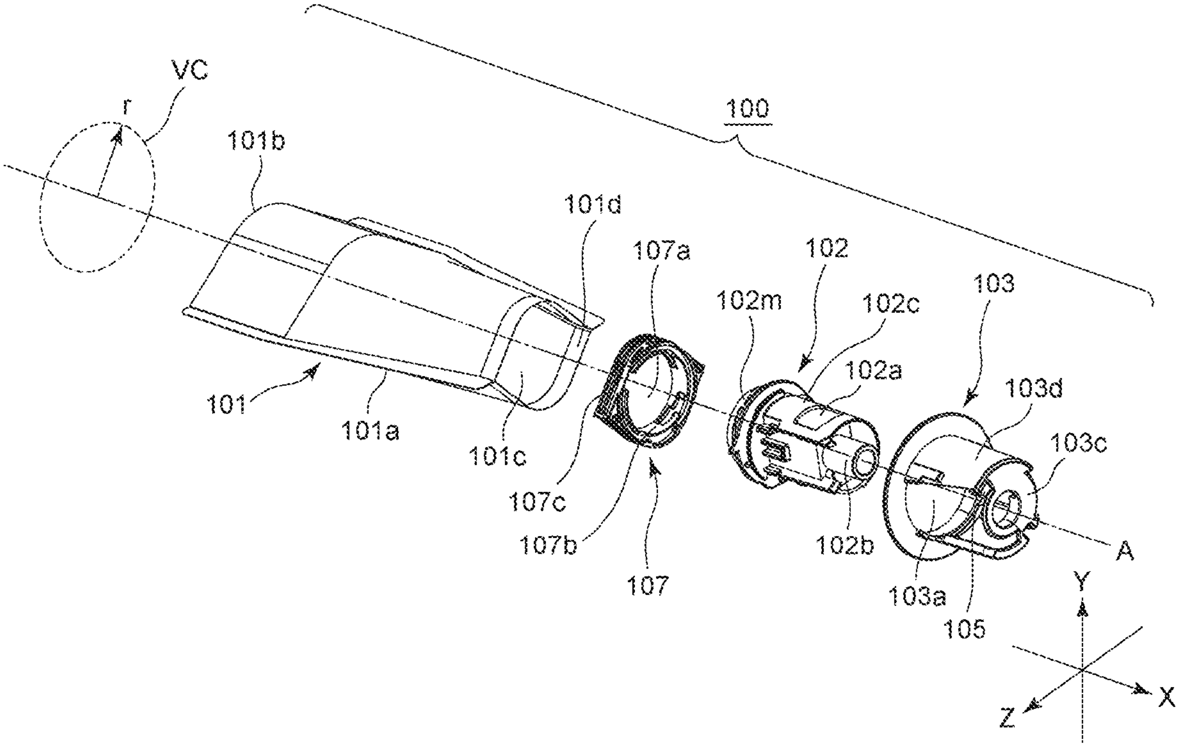
FIG. 5 is an exploded perspective view of the toner pack according to the first embodiment.
Figure 6A:
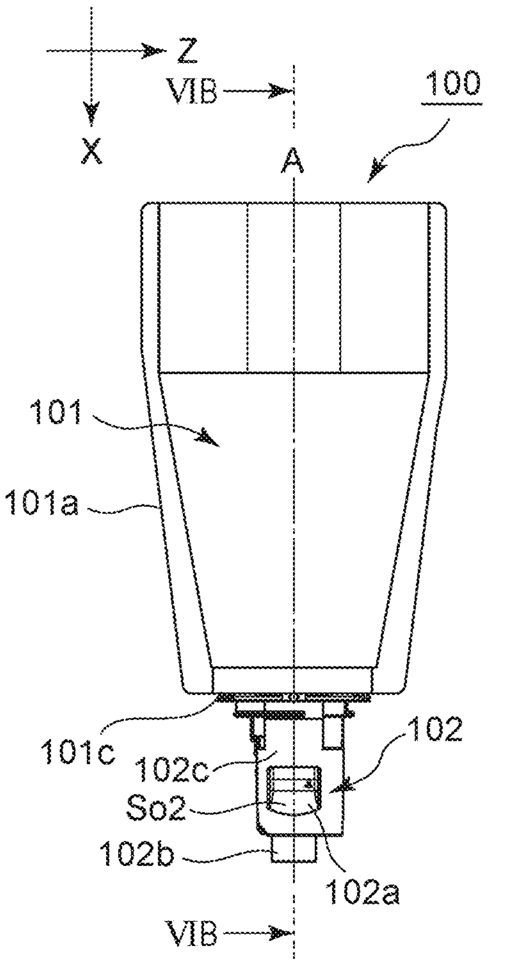
FIG. 6A is a front view of the toner pack according to the first embodiment.
Figure 6B:
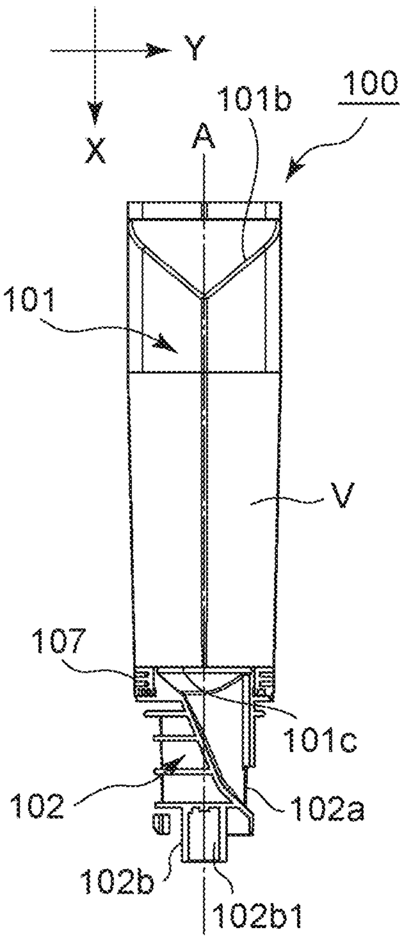
FIG. 6B is a sectional view of the toner pack according to the first embodiment.
Figure 6C:
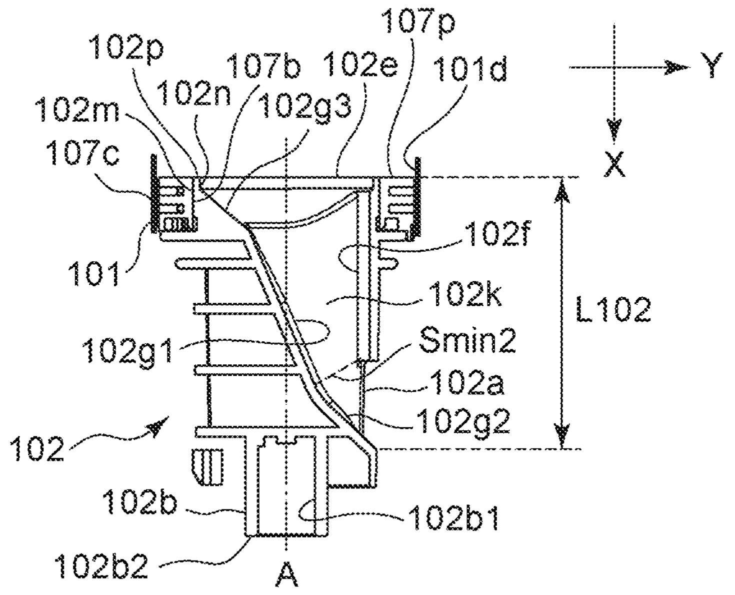
FIG. 6C is a sectional view of the nozzle according to the first embodiment.
Figure 6D:
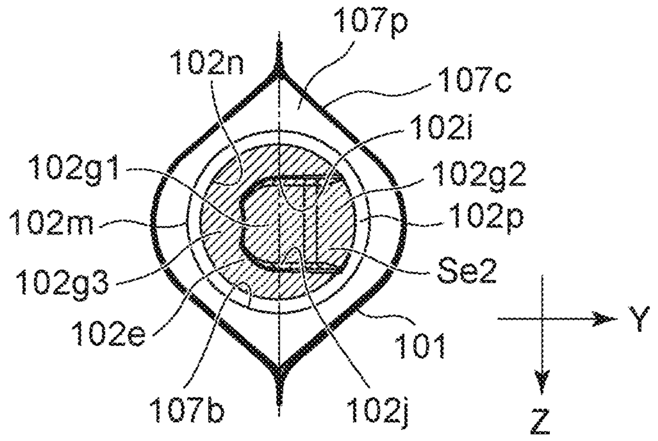
FIG. 6D is a top view of the nozzle according to the first embodiment.
Figure 7A:
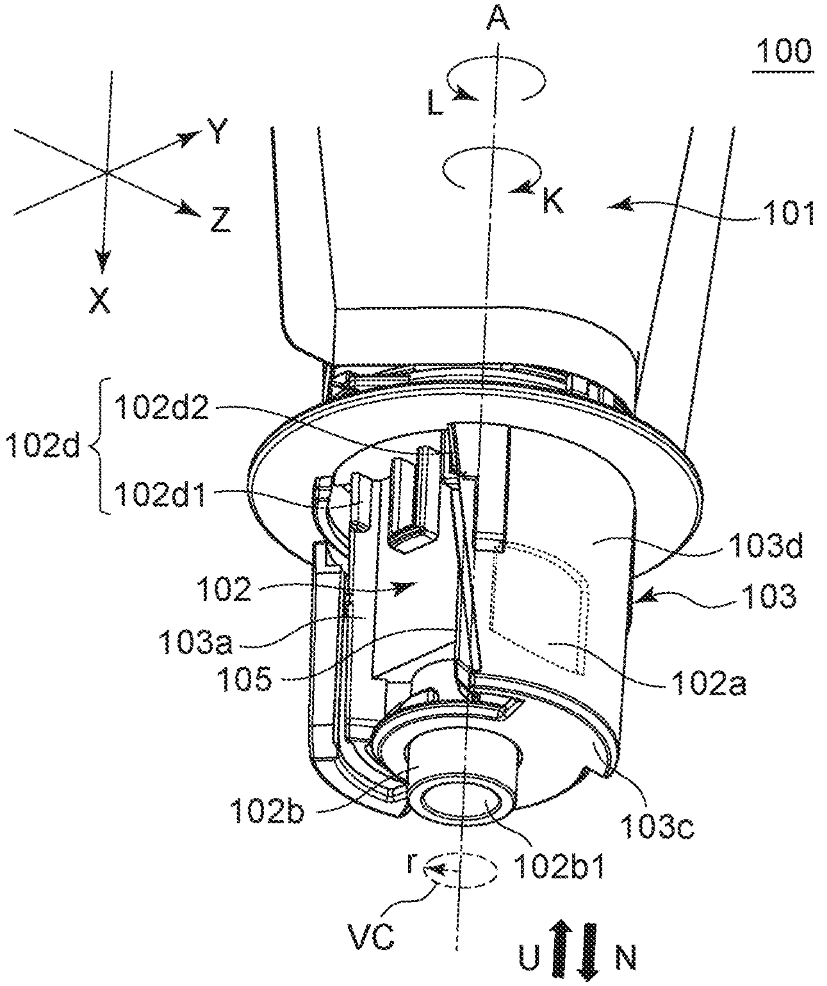
FIG. 7A is a perspective view of the nozzle according to the first embodiment.
Figure 7B:
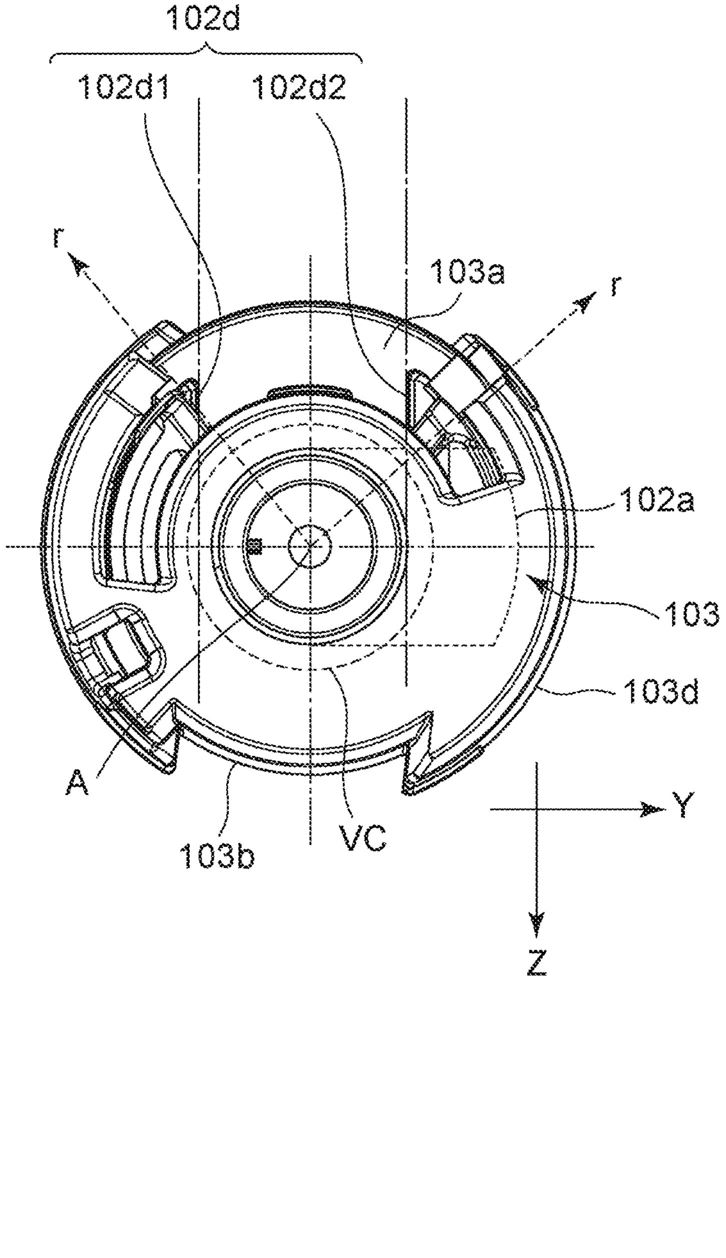
FIG. 7B is a bottom view of the nozzle according to the first embodiment.

Next, the configuration of the toner pack 100 as a toner container (toner cartridge) according to the present embodiment will be described with reference to FIGS. 4A, 4B to 7A, 7B. FIG. 4A is a front view of the toner pack 100 when the pack-side shutter 103 is placed in a closed position. FIG. 4B is a front view of the toner pack 100 when the pack-side shutter 103 is placed in an open position. FIG. 5 is an external perspective view of the toner pack 100. FIG. 6A is a front view of the toner pack 100 in a state where the pack-side shutter 103 is not shown. FIG. 6B is a sectional view taken along the line VIB-VIB in FIG. 6A. FIG. 6C is a partially enlarged sectional view of an area around the nozzle 102 of FIG. 6B. FIG. 6D is a sectional view when an area around a receiving port of the nozzle 102 of FIG. 6C is viewed from a containing portion 101 side. FIG. 7A is an enlarged perspective view of an area around the nozzle 102 of the toner pack 100. FIG. 7B is a bottom view of the nozzle 102.

As shown in FIG. 5, the toner pack 100 includes the containing portion 101 (a bag or a pouch) that contains toner, the nozzle 102 (a nozzle portion or a discharge portion), a coupling member 107 (coupling portion) that couples the containing portion 101 to the nozzle 102, and the pack-side shutter 103 (a shutting member or a rotary member).

As shown in FIG. 5, the containing portion 101 is provided on a first end side in a first direction X, and the nozzle 102, the coupling member 107, and the pack-side shutter 103 are provided on a second end side opposite to the first end in the first direction X. The containing portion 101 and the nozzle 102 are provided to align with each other in the first direction X. The first direction X is also a direction in which a central axis A as the rotational axis of the pack-side shutter 103 that rotates with respect to the nozzle 102 extends (hereinafter, referred to as the direction of the central axis A). Hereinafter, a direction orthogonal to the first direction X is defined as a second direction Y, and a direction orthogonal to both the first direction X and the second direction Y is defined as a third direction Z.

The containing portion 101 is a bag that forms a space for containing toner (containing space). The containing portion 101 has a side part 101*a* extending in the first direction X, an opening 101*c* provided at the second end side in the first direction X, and a bottom part 101*b* (closed part) provided at the first end side in the first direction X. The opening 101*c* is a part surrounded by an inner peripheral surface 101*d* at the second end side of the containing portion 101.

The containing portion 101 is made of a flexible material that the user can easily deform with his or her hand (fingers). The containing portion 101 of the present embodiment is a bag formed by pouching (working for hermetical seal by thermocompression bonding) a sheet with a thickness of about 115 μm. The material of the sheet of the present embodiment is a polypropylene sheet; however, the material is not limited thereto.

As shown in FIGS. 5 and 6A to 6D, in the containing portion 101, a side close to the bottom part 101*b* has an oblate shape such that the width in the second direction Y is narrower than the width in the third direction Z. The side part 101*a* of the containing portion 101 has a part (a tapered part or an inclined part) such that the width in the third direction Z narrows from the bottom part 101b toward the opening 101c in the first direction X. In other words, the side part 101a of the containing portion 101 has a part such that the ratio of the width in the third direction Z to the width in the second direction Y reduces as approaching the opening 101c. The containing portion 101 may be a container made of paper or vinyl.

As shown in FIGS. 5 and 6C, the coupling member 107 is a member for coupling the nozzle 102 to the containing portion 101 and is an annular member having an engagement hole 107a of which the center coincides with the central axis A. The coupling member 107 has an engagement surface 107b for engaging with the nozzle 102, a fixing surface 107c (a welding surface or a bonding surface) that is fixed to the inner peripheral surface 101d of the containing portion 101, and an upper surface 107p (top surface). The inner peripheral surface 101d of the containing portion 101 and the fixing surface 107c of the coupling member 107 are fixed to each other by welding or bonding. The engagement surface 107b defines the engagement hole 107a and is a surface facing inward in the radial direction r of the imaginary circle VC of which the center coincides with the central axis A and extending in the first direction X. The fixing surface 107c is a surface facing outward in the radial direction r and extending in the first direction X. The upper surface 107p connects the fixing surface 107c with the engagement surface 107b and is a surface facing the bottom part 101b side of the containing portion 101 in the first direction X. The upper surface 107p is connected to the fixing surface 107c and the engagement surface 107b and is a surface extending in a direction (the second direction Y and the third direction Z) that intersects with (orthogonal to) the central axis A (first direction X) as shown in FIGS. 6C and 6D.

In a case where the toner pack 100 is orientated in a predetermined orientation in which the first direction is oriented in a gravitational direction and the nozzle 102 is located below the containing portion 101, the upper surface 107p faces upward and closes part of the opening 101c of the containing portion 101.

As shown in FIG. 6B, the nozzle 102 functions as a communication member (communication portion) that communicates the inside of the toner pack 100 with the outside of the toner pack 100. As shown in FIGS. 6B and 6C, the nozzle 102 has a receiving port 102e that receives toner in the containing portion 101, a discharge port 102a that discharges toner to the outside of the toner pack 100, and a flow channel 102k (passage) configured to allow toner to pass from the receiving port 102e to the discharge port 102a. The receiving port 102e is open in the first direction X. The discharge port 102a is provided at a side surface 102c extending in the first direction X and is open in the second direction Y. In other words, the discharge port 102a is open so as to face outward in the radial direction r of the imaginary circle VC.

The nozzle 102 further has an engaged surface 102m that engages with the engagement surface 107b of the coupling member 107, and an upper surface 102p (top surface). The engaged surface 102m of the nozzle 102 and the engagement surface 107b of the coupling member 107 are fixed by press fitting, loose fitting, welding, bonding, or the like. In the present embodiment, the nozzle 102 and the coupling member 107 are separate members. Alternatively, the nozzle 102 and the coupling member 107 may be an integrated member. The nozzle 102 and the coupling member 107 make up a discharge member together. The upper surface 102p is a surface between the engaged surface 102m and the receiving port 102e. In a case where the toner pack 100 is oriented in the above-described predetermined orientation, the upper surface 102p faces upward and closes part of the opening 101c of the containing portion 101. The upper surface 102p of the nozzle 102 and the upper surface 107p of the coupling member 107 are at the same location (level) or substantially the same location (level).

As shown in FIGS. 6A, 6B, and 6C, the nozzle 102 has a protrusion 102b that protrudes from an end face on an opposite side to the receiving port 102e in the first direction X. The protrusion 102b has an inner peripheral surface 102b1 and an end face 102b2. The center of the inner peripheral surface 102b1 coincides with the central axis A. The inner peripheral surface 102b1 of the nozzle 102 engages with the positioning shaft 109d of the apparatus-side shutter 109 of FIGS. 3A, 3B, and 3C when the toner pack 100 is mounted at the mounting portion 106 of the image forming apparatus 1. Thus, the toner pack 100 is positioned in the radial direction r of the imaginary circle VC of FIGS. 3A, 3B, and 3C with respect to the mounting portion 106 (apparatus-side shutter 109). The end face 102b2 of the nozzle 102 contacts with the positioning surface 109g of the apparatus-side shutter 109 of FIGS. 3A, 3B, and 3C when the toner pack 100 is mounted at the mounting portion 106 of the image forming apparatus 1, and the toner pack 100 is positioned in a mounting direction M of the mounting portion 106 (apparatus-side shutter 109).

Toner contained in the containing portion 101 is configured to be discharged to the outside of the toner pack 100 via the receiving port 102e, the flow channel 102k, and the discharge port 102a.

Next, the configuration of the flow channel 102k of the present embodiment will be described. In a case where the toner pack 100 is oriented in the predetermined orientation in which the central axis A (first direction X) is the gravitational direction and the nozzle 102 is located below the containing portion 101 as shown in FIG. 6B, the flow channel 102k is configured as follows. The discharge port 102a is located below the receiving port 102e. As shown in FIG. 6C, the flow channel 102k has a first inclined surface 102g1 that is inclined in a direction to approach the discharge port 102a toward a lower side in the direction of the central axis A and that faces upward, and an inner side surface 102f facing the first inclined surface 102g1. The inner side surface 102f extends in the direction of the central axis A.

The flow channel 102k further has a second inclined surface 102g2 that is continuous with a lower end of the first inclined surface 102g1 and a lower end of the discharge port 102a, that is inclined in a direction to approach the discharge port 102a toward the lower side in the direction of the central axis A, and that faces upward. An inclination angle of the second inclined surface 102g2 with respect to the central axis A is greater than that of the first inclined surface 102g1. The second inclined surface 102g2 is shorter in length than the first inclined surface 102g1. As shown in FIGS. 6A and 6C, the boundary between the first inclined surface 102g1 and the second inclined surface 102g2 is disposed at a viewable location when the discharge port 102a is viewed in the second direction Y. The flow channel 102k further has a third inclined surface 102g3 that is continuous with an end forming the receiving port 102e and an upper end of the first inclined surface 102g1, that is inclined in a direction to approach the discharge port 102a toward the lower side in the direction of the central axis A, and that faces upward. An inclination angle of the third inclined surface 102*g*3 with respect to the central axis A is greater than that of the first inclined surface 102*g*1.

The flow channel 102*k* is made up of the inclined surface 102*g*, the inner side surface 102*f*, a side surface 102*i*, and a side surface 102*j* (FIG. 6D). The inclined surface 102*g* is made up of the first inclined surface 102*g*1, the second inclined surface 102*g*2, and the third inclined surface 102*g*3. Hereinafter, the sectional area of the flow channel 102*k* is the area of a plane surrounded by the inclined surface 102*g*, the inner side surface 102*f*, and the side surfaces 1021, 102*j* in an imaginary plane passing through one point in the flow channel 102*k*.

The pack-side shutter 103 is provided outside the side surface 102*c* of the nozzle 102 in the radial direction r of the imaginary circle VC. The pack-side shutter 103 is fitted so as to be rotatable with respect to the nozzle 102 about the central axis A extending in a direction along the first direction X. The pack-side shutter 103 has a side surface 103*d* extending in a circular arc shape, of which the center coincides with the central axis A, outside the side surface 102*c* of the nozzle 102 when viewed in the first direction X. The side surface 103*d* has an opening 103*a* as shown in FIGS. 7A and 7B. As shown in FIGS. 7A and 7B, the pack-side shutter 103 is provided outside the side surface 102*c* of the nozzle 102 in the radial direction r of the imaginary circle VC of which the center coincides with the central axis A. The side surface 102*c* of the nozzle 102 is a curved surface convex outward in the radial direction r of the imaginary circle VC of which the center coincides with the central axis A. A surface inside the pack-side shutter 103 (a surface facing the side surface 102*c* of the nozzle 102) is a curved surface (a circular arc surface when viewed in the first direction X) along the side surface 102*c* of the nozzle 102. A substantially rectangular seal 105 is attached to the surface inside the pack-side shutter 103. The seal 105 has an area that is at least greater than the opening area of the discharge port 102*a* of the nozzle 102.

The pack-side shutter 103 is configured to rotate about the central axis A between a closed position (a closed position or a shut position) to close the discharge port 102*a* of the nozzle 102, shown in FIG. 4A, and an open position to open the discharge port 102*a* of the nozzle 102, shown in FIG. 4B. When the pack-side shutter 103 is placed in the open position, the discharge port 102*a* of the nozzle 102 is exposed through the opening 103*a*. When the pack-side shutter 103 placed in the closed position shown in FIG. 4A is rotated in an arrow K direction (first rotation direction) about the central axis A, the pack-side shutter 103 reaches the open position shown in FIG. 4B. Conversely, when the pack-side shutter 103 is rotated in an arrow L direction (second rotation direction) from the open position, the pack-side shutter 103 reaches the closed position. In the rotational operation of the pack-side shutter 103, the pack-side shutter 103 slides on the side surface 102*c* of the nozzle 102 via the seal 105. The seal 105 prevents toner scattering (leakage) from the discharge port 102*a* in a state where the pack-side shutter 103 is placed in the closed position. For this reason, an elastic member disposed with a certain inroad amount (squeeze amount) on the side surface 102*c* of the nozzle 102 is preferably used as the seal 105. The seal 105 has a certain seal width (a width greater than or equal to an opening width of the discharge port 102*a* in the circumferential direction of the imaginary circle of which the center coincides with the central axis A) for sealing toner. The seal 105 has an even circular arc surface for an imaginary cylindrical surface of which the center coincides with the axis A1 (a surface along the side surface 102*c* of the nozzle 102) over the seal width. The side surface 102*c* outside the nozzle 102, except the discharge port 102*a*, has an even circular arc surface for the imaginary cylindrical surface of which the center coincides with the central axis A. With this configuration, even while the pack-side shutter 103 is being pivoted between the open position and the closed position or even when the pack-side shutter 103 is placed in the closed position, the seal 105 and the side surface 102*c* of the nozzle 102 can stably contact with each other. Therefore, leakage of toner from the discharge port 102*a* can be reduced. The configuration is not limited thereto. Even when the side surface 102*c* of the nozzle 102 has an uneven surface or an eccentric surface for the imaginary cylindrical surface of which the center coincides with the central axis A, leakage of toner can be reduced depending on the configuration of the seal 105 and the pack-side shutter 103. For example, even when the inroad amount of the seal 105 against the side surface 102*c* of the nozzle 102 is variable, an inroad amount (squeeze amount) just needs to be set in a range in which leakage of toner can be reduced.

Next, the detailed configuration of the nozzle 102 and the pack-side shutter 103 will be described with reference to FIGS. 7A and 7B. An arrow N direction is a direction heading from the containing portion 101 toward the nozzle 102, and a U direction is the opposite direction. The arrow N direction and the arrow U direction are directions parallel to the central axis A. When the toner pack 100 is oriented in the predetermined orientation, the arrow N direction is the gravitational direction in the first direction X and is the mounting direction M. The arrow U direction is a direction opposite to the gravitational direction in the first direction X and is a disconnecting direction of the toner pack 100, opposite to the mounting direction M.

The nozzle 102 has a nozzle recess 102*d* as a positioned part configured to engage with the nozzle positioning part 119 shown in FIGS. 2B and 2C to be positioned when the toner pack 100 is mounted at the mounting portion 106 of the image forming apparatus 1. As shown in FIG. 7A, when the pack-side shutter 103 is placed in the closed position, the nozzle recess 102*d* is exposed via the opening 103*a* of the pack-side shutter 103. When the nozzle recess 102*d* engages with the nozzle positioning part 119 of the mounting portion 106, rotation of the nozzle 102 about the central axis A is configured to be restricted. As shown in FIG. 7B, the nozzle recess 102*d* is made up of a first surface 102*d*1 and a second surface 102*d*2 extending in the third direction Z orthogonal to the second direction Y when viewed in the direction of the central axis A. The nozzle recess 102*d* and the discharge port 102*a* are at locations shifted by 90 degrees in the circumferential direction of the imaginary circle VC.

Figure 8A:
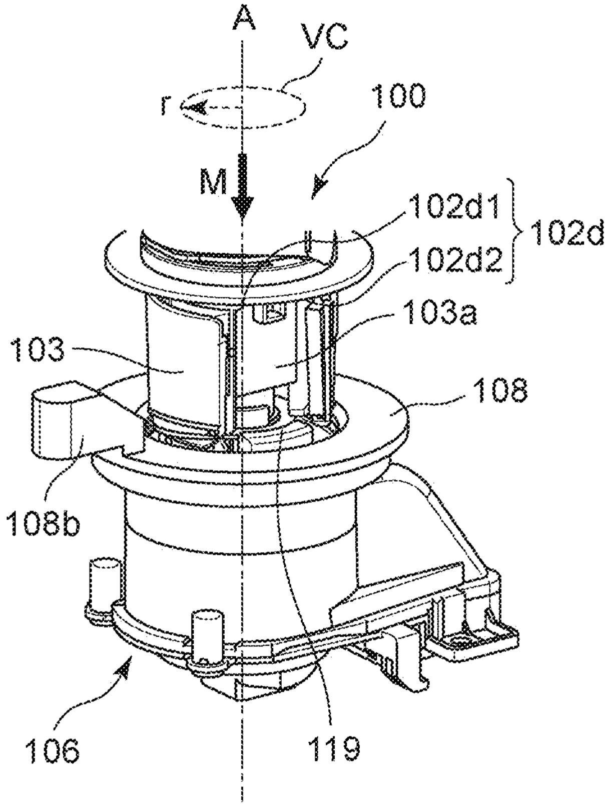
FIG. 8A is a perspective view that shows a state of mounting the toner pack at the mounting portion according to the first embodiment.
Figure 8B:
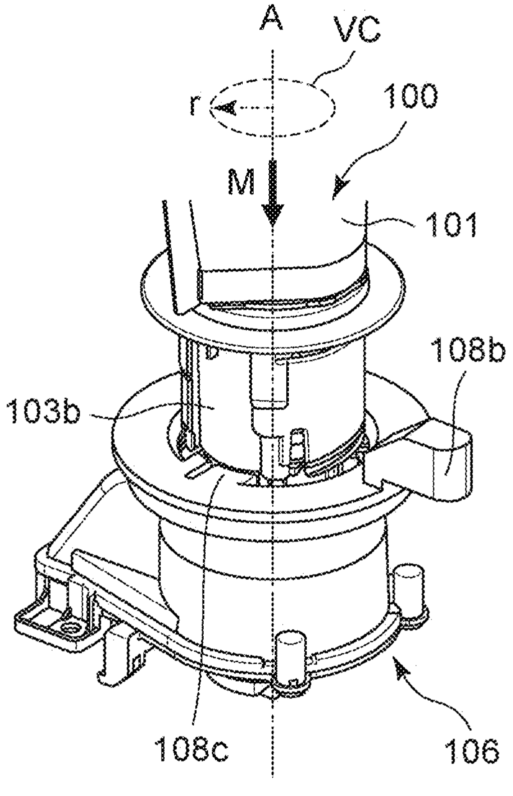
FIG. 8B is a perspective view that shows a state of mounting the toner pack at the mounting portion according to the first embodiment.

The pack-side shutter 103 has a shutter recess 103*b* as a shutter engagement portion of which the side surface 103*d* is partially recessed inward in the radial direction r of the imaginary circle VC when viewed in the direction of the central axis A. As shown in FIG. 8B, the shutter recess 103*b* extends in the direction of the central axis A. The shutter recess 103*b* is configured to engage with the lever engagement portion 108*c* (FIGS. 2B and 2C) of the operating lever 108 of the mounting portion 106 and the engaged portion 109*e* (FIGS. 3A, 3B, and 3C) of the apparatus-side shutter 109 when the toner pack 100 is mounted at the mounting portion 106.

The lever engagement portion 108*c* and the engaged portion 109*e* are provided to align with each other in the direction of the central axis A.

As shown in FIGS. 2B and 2C, when the operating lever 108 is rotated in the rotation direction D, the shutter recess

103*b* is pressed by the lever engagement portion 108*c* of the operating lever 108, and the pack-side shutter 103 is also rotated in the D direction (K direction) from the closed position to the open position. At the same time, the engaged portion 109*e* is pressed by the shutter recess 103*b* of the pack-side shutter 103, and the apparatus-side shutter 109 also rotates in the D direction to be moved from a non-communication position to a communication position. In other words, the rotational force of the operating lever 108 is configured to be transmitted to the apparatus-side shutter 109 via the pack-side shutter 103.

As described above, when the operating lever 108 is rotated in a state where the toner pack 100 is mounted at the mounting portion 106, the operating lever 108, the pack-side shutter 103, and the apparatus-side shutter 109 integrally rotate.

[Toner Supply Operation]

Figure 8C:
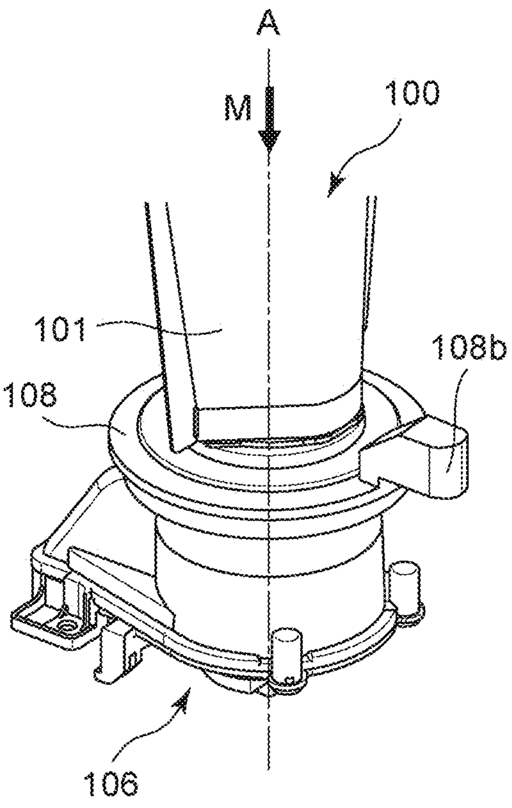
FIG. 8C is a perspective view that shows a state of mounting the toner pack at the mounting portion according to the first embodiment.
Figure 9A:
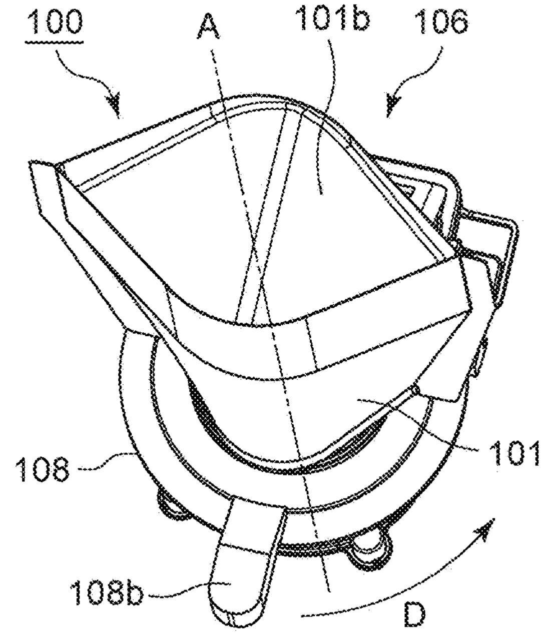
FIG. 9A is a perspective view that shows a state where a lever is turned in a state where the toner pack is mounted at the mounting portion according to the first embodiment.
Figure 9B:
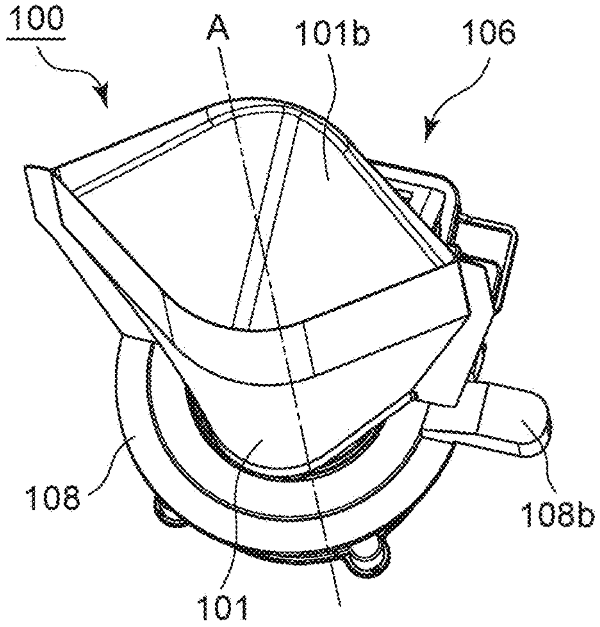
FIG. 9B is a perspective view that shows a state where the lever is turned in a state where the toner pack is mounted at the mounting portion according to the first embodiment.
Figure 9C:
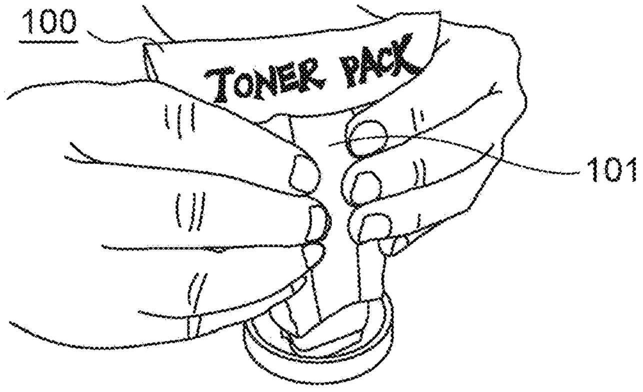
FIG. 9C is a perspective view that shows a state where the lever is turned in a state where the toner pack is mounted at the mounting portion according to the first embodiment.
Figure 10A:
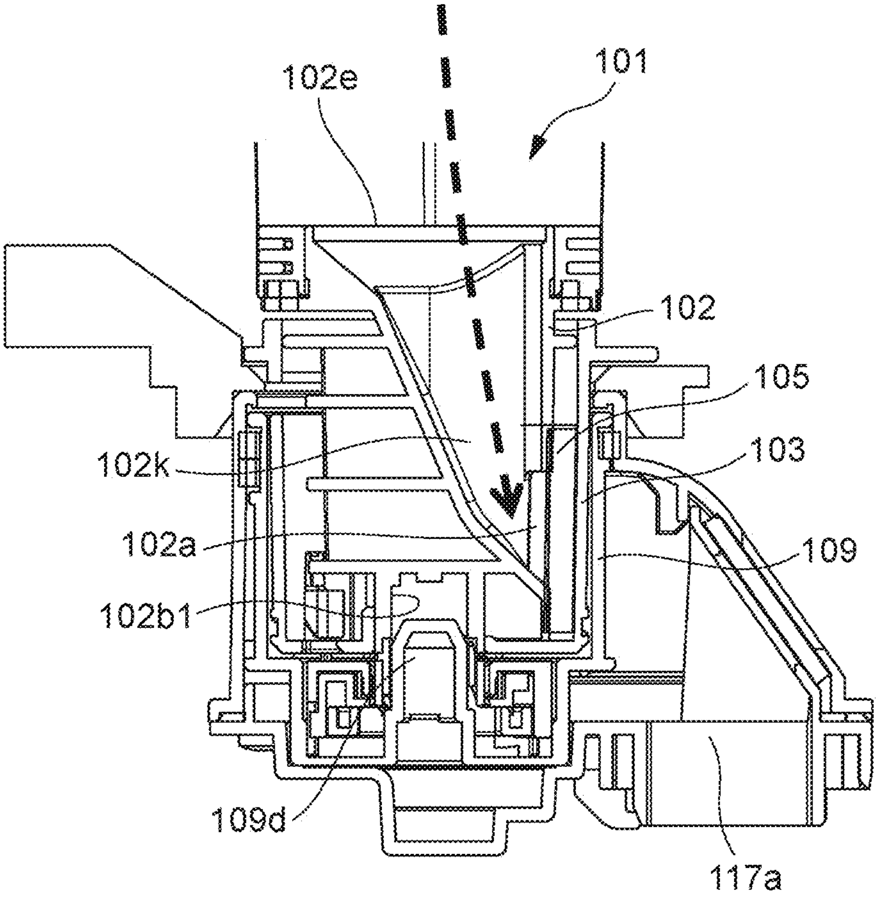
FIG. 10A is a sectional view of the mounting portion and the toner pack according to the first embodiment.
Figure 10B:
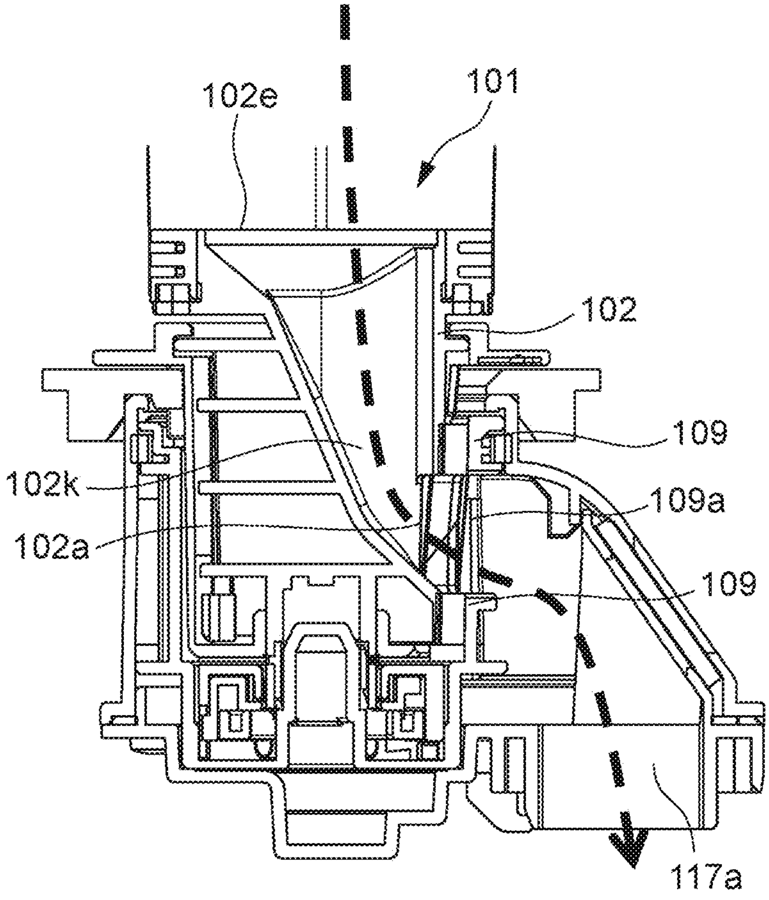
FIG. 10B is a sectional view of the mounting portion and the toner pack according to the first embodiment.

A series of operations to supply toner to the development apparatus 30 of the image forming apparatus 1 by using the toner pack 100 of the present embodiment will be described with reference to FIGS. 8A, 8B, 8C to 10A, and 10B. FIGS. 8A and 8B are perspective views of the toner pack 100 and the mounting portion 106 just before the toner pack 100 is mounted at the mounting portion 106. FIG. 8C is a perspective view of the toner pack 100 and the mounting portion 106 in a state where mounting of the toner pack 100 at the mounting portion 106 is complete. FIG. 9A is a perspective view of the toner pack 100 and the mounting portion 106 in a state where the mounting of the toner pack 100 at the mounting portion 106 is complete and the operating lever 108 is placed in the closed position. FIG. 9B is a perspective view of the toner pack 100 and the mounting portion 106 in a state where the mounting of the toner pack 100 is complete and the operating lever is placed in the open position. FIG. 9C is a view showing a state where the user is pressing the containing portion 101 of the toner pack 100 to supply toner. FIGS. 10A and 10B are sectional views showing the flow of toner from the toner pack 100 to the mounting portion 106. FIG. 10A is a state where the apparatus-side shutter 109 is placed in the non-communication position. FIG. 10B is a state where the apparatus-side shutter 109 is placed in the communication position.

The user holds the toner pack 100 of which the pack-side shutter 103 is placed in the closed position such that the toner pack 100 is oriented in a mounting posture (a mounting orientation or the predetermined orientation) in which the central axis A is orientated in the gravitational direction and the nozzle 102 is located below the containing portion 101. Then, as shown in FIGS. 8A and 8B, the position is adjusted such that the nozzle recess 102*d* and the shutter recess 103*b* respectively match the positioning part 119 and the lever engagement portion 108*c* (engaged portion 109*e*) of the mounting portion 106 in the location (rotational phase) in the circumferential direction of the imaginary circle VC. When the toner pack 100 is moved in the mounting direction M (gravitational direction M) toward the mounting portion 106 in this state, the state reaches the mounting completion state of FIG. 8C. In this mounting completion state, rotation of the nozzle 102 is restricted, and the pack-side shutter 103 is rotatable together with the operating lever 108.

In a state where the operating lever 108 is placed in the closed position shown in FIG. 9A, the pack-side shutter 103 is placed in the closed position, and the shutter opening 109*a* of the apparatus-side shutter 109 does not communicate with the opening 117*a* continuous with the toner containing chamber 36 of the developer container 32. In FIG. 10A, it appears that the discharge port 102*a* of the nozzle 102 is shut with the pack-side shutter 103 (seal 105) and a passage leading to the opening 117*a* is closed by the apparatus-side shutter 109. Therefore, in a state where the operating lever 108 is placed in the closed position, toner in the toner pack 100 cannot be moved downstream beyond the discharge port 102*a*.

FIG. 9B is a state resulting from rotation of the operating lever 108 from the state of FIG. 9A in the rotation direction D and is a state where the operating lever 108 is placed in the open position. In the state of FIG. 9B, as shown in FIG. 10B, the discharge port 102*a* of the nozzle 102 communicates with the opening 103*a* of the pack-side shutter 103 and the shutter opening 109*a* of the apparatus-side shutter 109. Therefore, toner in the containing portion 101 of the toner pack 100 is movable to the toner containing chamber 36 of the developer container 32 via the opening 117*a* along the route indicated by the dashed line arrow.

However, most of toner in the toner pack 100 is not discharged from the containing portion 101 only by rotating the operating lever 108 from the closed position to the open position. To supply toner in the toner pack 100 to the toner containing chamber 36, the user needs to perform discharge operation, that is, the user needs to press the containing portion 101 of the toner pack 100 with thumbs and fingers as shown in FIG. 9C. This discharge operation will be described later.

In the present embodiment, a configuration to open and close the pack-side shutter 103 and the apparatus-side shutter 109 by rotating the pack-side shutter 103 with the operating lever 108 has been described; however, the configuration is not limited thereto. For example, the pack-side shutter 103 may be configured to engage with a fixing member of the image forming apparatus 1 and the nozzle 102 may be configured to engage with a rotatable member of the image forming apparatus 1 when the toner pack 100 is mounted at the mounting portion 106. Then, the nozzle 102 may be configured to rotate with respect to the pack-side shutter 103 to cause the discharge port 102*a* of the nozzle 102 to be placed in an open state when the user rotates the nozzle 102 in a predetermined rotation direction about the central axis A.

The pack-side shutter 103 does not necessarily need to be provided as in the case of the toner pack 100 of the present embodiment. Instead of the pack-side shutter, a seal may be used as a shutting member that shuts the discharge port of the nozzle. A configuration in which the user opens the discharge port by pulling the seal after the toner pack is mounted at the mounting portion may be applied. In this case, instead of the apparatus-side shutter of the mounting portion, a cap configured to be removed before the user mounts the toner pack just needs to be used.

[Toner Contained in Toner Pack]

Toner used in the image forming apparatus 1 of the present embodiment, that is, toner contained in the toner pack 100, will be described. In the present embodiment, toner preferably has a cohesion degree lower than or equal to 63%. The cohesion degree can be controlled by the shape of toner and an external additive to be added.

The cohesion degree of toner is measured as follows. “Powder Tester PT-X” (produced by Hosokawa Micron Corporation) is used as a measuring apparatus. Then, a sieve with an aperture of 20 μm (635 mesh), a sieve with an aperture of 38 μm (390 mesh), and a sieve with an aperture of 75 μm (200 mesh) are sequentially stacked and set from the lower side on a shaking table. Measurement is performed as follows in an environment of 23° C., 60% RH.

(1) The amplitude of the shaking table is adjusted to 0.6 mm.

(2) 5.0 g of toner left standing for 24 hours in an environment of 23° C., 60% RH in advance is precisely weighed and calmly put on the topmost sieve with an aperture of 75 μm.

(3) After the sieves are shaken for 30 seconds, the mass of toner remaining on each sieve is measured, and the cohesion degree is calculated based on the following expression.

Cohesion degree (%)={(The weight (g) of the sample on the sieve with an aperture of 75 μm)/5 (g)}×100+{(The weight (g) of the sample on the sieve with an aperture of 38 μm)/5 (g)}×100×0.6+{(The weight (g) of the sample on the sieve with an aperture of 20 μm)/5 (g)}×100×0.2

In the present embodiment, three types of toner (toner a, toner b, and toner c) with different cohesion degrees are used.

(Toner a)

The cohesion degree of toner a was 63%. This is the toner manufactured by a suspension polymerization method as follows.

<Preparation Step for Aqueous Medium 1>

14.0 parts of sodium phosphate (dodecahydrate) (produced by Rasa Industries, Ltd.) was put into 1000.0 parts of ion-exchanged water in a reaction container, and maintained at 65° C. for 1.0 hour while nitrogen was being purged.

While the above solution was being agitated at 12000 rpm with a T.K. Homomixer (produced by TOKUSHU KIKA KOGYO Co., Ltd.), a calcium chloride aqueous solution obtained by dissolving 9.2 parts of calcium chloride (dihydrate) in 10.0 parts of ion-exchanged water was put in the solution at a time to prepare an aqueous medium containing a dispersion stabilizer. Furthermore, 10 percent by mass hydrochloric acid was put in the aqueous medium to adjust the pH to 5.0, with the result that an aqueous medium 1 was obtained.

<Hydrolysis Step for Organic Silicon Compound for Surface Layers>

In a reaction container equipped with an agitator and a thermometer, 60.0 parts of ion-exchanged water was weighed and adjusted to a pH of 3.0 by using 10 percent by mass hydrochloric acid. The solution was heated to a temperature of 70° C. while being agitated. After that, 40.0 parts of methyltriethoxysilane that was an organic silicon compound for surface layers was added to the solution and agitated for two hours or longer to be hydrolyzed. The end of hydrolysis was visually determined when oil water was not separated and formed into one layer, and the oil water was cooled to obtain a hydrolyzed solution of the organic silicon compound for surface layers.

<Preparation Step for Polymerizable Monomer Composition>

Styrene: 60.0 parts

Carbon black (Nipex 35, produced by Orion Engineered Carbons S.A.): 6.5 parts

The above materials were put in an attritor (produced by Mitsui Mitsuike Chemical Engineering Machinery, Co., Ltd.), and dispersed at 220 rpm for 5.0 hours by using zirconia particles having a diameter of 1.7 mm, to prepare a colorant dispersion solution. The following materials were added to the colorant dispersion solution.

Styrene: 20.0 parts n-Butyl acrylate: 20.0 parts

Divinylbenzene: 0.3 parts

Saturated polyester resin 1: 5.0 parts (a condensation polymer (a molar ratio of 10:12) of propylene oxide-modified bisphenol A (2-mol adduct) and terephthalic acid, with a glass transition temperature Tg of 68° C., a weight average molecular weight Mw of 10000, and a molecular weight distribution Mw/Mn of 5.12)

Fischer-Tropsch wax (melting point 78° C.): 7.0 parts

The above materials were kept at 65° C., and dissolved and dispersed uniformly at 500 rpm with the T.K. Homomixer (produced by TOKUSHU KIKA KOGYO Co., Ltd.) to prepare a polymerizable monomer composition.

<Granulating Step>

While the temperature of the aqueous medium 1 was 70° C. and the rotation speed of the T.K. Homomixer was kept at 12000 rpm, the polymerizable monomer composition was put into the aqueous medium 1, and 9.0 parts of t-butyl peroxypivalate that was a polymerization initiator was added. Then, granulation was directly performed for 10 minutes while the agitator was kept at 12000 rpm.

<Polymerization Step>

After the granulation step, a propeller agitating blade was set in the agitator, polymerization was performed for 5.0 hours by keeping the temperature at 70° C. while agitation was being performed at 150 rpm, and then a polymerization reaction was performed by increasing the temperature to 85° C. and heating for 2.0 hours to obtain core particles. The temperature of slurry containing the core particles was cooled to 55° C., and the pH was measured. The pH was 5.0. While agitation was continued at 55° C., 20.0 parts of the hydrolyzed solution of the organic silicon compound for surface layers was added to start forming the surface layer of toner. After the as-is state was kept for 30 minutes, the slurry was adjusted to a pH of 9.0 for condensation completion by using aqueous sodium hydroxide and further kept for 300 minutes to form surface layers.

<Washing and Drying Step>

After the end of the polymerization step, the slurry of toner particles was cooled, the slurry of toner particles was added with hydrochloric acid to be adjusted a pH of 1.5 or lower, left standing for an hour while being agitated, and then solid-liquid separation was performed with a pressure filter to obtain toner cake. The toner cake was reslurried with ion-exchanged water into a dispersion solution again and subjected to solid-liquid separation with the above-described filter. Reslurrying and solid-liquid separation were repeated until the electric conductivity of the filtrate became lower than or equal to 5.0 μS/cm, and then finally subjected solid-liquid separation to obtain toner cake.

The obtained toner cake was dried with a flash dryer Flash Jet Dryer (produced by SEISHIN ENTERPRISE Co., Ltd.), and fine and coarse particles were further cut with a multi-division classifier using the Coanda effect to obtain toner particles 1. A weight average particle diameter (D4) was 6.5 μm, and an average circularity was 0.985.

Silicon mapping was performed in cross-sectional TEM observation of the toner particles 1, and the presence of silicon atoms at the surface layers was confirmed.

<Preparation of Toner a>

For 100 parts of the toner particles 1, 0.2 parts of hydrotalcite (DHT-4A, produced by Kyowa Chemical Industry Co., Ltd.) was put into SUPERMIXER PICCOLO SMP-2 (produced by KAWATA MFG. CO., LTD.) and blended at 3000 rpm for 10 minutes to obtain toner a. The cohesion degree was 63%.

(Toner b)

The cohesion degree of toner b was 40%. This is the toner manufactured by a suspension polymerization method as follows.

<Example of Manufacturing of Toner Particles 2>

For 100 parts by mass of styrene monomer, 16.5 parts by mass of carbon black (Nipex 35) and 3.0 parts by mass of an aluminum compound of di-tertiary-butylsalicylic acid [BONTRON E88 (produced by Orient Chemical Industries Co., Ltd.)] were prepared. These were introduced into an attritor (produced by Mitsui Mining Company, Limited) and agitated at 200 rpm at 25° C. for 180 minutes by using zirconia beads with a radius of 1.25 mm (140 parts by mass) to prepare a masterbatch dispersion solution.

On the other hand, 450 parts by mass of 0.1M-Na3PO4 aqueous solution was put into 710 parts by mass of ion-exchanged water and warmed to 60° C., and then 67.7 parts by mass of 1.0M-CaCl2 aqueous solution was gradually added to obtain an aqueous medium containing a calcium phosphate compound.

Masterbatch dispersion solution 40 parts by mass
Styrene 49.5 parts by mass
n-Butyl acrylate 16.5 parts by mass
Hydrocarbon wax 9 parts by mass (Fischer-Tropsch Wax, the peak temperature of maximum endothermic peak=78° C., Mw=750)
Saturated polyester resin 1 5.0 parts by mass The above material was warmed to 65° C. and uniformed, dissolved, and dispersed at 5,000 rpm with the T.K. Homomixer (produced by Tokushu Kika Kogyo Co., Ltd.). 7.1 parts by mass of 70% toluene solution of a polymerization initiator 1,1,3,3-tetramethylbutyl peroxy-2-ethylhexanoate was dissolved into the above materials to prepare a polymerizable monomer composition.

The polymerizable monomer composition was put into the aqueous medium and agitated at 12,000 rpm for 10 minutes with the T.K. Homomixer at a temperature of 65° C. in an N2 atmosphere to granulate the polymerizable monomer composition. After that, the material was heated to a temperature of 67° C. while being agitated with a paddle agitator blade and, when a polymerization conversion rate of a polymerizable vinyl monomer reached 90%, 0.1 mol/liter of aqueous sodium hydroxide was added to adjust the pH of the aqueous dispersion medium to 9. Furthermore, the aqueous dispersion medium was heated to 80° C. at a temperature increase rate of 40° C./h and subjected to a reaction for four hours. After the polymerization reaction, the remaining monomer in toner particles was distilled away under reduced pressure. After the aqueous medium was cooled, the aqueous medium was added with hydrochloric acid to be adjusted to a pH of 1.4 and agitated for six hours to dissolve calcium phosphate salt. After the toner particles were filtered out and washed by water, the toner particles were dried for 48 hours at a temperature of 40° C. The obtained dried product was subjected to strict classification and removal of ultra fine powder and coarse powder at the same time with a multi-division classifier (Elbow-Jet Air Classifier produced by Nittetsu Mining Co., Ltd.) to obtain toner particles 2 with a weight average particle diameter (D4) of 6.3 μm and an average circularity of 0.981.

<Example of Manufacturing Metal Titanate Fine Particles>

Metatitanic acid obtained through a sulfuric acid method was subjected to deferrization and bleaching, then added with aqueous sodium hydroxide to be adjusted to a pH of 9.0, subjected to desulfurization, then neutralized by using hydrochloric acid to a pH of 5.8, and subjected to filtration and washing. The washed cake was added with water to obtain 1.85 mol/L of TiO2 slurry and added with hydrochloric acid to be adjusted to a pH of 1.0, and then subjected to deflocculation.

1.88 mol of the metatitanic acid subjected to desulfurization and deflocculation was extracted as TiO2 and put into a 3 L reaction container. After the deflocculated metatitanic acid slurry was added with 2.16 mol of aqueous strontium chloride such that an Sr/Ti mol ratio was 1.15, the concentration of TiO2 was adjusted to 1.039 mol/L. Subsequently, the slurry was warmed to 90° C. while being agitated and blended, 45 minutes was put into adding 440 mL of 10N mol/L aqueous sodium hydroxide, then agitation was continued at 95° C. for an hour, and the reaction was ended.

The reaction slurry was cooled to 50° C., added with hydrochloric acid until the pH became 5.0, and agitated for 20 minutes. The obtained precipitation was subjected to decantation washing, filtered and separated, and then dried for eight hours in a 120° C. atmosphere.

Subsequently, 300 g of the dried product was put into a dry particle composing machine (NOBILTA NOB-130, MADE BY Hosokawa Micron Corporation). The treatment was performed at a treatment temperature of 30° C. with a rotary treatment blade set at 90 m/sec for 10 minutes.

Furthermore, the dried product was added with hydrochloric acid to be adjusted to a pH of 0.1, and agitated for an hour. The obtained precipitation was subjected to decantation washing.

The slurry containing the precipitation was adjusted to 40° C. and added with hydrochloric acid to be adjusted to a pH of 2.5. Subsequently, the solid content was added with 4.6 percent by mass isobutyltrimethoxysilane and 4.6 percent by mass trifluoropropyl trimethoxysilane, agitated and blended for an hour, and agitated and held for 10 hours. The obtained material was added with 5N aqueous sodium hydroxide to be adjusted to a pH of 6.5, agitated for an hour, then filtered and washed, and the obtained cake was dried for eight hours in a 120° C. atmosphere to obtain metal titanate fine particles.

<Preparation of Toner b>

For 100 parts by mass of toner particles 2, 1.0 part by mass of RX300 (produced by Nippon Aerosil Co., Ltd.) that are silica fine particles and 0.2 parts by mass of metal titanate fine particles were blended in a dry condition for 12 minutes under the condition of 3600 rpm with a Henschel mixer FM10C (produced by Mitsui Mining Company, Limited) to obtain Toner b. The cohesion degree was 40%.

(Toner c)

The cohesion degree of toner c was 26%. This is the toner manufactured by an emulsion aggregation method as follows.

<Preparation of Binder Resin Particle Dispersion Solution>

89.5 parts of styrene, 9.2 parts of butyl acrylate, 1.3 parts of acrylic acid, and 3.2 parts of n-lauryl mercaptan were blended and dissolved. This solution was added with an aqueous solution obtained by blending 1.5 parts of NEOGEN RK (produced by Dai-ichi Kogyo Seiyaku Co., Ltd.) with 150 parts of ion-exchanged water and dispersed.

Furthermore, while the solution was being slowly agitated for 10 minutes, the solution was added with an aqueous solution obtained by blending 0.3 parts of potassium persulfate with 10 parts of ion-exchanged water.

After nitrogen substitution, the solution was subjected to emulsion polymerization at 70° C. for six hours. After completion of the polymerization, the reaction solution was cooled to room temperature and added with ion-exchanged water to obtain a binder resin particle dispersion solution with a solid content concentration of 12.5 percent by mass and a volume-based median diameter of 0.2 μm.

<Preparation of Release Agent Dispersion Solution>

100 parts of a release agent (behenyl behenate, melting point: 72.1° C.) and 15 parts of NEOGEN RK were blended with 385 parts of ion-exchanged water and dispersed for about an hour with a wet-type jet-mill JN100 (produced by JOKO CO., LTD.) to obtain a release agent dispersion solution. The solid content concentration of the release agent dispersion solution was 20 percent by mass.

<Preparation of Colorant Dispersion Solution>

100 parts of carbon black (Nipex 35) and 15 parts of NEOGEN RK were blended with 885 parts of ion-exchanged water and dispersed for about an hour with the wet-type jet-mill JN100 to obtain a colorant dispersion solution.

<Preparation of Toner Particles 3>

265 parts of binder resin particle dispersion solution, 10 parts of release agent dispersion solution, and 10 parts of colorant dispersion solution were put in a container and dispersed with a homogenizer (ULTRA-TURRAX T50 produced by IKA).

The temperature in the container was adjusted to 30° C. while the solution was being agitated, and added with 1 mol/L of aqueous sodium hydroxide to be adjusted to a pH of 8.0.

Ten minutes was put into adding an aqueous solution obtained by dissolving 0.25 parts of aluminum chloride in 10.0 parts of ion-exchanged water as a coagulant under agitation at 30° C. An increase in temperature was started after being left standing for three minutes, the temperature was increased to 50° C., and generation of aggregated particles was performed. At the time when the weight average particle diameter (D4) became 6.0 μm, particle growth was stopped by adding 0.90 parts of sodium chloride and 5.0 parts of NEOGEN RK.

1 mol/L of aqueous sodium hydroxide was added to adjust the pH to 9.0, and the temperature was increased to 95° C. to spheroidize aggregated particles. When the average circularity reached 0.980, a decrease in temperature was started to be cooled to 30° C. to obtain a toner-particle dispersion solution.

The obtained toner-particle dispersion solution was added with hydrochloric acid to be adjusted to a pH of 1.5 or lower, agitated and left standing for an hour, and then subjected to solid-liquid separation with a pressure filter to obtain toner cake.

The toner cake was reslurried with ion-exchanged water into a dispersion solution again and subjected to solid-liquid separation with the above-described filter. Reslurrying and solid-liquid separation were repeated until the electric conductivity of the filtrate became lower than or equal to 5.0 μS/cm, and then finally subjected solid-liquid separation to obtain toner cake.

The obtained toner cake was dried with a flash dryer Flash Jet Dryer (produced by SEISHIN ENTERPRISE Co., Ltd.). The drying conditions were set to a blowing temperature of 90° C. and a dryer outlet temperature of 40° C., and a toner cake supply speed was adjusted to a speed such that an outlet temperature does not deviate from 40° C. according to the moisture content of toner cake. Furthermore, fine and coarse particles were cut with the multi-division classifier using the Coanda effect to obtain toner particles 3. The weight average particle diameter (D4) of the toner particles 3 was 6.0 μm.

<Example of Manufacturing of Silica Fine Particles 1>

Primary particles of untreated dry silica with a number mean particle diameter of 18 nm were put into a reactor with an agitator, and heated to 200° C. in a fluidized state due to agitation.

The inside of the reactor was replaced with nitrogen gas, the reactor was hermetically sealed, 25 parts of dimethyl silicone oil (viscosity=100 mm2/s) was sprayed to 100 parts of dry silica, and agitated for 30 minutes. After that, the material was increased to 250° C. in temperature while being agitated, the material was taken out after agitation for further two hours, and subjected to shredding to obtain silica fine particles 1. The degree of hydrophobicity of the silica fine particles 1 was 90 (percent by volume).

<Preparation of Toner c>

For the obtained toner particles 3 (100 parts), hydrotalcite (DHT-4A, 0.3 parts) and the silica fine particles 1 (1.2 parts) were externally added and blended with FM10C (produced by NIPPON COKE & ENGINEERING Co., Ltd.) to obtain toner c. The cohesion degree was 26%.

External additive conditions were such that the charge amount of toner particles: 2.0 kg, rotation speed: 66.6 s-1, and external addition time: 12 minutes. The cohesion degree was 26%.

[Dischargeability of Toner]

To discharge toner in the containing portion 101 of the toner pack 100 of the present embodiment from the discharge port 102*a* of the nozzle 102 to outside the toner pack 100, the user needs to press the containing portion 101.

Incidentally, the toner pack 100 is desired to be compact in size in consideration of transport efficiency and space efficiency for displaying products. Then, in consideration of supply efficiency, the inside of the compact toner pack 100 is preferably filled with a large amount of toner. However, it has been understood that, if the filling amount of toner is too large for the toner containing volume of the toner pack 100, toner is difficult to be discharged from the toner pack even when the containing portion 101 is pressed and toner dischargeability significantly decreases.

It has been understood that toner dischargeability of the toner pack 100 varies depending on the filling amount of toner to the total volume of the toner pack 100, which is the sum of the volume of the containing portion 101 in which toner can be contained and the volume of the nozzle 102 in which toner can be contained, and the configuration of the nozzle for receiving toner from the containing portion 101 and discharging the toner. The relationship among these will be described with reference to FIGS. 6A to 6D, and 11A to 11E to 14.

Initially, the definition of toner dischargeability will be described. As described above, when the pack-side shutter 103 is in the open position and toner can be discharged from the discharge port 102*a*, the user performs discharge operation for discharging toner from the toner pack 100. The discharge operation described here is presumably, for example, as shown in FIG. 9C, facilitating discharge of toner from the toner pack 100 by, in a state where one side of the containing portion 101 is supported with four fingers other than a thumb, pressing the other side of the containing portion 101 with the thumb with a force of about 10 kgf to 15 kgf in the second direction Y (FIG. 6B) to compress the containing portion 101. At this time, the user repeatedly presses the containing portion 101 until discharge of toner completes on the assumption that operation to sequentially press the upper part, middle part, and lower part of the containing portion 101 of the toner pack 100 (FIGS. 9A, 9B, and 9C) in a posture mounted at the mounting portion 106 is defined as one set. At this time, it is assumed that toner dischargeability is better as time required to complete discharge of toner in the toner pack 100 shortens for the user. Here, it is determined that toner dischargeability is good (GOOD) when all the toner in the toner pack 100 can be discharged by discharge operation in 20 seconds; whereas it is determined that toner dischargeability is not good (NOT GOOD) when toner still remains in the toner pack after a lapse of 20 seconds. However, a small amount of toner remaining inside the containing portion 101 or adhering to the flow channel 102*k* of the nozzle 102 is not regarded as remaining toner.

Here, an experiment on toner dischargeability was carried out by using four toner packs (a toner pack 100, a toner pack 200, a toner pack 300, and a toner pack 400) respectively having different nozzles. The procedure of the experiment is as follows. A toner containing space V has a total volume [$cm^3$] of the toner pack, which is the sum of the inner volume of the containing portion and the inner volume of the nozzle in a state where the discharge port is shut.

(i) The toner containing space V is filled with 75.4 g of toner.

(ii) A filling amount per unit volume ([$g/cm^3$]) is adjusted by progressively decreasing air in the toner containing space V to deform the containing portion, to reduce (iii) the volume of the toner containing space V.

(iv) The volume of the toner containing space V is measured, discharge operation is performed on the toner pack that has reached a desired filling amount per unit volume, and toner dischargeability is determined.

To avoid clogging of toner in the nozzle 102 at the time of deaeration, deaeration is performed such that the nozzle of the toner pack is located on the upper side. Thus, it is possible to bring toner and air close to a uniformly mixed state without toner in the toner containing space V locally clogging the nozzle.

(First Toner Pack)

Figure 11A:
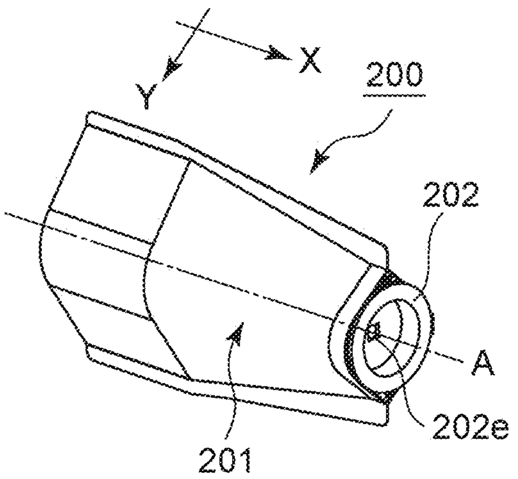
FIG. 11A is a perspective view of the toner pack, used for a toner discharge experiment, according to the first embodiment.
Figure 11B:
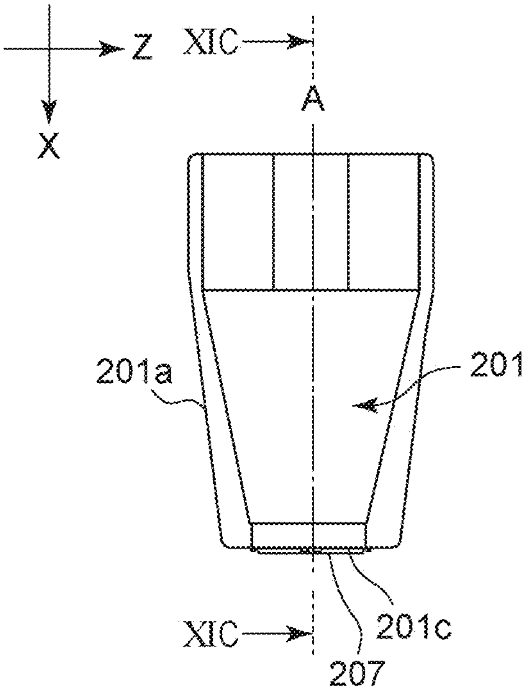
FIG. 11B is a front view of the toner pack, used for a toner discharge experiment, according to the first embodiment.
Figure 11C:
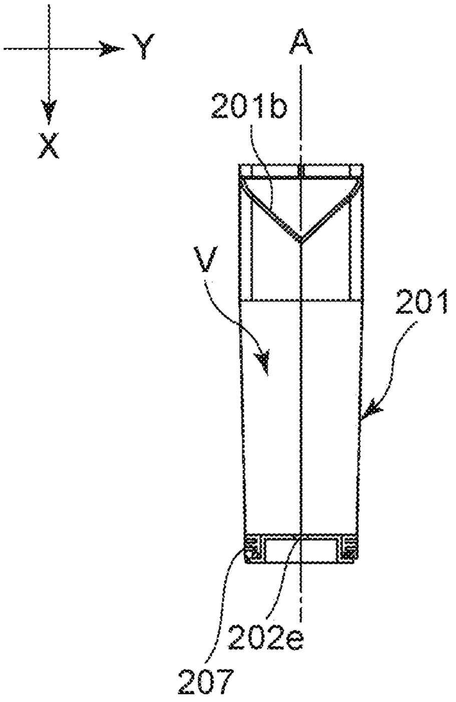
FIG. 11C is a sectional view of the toner pack, used for a toner discharge experiment, according to the first embodiment.
Figure 11D:
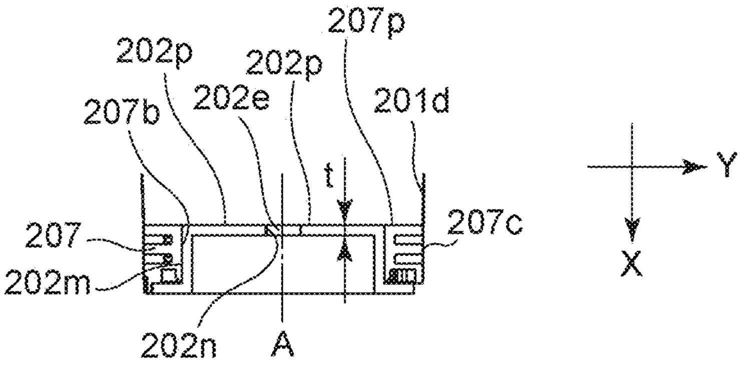
FIG. 11D is a sectional view of the nozzle, used for a toner discharge experiment, according to the first embodiment.
Figure 11E:
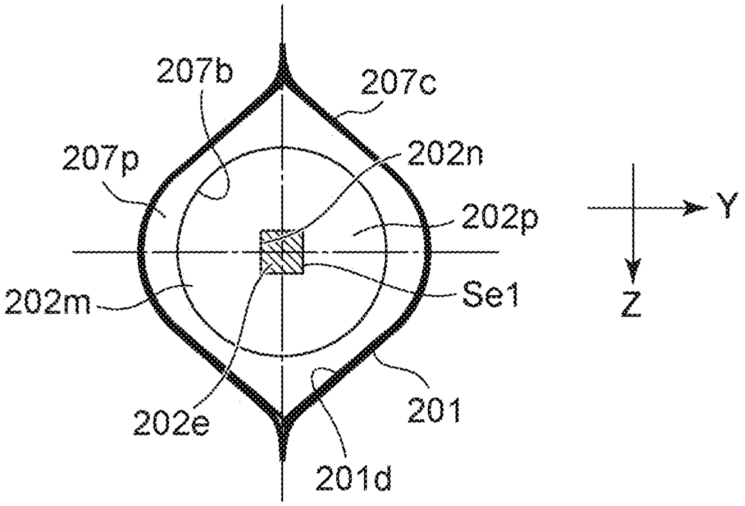
FIG. 11E is a top view of the nozzle, used for a toner discharge experiment, according to the first embodiment.

A discharge experiment was carried out by using the toner pack 200 as a first toner pack T1 filled with toner a. FIG. 11A is a perspective view of the toner pack 200. FIG. 11B is a front view of the toner pack 200. FIG. 11C is a sectional view taken along the line XIC-XIC in FIG. 11B. FIG. 11D is an enlarged view of an area around the nozzle of the toner pack 200 of FIG. 11C. FIG. 11E is a top view of a coupling member 207 and a nozzle 202 when viewed from a containing portion 201 side.

The configuration of the toner pack 200 will be described. The toner pack 200 includes the containing portion 201, the coupling member 207, and the nozzle 202.

The containing portion 201 has a side part 201*a*, a bottom part 201*b* (closed part), and an opening 201*c* defined by an inner peripheral surface 201*d*. The containing portion 201 has the same configuration as the containing portion 101 of the first embodiment.

As shown in FIG. 11D, the nozzle 202 has a receiving port 202*e* that has a square shape, 5 mm on a side (Area Se1=25 $mm^2$) and that is open in the direction of the central axis A (first direction X). The receiving port 202*e* is the shaded area of FIG. 11E. The receiving port 202*e* is a through-hole surrounded by an inner peripheral surface 202*n* and has a thickness t (a length in the direction of the central axis A of the inner peripheral surface 202*n*) of 1.5 mm. The thickness t can be ignored as the length of the flow channel of the nozzle 202 because the thickness is sufficiently small for the size of the receiving port 202*e*. The nozzle 202 further has an engaged surface 202*m* and an upper surface 202*p* (top surface). The engaged surface 202*m* is an outer peripheral surface of which the center coincides with the central axis A. The upper surface 202*p* extends in a direction (the second direction Y and the third direction Z) orthogonal to the central axis A (first direction X) and faces upward when the toner pack 200 is oriented in the above-described predetermined orientation.

The coupling member 207 is a member that couples the containing portion 201 to the nozzle 202 and has the same configuration as the coupling member 107 of the present embodiment. The coupling member 207 has an engagement surface 207*b*, a fixing surface 207*c* (a welding surface or a bonding surface), and an upper surface 207*p* (top surface). The engagement surface 207*b* is an inner peripheral surface of which the center coincides with the central axis A and engages with the engaged surface 202*m* of the nozzle 202. The fixing surface 207*c* is a surface fixed (welded or bonded) to the inner peripheral surface 201*d* of the containing portion 201. The upper surface 207*p* is connected to the engagement surface 207*b* and the fixing surface 207*c* and faces upward (toward the containing portion 201) when the toner pack 200 is oriented in the above-described predetermined orientation.

The upper surface 202*p* of the nozzle 202 and the upper surface 207*p* of the coupling member 207 are located at substantially the same level in a height direction and are surfaces extending in the second direction Y and the third direction Z orthogonal to the central axis A (first direction X). Therefore, the upper surface 202*p* and the upper surface 207*p* close part of the opening 201*c* of the containing portion 201.

The results of a discharge experiment carried out by using the above-described toner a with the toner pack 200 described above are shown below.

Toner filling amount 0.575 [$g/cm^3$]: Toner dischargeability is good (GOOD)

Toner filling amount 0.618 [$g/cm^3$]: Toner dischargeability is not good (NOT GOOD)

From the results, when the area S1 of the receiving port 202*e* of the nozzle 202 is greater than or equal to 25 $mm^2$ and the toner filling amount is less than or equal to 0.575 [$g/cm^3$], toner dischargeability is good. In other words, when the filling amount is greater than or equal to 0.618 [$g/cm^3$] and the area S1 of the receiving port is less than or equal to an area of 25 $mm^2$, good toner dischargeability is not obtained even with any nozzle. In the flow channel, when the length falls within the range less than or equal to 1.5 mm, discharge may be performed even when a region in which a minimum sectional area is 25 $mm^2$ is included.

(Second Toner Pack)

A second toner pack T2 is exactly the same as the above-described toner pack 100, and only the parts not described above will be described with reference to FIGS. 6A to 6D. An area Se2 of the receiving port 102*e* of the nozzle 102 of the toner pack 100 is 594 $mm^2$. The receiving port 102*e* is the shaded area in FIG. 6D. An area So2 of the discharge port 102*a* shown in FIG. 6A is 217 $mm^2$. In other words, the area Se2 of the receiving port 102*e* is greater than the area So2 of the discharge port 102*a*. A length L102 (FIG. 6C) in the first direction X from the receiving port 102*e* to the lower end of the discharge port 102*a* is 43 mm. A minimum sectional area Smin2 of the flow channel 102*k* is the dashed line part of FIG. 6C and is 115 $mm^2$. The minimum sectional area Smin2 is a cross section passing through the upper end of the discharge port 102*a* and the first inclined surface 102*g*1.

The upward-facing upper surface 107*p* of the coupling member 107 and the upward-facing upper surface 102*p* of the nozzle 102 are located at the same level or substantially the same level and are surfaces extending in the second direction Y and the third direction Z orthogonal to the direction of the central axis A (first direction X). Therefore, the upper surface 107*p* and the upper surface 102*p* close part of the opening 101*c* of the containing portion 101.

The results of the discharge experiment carried out by using the toner pack 100 filled with toner a described above are shown below.

Toner filling amount 0.629 [g/$cm^3$]: Toner dischargeability is good (GOOD)

Toner filling amount 0.653 [g/$cm^3$]: Toner dischargeability is not good (NOT GOOD)

(Third Toner Pack)

Figure 12A:
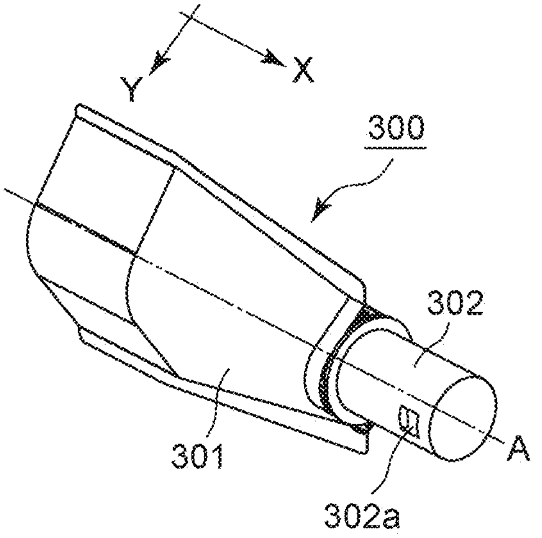
FIG. 12A is a perspective view of the toner pack, used for a toner discharge experiment, according to the first embodiment.
Figure 12B:
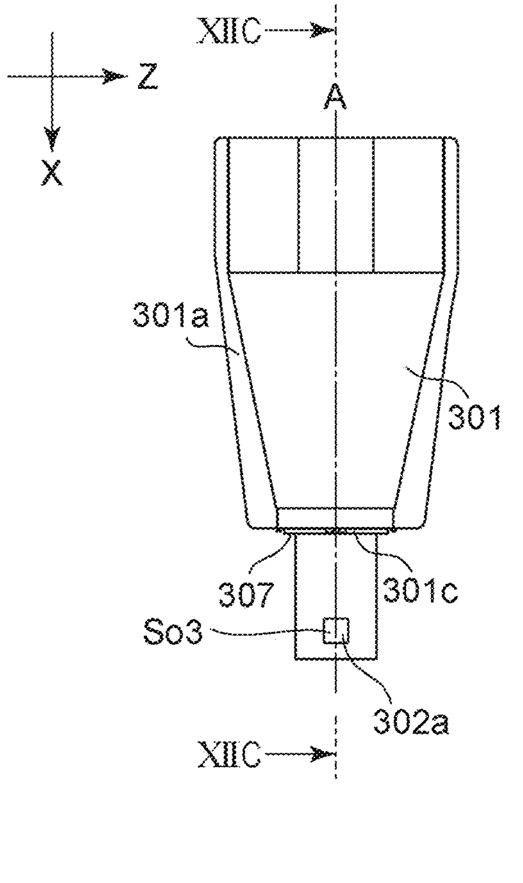
FIG. 12B is a front view of the toner pack, used for a toner discharge experiment, according to the first embodiment.
Figure 12C:
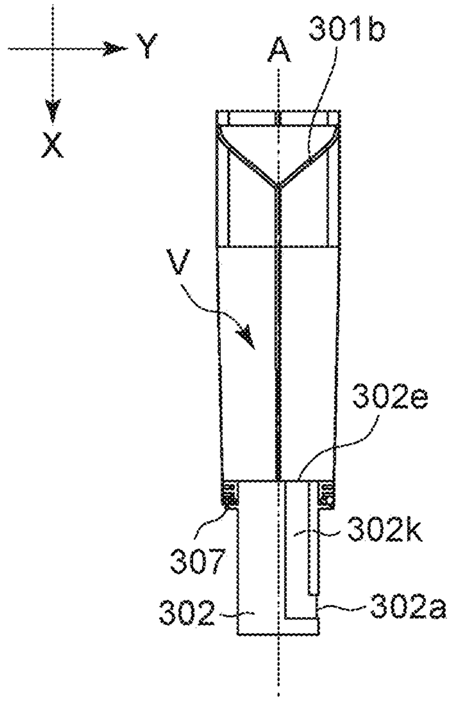
FIG. 12C is a sectional view of the toner pack, used for a toner discharge experiment, according to the first embodiment.
Figure 12D:
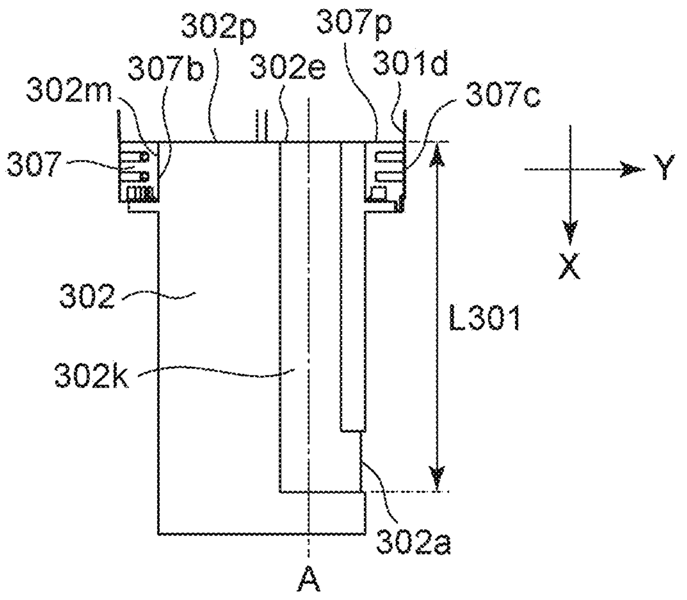
FIG. 12D is a sectional view of the nozzle, used for a toner discharge experiment, according to the first embodiment.
Figure 12E:
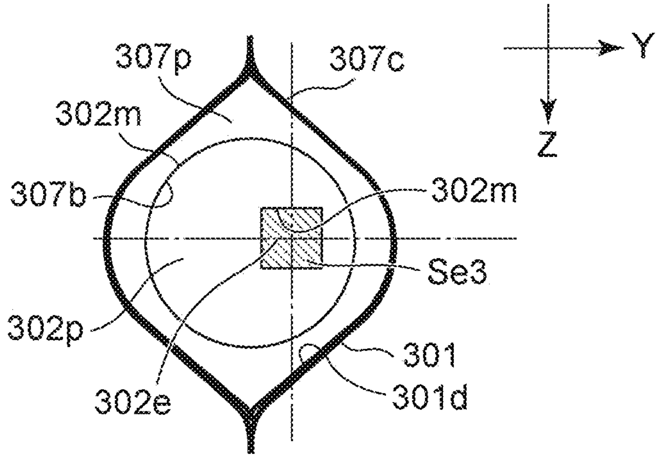
FIG. 12E is a top view of the nozzle, used for a toner discharge experiment, according to the first embodiment.

The above-described discharge experiment was carried out by using the toner pack 300 as a third toner pack T3 filled with toner a and toner c. FIG. 12A is a perspective view of the toner pack 300. FIG. 12B is a front view of the toner pack 300. FIG. 12C is a sectional view taken along the line XIIC-XIIC in FIG. 12B. FIG. 12D is an enlarged sectional view of an area around the nozzle of the toner pack 300 of FIG. 12C. FIG. 12E is a top view of a coupling member 307 and a nozzle 302 when viewed from the containing portion 301 side.

The configuration of the toner pack 300 will be described. The toner pack 300 includes the containing portion 301, the coupling member 307, and the nozzle 302.

The containing portion 301 has a side part 301*a*, a bottom part 301*b* (closed part), and an opening 301*c* defined by an inner peripheral surface 301*d*. The containing portion 301 has the same configuration as the containing portion 101 of the present embodiment.

As shown in FIG. 12E, the nozzle 302 has a receiving port 302*e* that has a square shape, 8.66 mm on a side (Area Se3=75 $mm^2$) and that is open in the direction of the central axis A (first direction X). The receiving port 302*e* is the shaded area in FIG. 12E. As shown in FIG. 12D, the nozzle 302 has a discharge port 302*a* that is orthogonal to the first direction X and that is open at a side surface in the second direction Y. A sectional area So3 of the discharge port 302*a* is also 75 $mm^2$. The nozzle 302 has a flow channel 302*k* (passage) that connects the receiving port 302*e* with the discharge port 302*a* and through which toner passes. Toner in the containing portion 301 is discharged to outside the toner pack 300 via the receiving port 302*e*, the flow channel 302*k*, and the discharge port 302*a* of the nozzle 302. The sectional area of the flow channel 302*k* is 75 $mm^2$ in any region. In other words, the minimum sectional area of the flow channel 302*k* is 75 $mm^2$. A length L301 in the first direction X from the receiving port 302*e* to the lower end of the discharge port 302*a* is 50 mm.

As shown in FIGS. 12D and 12E, the nozzle 302 further has an engaged surface 302*m* and an upper surface 302*p* (top surface). The engaged surface 302*m* is an outer peripheral surface of which the center coincides with the central axis A. The upper surface 302*p* extends in a direction (the second direction Y and the third direction Z) orthogonal to the central axis A and faces upward when the toner pack 300 is oriented in the above-described predetermined orientation.

The coupling member 307 is a member that couples the containing portion 301 to the nozzle 302 and has the same configuration as the coupling member 107 of the present embodiment. The coupling member 307 has an engagement surface 307*b*, a fixing surface 307*c* (a welding surface or a bonding surface), and an upper surface 307*p* (top surface). The engagement surface 307*b* is an inner peripheral surface of which the center coincides with the central axis A and engages with the engaged surface 302*m* of the nozzle 302.

The fixing surface 307*c* is fixed (welded or bonded) to the inner peripheral surface 301*d* of the containing portion 301. The upper surface 302*p* is connected to the engagement surface 307*b* and the fixing surface 307*c* and faces upward (toward the containing portion 301) when the toner pack 300 is oriented in the above-described predetermined orientation.

The upper surface 302*p* of the nozzle 302 and the upper surface 307*p* of the coupling member 307 are located at the same level or substantially the same level and are surfaces extending in the second direction Y and the third direction Z orthogonal to the direction of the central axis A (first direction X). Therefore, the upper surface 302*p* and the upper surface 307*p* close part of the opening 301*c* of the containing portion 301.

The results of the above-described discharge experiment carried out by using the toner pack 300 filled with toner a are shown below.

Toner filling amount 0.557 [g/$cm^3$]: Toner dischargeability is good (GOOD)

Toner filling amount 0.606 [g/$cm^3$]: Toner dischargeability is not good (NOT GOOD)

The results of the above-described discharge experiment carried out by using the toner pack 300 filled with toner c are shown below.

Toner filling amount 0.547 [g/$cm^3$]: Toner dischargeability is good (GOOD)

Toner filling amount 0.609 [g/$cm^3$]: Toner dischargeability is not good (NOT GOOD)

(Fourth Toner Pack)

Figure 13A:
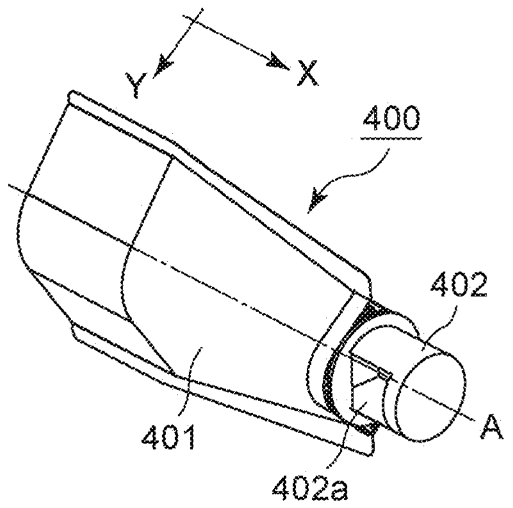
FIG. 13A is a perspective view of the toner pack, used for a toner discharge experiment, according to the first embodiment.
Figure 13B:
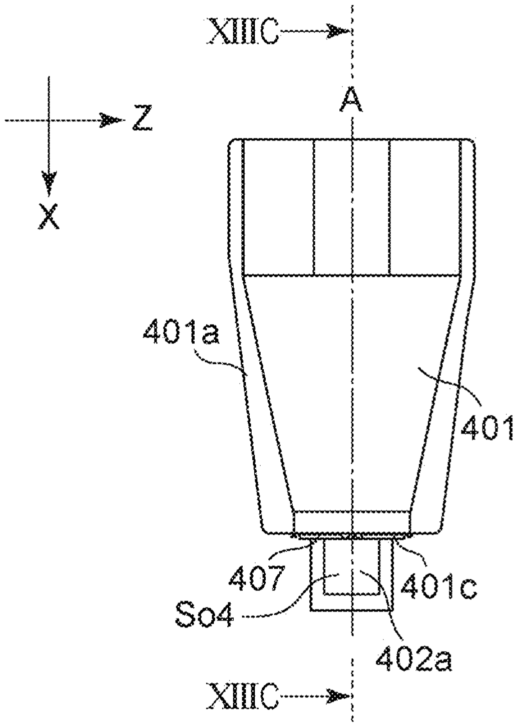
FIG. 13B is a front view of the toner pack, used for a toner discharge experiment, according to the first embodiment.
Figure 13C:
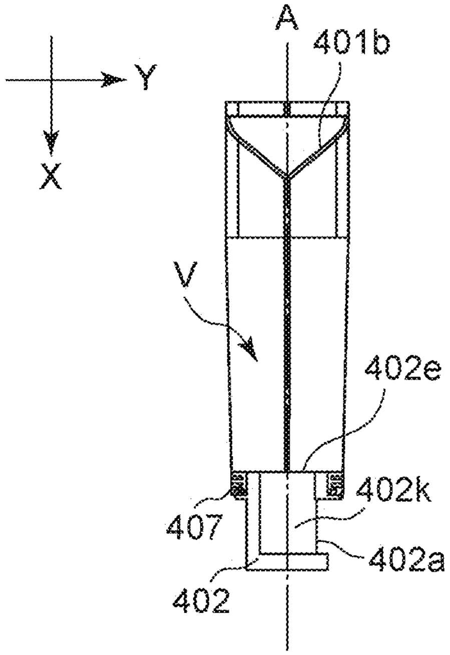
FIG. 13C is a sectional view of the toner pack, used for a toner discharge experiment, according to the first embodiment.
Figure 13D:
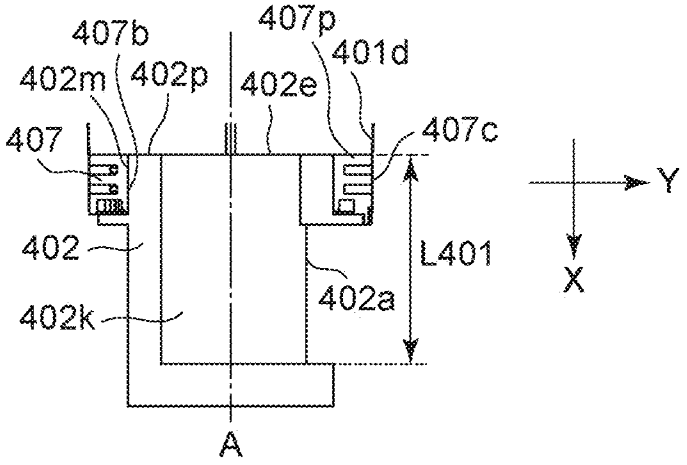
FIG. 13D is a sectional view of the nozzle, used for a toner discharge experiment, according to the first embodiment.
Figure 13E:
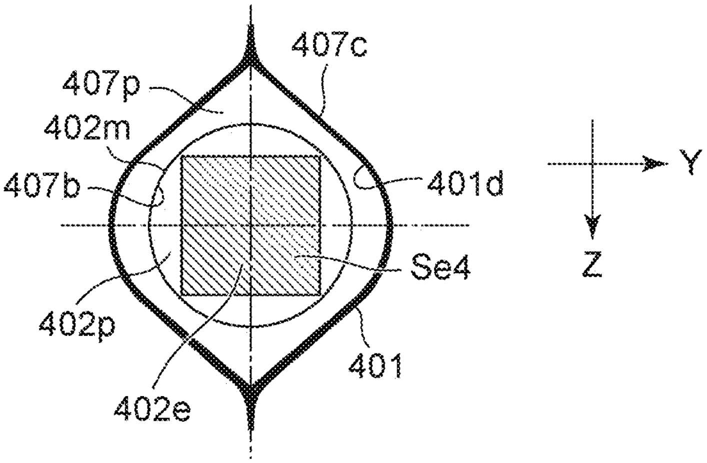
FIG. 13E is a top view of the nozzle, used for a toner discharge experiment, according to the first embodiment.

The above-described discharge experiment was carried out by using the toner pack 400 as a fourth toner pack T4 filled with toner a. FIG. 13A is a perspective view of the toner pack 400. FIG. 13B is a front view of the toner pack 400. FIG. 13C is a sectional view taken along the line XIIIC-XIIIC in FIG. 13B. FIG. 13D is an enlarged sectional view of an area around the nozzle of the toner pack 400 of FIG. 13C. FIG. 13E is a top view of a coupling member 407 and a nozzle 402 when viewed from the containing portion 401 side.

The configuration of the toner pack 400 will be described. The toner pack 400 includes the containing portion 401, the coupling member 407, and the nozzle 402.

The containing portion 401 has a side part 401*a*, a bottom part 401*b* (closed part), and an opening 401*c* defined by an inner peripheral surface 401*d*. The containing portion 401 has the same configuration as the containing portion 101 of the present embodiment.

As shown in FIG. 13E, the nozzle 402 has a receiving port 402*e* that has a square shape, 20 mm on a side (Area Se4=400 $mm^2$) and that is open in the direction of the central axis A (first direction X). The receiving port 402*e* is the shaded area in FIG. 13E.

As shown in FIG. 13D, the nozzle 402 has a discharge port 402*a* that is orthogonal to the first direction X and that is open at a side surface in the second direction Y. A sectional area So4 (FIG. 13A) of the discharge port 402*a* is also 400 $mm^2$. The nozzle 402 has a flow channel 402*k* (passage) that connects the receiving port 402*e* with the discharge port 402*a* and through which toner passes. Toner in the containing portion 401 is discharged to outside the toner pack 400 via the receiving port 402*e*, the flow channel 402*k*, and the discharge port 402*a* of the nozzle 402. The sectional area of the flow channel 402*k* is 400 $mm^2$ in any region. In other words, the minimum sectional area of the flow channel 402*k* is 400 $mm^2$. A length L401 (FIG. 13D) in the first direction X from the receiving port 402*e* to the lower end of the discharge port 402*a* is 30 mm.

The nozzle 402 further has an engaged surface 402*m* and an upper surface 402*p* (top surface). The engaged surface 402*m* is an outer peripheral surface of which the center coincides with the central axis A. The upper surface 402*p* extends in a direction orthogonal to the central axis A and faces upward when the toner pack 400 is oriented in the above-described predetermined orientation.

The coupling member 407 is a member that couples the containing portion 401 to the nozzle 402 and has the same configuration as the coupling member 107 of the present embodiment. The coupling member 407 has an engagement surface 407*b*, a fixing surface 407*c* (a welding surface or a bonding surface), and an upper surface 407*p* (top surface). The engagement surface 407*b* is an inner peripheral surface of which the center coincides with the central axis A and engages with the engaged surface 402*m* of the nozzle 402.

The fixing surface 407*c* is fixed (welded or bonded) to the inner peripheral surface 401*d* of the containing portion 401. The upper surface 407*p* is connected to the engagement surface 407*b* and the fixing surface 407*c* and faces upward (toward the containing portion 401) when the toner pack 400 is oriented in the above-described predetermined orientation.

The upper surface 402*p* of the nozzle 402 and the upper surface 407*p* of the coupling member 407 are located at the same level or substantially the same level and are surfaces extending in the second direction Y and the third direction Z orthogonal to the direction of the central axis A (first direction X). Therefore, the upper surface 402*p* and the upper surface 407*p* close part of the opening 401*c* of the containing portion 401.

The results of the above-described discharge experiment carried out by using the toner pack 400 filled with toner a are shown below.

Toner filling amount 0.677 [g/cm$^3$]: Toner dischargeability is good (GOOD)

Figure 14:
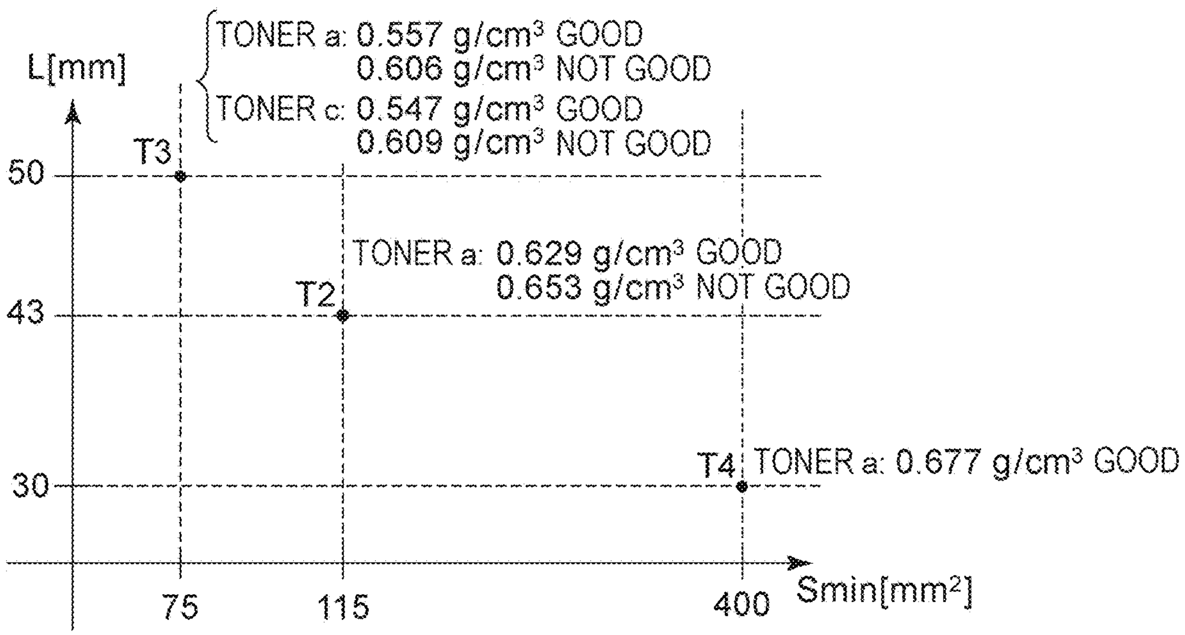
FIG. 14 is a graph that shows the results of the toner discharge experiment according to the first embodiment.

FIG. 14 shows the results of the toner dischargeability experiments of the second toner pack T2 (toner pack 100), the third toner pack T3 (toner pack 300), and the fourth toner pack T4 (toner pack 400), described above. The abscissa axis of the graph of FIG. 14 represents a minimum sectional area Smin in the flow channel of the nozzle, and the ordinate axis represents a length L in the first direction X from the receiving port to the lower end of the discharge port. L and Smin of each toner pack are as follows.

Second toner pack T2: Smin=115 mm$^2$, L=43 mm

Third toner pack T3: Smin=75 mm$^2$, L=50 mm

Fourth toner pack T4: Smin=400 mm$^2$, L=30 mm

When these are arranged in order of good toner dischargeability and descending order of the upper limit of toner filling amount in a case where toner a is used, the order is T4, T2, and T3. In other words, it is found that, as L reduces, and as Smin increases, good toner dischargeability can be maintained even when the toner filling amount is increased.

Secondly, it is found that, from the experiments using the third toner pack T3, there is almost no difference in toner dischargeability between toner a having a cohesion degree of 63% and toner c having a cohesion degree of 26%. Furthermore, toner dischargeability was checked by using toner a and toner b at a toner filling amount of 0.35 [g/cm$^3$], there was almost no difference. Therefore, it is presumable that the influence of toner difference on toner dischargeability is small at least between 26% and 63% of the toner cohesion degree (higher than or equal to 26% and lower than or equal to 63%).

From the above experimental results, in the graph of FIG. 14, among the toner packs T2, T3, T4 subjected to the experiments, T3 has the most disadvantageous configuration in relation to toner dischargeability; however, good toner dischargeability can be maintained when the toner filling amount is made less than or equal to 0.547 [g/cm$^3$]. Therefore, in the range in which it is more advantageous in toner dischargeability than T3 (L≤50 mm and Smin≥75 mm$^2$), it is possible to maintain good toner dischargeability when the toner filling amount is made less than or equal to 0.547 [g/cm$^3$].

As for L, in consideration that the nozzle needs to have a length greater than or equal to 30 mm for ensuring sealing performance, it is possible to maintain good toner dischargeability when the toner filling amount is made less than or equal to 0.547 [g/cm$^3$] in the range in which 30 mm≤L≤50 mm and Smin≥75 mm$^2$.

From the experimental results of the first toner pack T1, the region in which the sectional area is greater than or equal to 25 mm$^2$ and less than or equal to 75 mm$^2$ may be included as long as the length of the flow channel is less than or equal to 1.5 mm.

[Mechanism of Change in Toner Dischargeability Depending on Toner Filling Amount]

Figure 15:
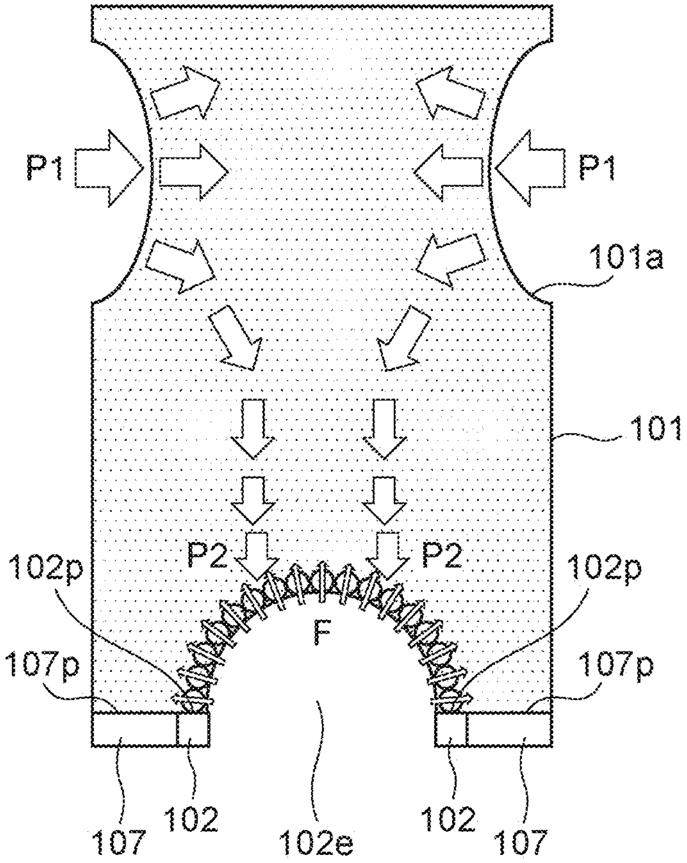
FIG. 15 is a view for illustrating a mechanism related to toner dischargeability.

A mechanism of change in toner dischargeability depending on a toner filling amount will be described with reference to FIG. 15. FIG. 15 is a conceptual diagram at the time when the user presses the side part 101*a* of the toner pack 100 with thumbs and fingers. The description will be made on the assumption that toner is uniformly disposed in any region in the containing portion 101 of the toner pack 100.

When the user presses the side part 101*a* of the containing portion 101 with a pressure P1, the pressure P1 attenuates from the pressure P1 and propagates to toner before the receiving port 102*e* of the nozzle 102 in the containing portion 101 as a lower pressure P2. With this pressure P2, toner just above the receiving port 102*e* moves from the containing portion 101 to the flow channel 102*k* via the receiving port 102*e*. However, toner blocked and stopped by the upper surface 102*p* of the nozzle 102 and the upper surface 107*p* of the coupling member 107 becomes a bridge-shaped state of balance straddling the receiving port 102*e* with a frictional force F between the particles of toner. Toner particles in the bridge-shaped state of balance are piled up in multiple layers.

At this time, in a case where the toner filling amount of the toner pack 100 is large, even when the state of balance of toner is intended to be collapsed with the pressure P2 propagated as a result of user's pressing of the containing portion 101, there is a small gap between particles of toner, and there is small room for the pressed toner particles to move, so toner is difficult to collapse. As a result, it is presumably difficult to move toner in a state of balance from the receiving port 102*e* to the flow channel 102*k* of the nozzle 102.

On the other hand, when the toner filling amount is small, there is room for toner pressed with the pressure P2 to move, so it is possible to move and collapse toner in a state of balance. As a result, it is presumably possible for toner to move from the receiving port 102*e* to the flow channel 102*k* of the nozzle 102.

In the present embodiment, toner a, toner b, and toner c, used in the experiments, all are non-magnetic monocomponent and have a specific gravity of 1.08 [g/cm$^3$]. The filling amount is the ratio (d/a) of the weight d [g] of toner filled to the volume a [cm$^3$] of the containing portion 101.

When the specific gravity varies depending on toner, the filling amount is desirably considered with a bulk density converted by specific gravity. For example, in the case of magnetic toner, the specific gravity is greater than that of non-magnetic monocomponent toner, and the filling amount can be considered with a value converted as follows. For example, in the case of the one having a specific gravity of 1.40 [g/cm$^3$], Filling amount 0.547 [g/cm$^3$]×1.40 [g/cm$^3$]/1.08 [g/cm$^3$]=0.709 [g/cm$^3$]. In this case, toner dischargeability is good when the filling amount is less than 0.709 [g/cm$^3$]. Dischargeability gets better when the filling amount is further reduced. Then, the filling amount is preferably less than or equal to 0.50 [g/cm$^3$] and more preferably less than or equal to 0.45 [g/cm$^3$]. On the other hand, when the filling amount is too small, there are concerns that, for example, the size of the containing portion 101 increases to fill a predetermined amount of toner or toner supply is needed multiple times because only a small amount of toner is filled. Then, the filling amount is preferably greater than or equal to 0.30 [g/cm$^3$] and more preferably greater than or equal to 0.35 [g/cm$^3$]. In other words, the filling amount is suitably set, for example, within the range greater than or equal to 0.30 [g/cm$^3$] and less than or equal to 0.50 [g/cm$^3$] and more suitably set within the range greater than or equal to 0.35 [g/cm$^3$] and less than or equal to 0.45 [g/cm$^3$]. With such a configuration, the user is able to smoothly discharge toner by pressing the containing portion 101 without taking time more than necessary.

Second Embodiment

The configuration of a second embodiment will be described. The configurations of an image forming apparatus and a mounting portion and toner packs used in experiments are the same as those of the first embodiment. Therefore, the present embodiment will be described with reference to FIGS. 6A to 6D, 9A to 9C, 11A to 11E, 12A to 12E, 13A to 13E, and 15 used in the description of the first embodiment.

[Toner Contained in Toner Pack]

Toner used in the image forming apparatus 1 of the present embodiment, that is, toner contained in the toner pack 100, will be described. In the toner of the present embodiment, in a volution powder flow tester for toner (described later), in measurement of Total Energy (hereinafter, referred to as TE) at the time when a propeller blade is entered to the surface of a powder layer of toner, manufactured by applying a vertical load of 88 kPa in a measurement container, while the propeller blade is being rotated at a peripheral speed of 100 mm/sec at the outermost edge of the propeller blade, TE is less than or equal to 300 mJ. A lower TE means that toner more easily loosens from a consolidation state, that is, the value indicates a consolidation degree of toner. As the consolidation degree of toner increases, a state of balance of toner where toner clogs in a narrow passage is more easily held. For example, when unevenness of toner surfaces formed by external additive easily engage among toner particles, the value of TE increases. TE can be controlled by the shape of toner and the type, amount, and coverage of external additive to be added. In the present embodiment, it is preferable to use toner with TE less than or equal to 300 mJ.

The content of silica particles (external additive) is preferably higher than or equal to 1.4 percent by mass. The content of silica particles is more preferably higher than or equal to 2.0 percent by mass. As the content of silica particles increases, TE is more easily reduced. When the amount of external additive is too large, fusing deteriorates or soiling of members of a printer deteriorates, so adjustment is necessary as needed.

The coverage of silica particles on toner particle surfaces is preferably higher than or equal to 34% and lower than or equal to 80%. The coverage is more preferably higher than or equal to 39% and lower than or equal to 75%. As the coverage increases, the consolidation degree of toner is suppressed, so TE is easily reduced. The coverage can be controlled by the type, amount, and external additive conditions of silica particles.

[Measurement Method for Toner Physical Properties]

Hereinafter, a method of measuring various physical properties of toner will be described.

<Manufacturing Method for TE of Toner>

In the present embodiment, TE is measured by using a volution powder flow tester including a rotary propeller blade (Powder Rheometer FT-4, produced by Freeman Technology; hereinafter, referred to as FT-4).

Specifically, measurement is performed through the following operations. In all the operations, 23.5 mm-diameter blade dedicated for FT-4 measurement is used as the propeller blade, and a rotation axis is present in a normal direction at the center of a 23.5 mm-by-6.5 mm blade plate. A material smoothly twisted in a counterclockwise direction such that both outermost edge parts (parts 12 mm from the rotation axis) are set at 70° and parts 6 mm distant from the rotation axis are set at 35° and made of SUS is used for the blade plate.

An FT-4 measurement-dedicated container [a split container with a diameter of 25 mm and a volume of 25 ml (model number: C4031), and a height from a container bottom to a split part is about 51 mm; hereinafter, also simply referred to as container] is used for a container to be used.

A compression test piston (diameter 24 mm, height 20 mm, mesh tensioned at the lower part) is used for compression of toner instead of the propeller blade.

The procedure of the measurement is as follows.

(1) Consolidation Operation of Sample 17.5 g of toner is added to the above-described FT-4 measurement-dedicated container (this is the mass for a specific gravity of 1.1, and the mass is adjusted such that the volume is a similar extent according to a specific gravity, for example, 23.9 g of toner is added for a specific gravity of 1.5). The FT-4 measurement-dedicated compression piston is attached, and consolidation is performed at 88 kPa for 30 seconds.

(2) Split Operation

Toner at the upper part of the toner layer is removed by levelling off the toner layer at the split part of the above-described FT-4 measurement-dedicated container to form a toner layer with the same volume (25 ml).

(3) Measurement Operation

In a rotation direction in a counterclockwise direction (a direction to push a toner powder layer by the rotation of the blade) with respect to toner powder, the peripheral speed of the blade (the peripheral speed at the outermost edge of the blade) to the surface of a toner powder layer is set to 100 mm/sec, the entrance speed in a vertical direction to the toner powder layer is set to a speed such that an angle formed between a locus drawn by the outermost edge of the blade during movement and a powder layer surface (hereinafter, "blade locus angle") becomes five (deg), and the sum total of rotating torque and vertical load, obtained when the propeller blade is caused to enter to a location 10 mm from the bottom surface of the toner powder layer, is defined as TE.

<Measurement Method for Content of Silica Particles>

A wavelength-dispersive X-ray fluorescence spectrometer "Axios" (produced by PANalytical) and dedicated software "SuperQ ver. 4.0F" (produced by PANalytical) attached for measurement condition setting and measurement data analysis are used. Rh is used as an anode of an X-ray tube, a measurement atmosphere is a vacuum, measurement diameter (collimator mask diameter) is 27 mm, and a measurement time is 10 seconds. A proportional counter (PC) is used for detection when a light element is measured, and a scintillation counter (SC) is used for detection when a heavy element is measured.

As for a measurement sample, a pellet molded into a thickness of 2 mm and a diameter of 39 mm by putting 4 g of toner into a dedicated pressing aluminum ring and flattening the toner and applying pressure at 20 MPa for 60 seconds with a tablet molding compressor "BRE-32" (produced by MAEKAWA TESTING MACHINE MFG. Co., Ltd.) is used.

0.5 parts of silica ($SiO_2$) fine powder is added to 100 parts of resin particles not containing silicon, and sufficiently blended by using a coffee mill. Similarly, 5.0 parts of silica fine powder and 10.0 parts of silica fine powder are respectively blended with resin particles, and these are used as samples for a calibration curve.

For each of the samples, a sample pellet for a calibration curve is manufactured as described above with the tablet molding compressor, and a counting rate (unit: cps) of Si-Kα line observed at a diffraction angle (2θ)=109.08° at the time when PET is used for dispersive crystal is measured. At this time, an acceleration voltage and a current value of an X-ray generator are respectively set to 24 kV and 100 mA. A linear function calibration curve is obtained with an ordinate axis representing the obtained counting rate of X-ray and an abscissa axis representing the additive amount of $SiO_2$ in each sample for calibration curve. Subsequently, toner to be analyzed is formed as a pellet as described above with the tablet molding compressor, and the counting rate of Si-Kα line is measured. Then, the value of the abscissa axis is read from the calibration curve, and the value is used as the content of silica particles.

<Measurement Method for Coverage with Silica Particles>

A backscattered electron image of the surface of a toner particle was acquired with a scanning electron microscope (SEM). The device and observation conditions of the SEM are as follows:

- Device used: ULTRA PLUS produced by Carl Zeiss Microscopy Co., Ltd.
- Acceleration voltage: 1.0 kV
- WD: 2.0 mm
- Aperture Size: 30.0 μm
- Detected signal: EsB (energy selective backscattered electron)
- EsB Grid: 800 V
- Visual magnification: 50,000 times
- Contrast: 63.0±5.0% (reference value)
- Brightness: 38.0±5.0% (reference value)
- Resolution: 1024×768
- Preprocessing: Toner particles are dispersed on carbon tape (vapor deposition is not performed).

The acceleration voltage and EsB Grid of the present embodiment are set so as to achieve the items, that is, acquiring the structural information of the outermost surfaces of toner particles, preventing a charge-up of an unevaporated sample, and selectively detecting high-energy backscattered electrons. An area around a vertex where the curvature of a toner particle is the smallest is selected for a watching field of view.

The coverage is acquired by analyzing the backscattered electron image of the surface of the toner particle, obtained with the above-described technique, with the image processing software Image J (developed by Wayne Rashand). Hereinafter, the procedure will be described.

Initially, the backscattered electron image to be analyzed is converted to an 8-bit image from Type in the Image menu. Subsequently, image noise is reduced by setting the Median diameter to 2.0 pixels from Filters in the Process menu. An image center is estimated while excluding an observation condition display section displayed below the backscattered electron image, and a 1.5 μm-square range is selected from the image center of the backscattered electron image with a rectangle tool (Rectangle Tool) in a toolbar.

Subsequently, from Adjust in the Image menu, Threshold is selected, and a binarized image of an area coated with an outer shell and a missing area not coated with the outer shell is obtained by clicking Apply.

Subsequently, a scale bar in the observation condition display section displayed at the lower part of the backscattered electron image is selected with a straight line tool (Straight Line) in the toolbar. In this state, when Set Scale in the Analyze menu is selected, a new window opens, and a pixel distance of a straight line selected in Distance in the Pixels field is entered. When the value (for example, 100) of the scale bar is entered in the Known Distance field of the window, the unit (for example, nm) of the scale bar is entered in Unit of the Measurement field, and scale setting completes when OK is clicked.

Subsequently, Histogram in the Analyze menu is selected, the numeric value of Count and the numeric value of Mode in the open window are read, and calculation is performed as follows.

$$\text{Coverage}=\text{Mode}/\text{Count}\times 100$$

The above procedure is performed on 20 fields of view for a toner particle to be evaluated, and an arithmetic mean of them is adopted as a final coverage.

<Measurement of Toner Particle Diameter>

The particle diameter of toner is measured as follows. With a precision particle size distribution measuring device "Coulter counter Multisizer 3" (registered trademark, produced by Beckman Coulter, Inc.) using a pore electrical resistance method and provided with 100 μm aperture tube and dedicated software "BECKMAN COULTER Multisizer 3 Version 3.51" (produced by Beckman Coulter, Inc.) attached for measurement condition setting and measurement data analysis, measurement is performed at 25000 effective measurement channels, measurement data is analyzed, and the particle diameter of toner is calculated.

A solution obtained by dissolving reagent sodium chloride into ion-exchanged water such that the concentration is about one percent by mass, for example, "ISOTON II" (produced by Beckman Coulter, Inc.) can be used as an electrolytic solution used for measurement.

Before measurement and analysis are performed, setting of the dedicated software is performed as follows.

On a "screen to change a standard measurement method (SOM)" of the dedicated software, the total count of a control mode is set to 50000 particles, the number of times of measurement is one, and Kd value is set to a value obtained by using a "standard particle 10.0 μm" (produced by Beckman Coulter, Inc.). A threshold and a noise level are automatically set by pushing a measurement button for threshold/noise level. Current is set to 1600 μA, Gain is set to two, and an electrolytic solution is set to ISOTON II, and a checkbox of Flush of Aperture Tube after measurement is marked.

On a "screen to set conversion from a pulse to a particle diameter" of the dedicated software, a bin interval is set to a logarithmic particle diameter, a particle diameter bin is set to a 256 particle diameter bin, and a particle diameter range is set to greater than or equal to 2 μm and less than or equal to 60 μm.

A specific measurement method is as follows.

(1) About 200 ml of the electrolytic solution is put in a glass 250 ml round-bottom beaker dedicated for Multisizer 3, the beaker is set in a sample stand, and agitation of a stirrer rod is performed at 24 rotations/second in a counter-clockwise direction. Then, with the "aperture tube flush" function of the dedicated software, soiling and bubbles in the aperture tube are removed.

(2) About 30 ml of the electrolytic solution is put in a glass 100 ml flat-bottom beaker, and about 0.3 ml of a diluent diluted with ion-exchanged water into three times in mass from "Contaminon N" (a pH7 aqueous solution containing 10 percent by mass of neutral detergent for washing precise measuring devices, made up of a nonionic surfactant, an anionic surfactant, and an organic builder, produced by Wako Pure Chemical Industries, Ltd.) is added as a dispersant into the electrolytic solution.

(3) A predetermined amount of ion-exchanged water is put in a liquid bath of an ultrasonic disperser "Ultrasonic Dispersion System Tetora150" (produced by NIKKAKI BIOS CO., LTD.) with built-in two oscillators having an oscillatory frequency of 50 kHz in a state where the phase is shifted by 180 degrees and an electrical output of 120 W, and about 2 ml of the Contaminon N is added into the liquid bath.

(4) The beaker of the above (2) is set to a beaker fixing hole of the ultrasonic disperser, and the ultrasonic disperser is actuated. Then, the height position of the beaker is adjusted such that a resonant state at the liquid level of the electrolytic solution in the beaker is maximum.

(5) In a state where ultrasonic waves are applied to the electrolytic solution in the beaker of the above (4), about 10 mg of toner or toner particles are added to the electrolytic solution little by little and dispersed. Then, ultrasonic wave dispersion is continued for additional 60 seconds. In ultrasonic wave dispersion, adjustment is performed as needed such that the water temperature in the liquid bath is higher than or equal to 10° C. and lower than or equal to 40° C.

(6) The electrolytic solution of the above (5) in which toner or toner particles are dispersed is dripped with a pipet into the round-bottom beaker of the above (1) set in the sample stand for adjustment such that a measurement concentration becomes about 5%. Then, measurement is performed until the number of measurement particles becomes 50000.

(7) Measurement data is analyzed with the dedicated software attached to the device to calculate a weight average particle diameter, and the weight average particle diameter is used as a toner particle diameter. "Average Diameter" on an analysis/volumetric statistic (arithmetic mean) screen when graph/percent by volume is set with the dedicated software is a weight average particle diameter.

(Toner a)

The TE of toner a was 180 mJ. This is the toner (polymerized toner) manufactured by a suspension polymerization method as follows.

<Example of Manufacturing of Toner Particles 1>

For 100 parts by mass of styrene monomer, 16.5 parts by mass of carbon black (Nipex 35) and 3.0 parts by mass of an aluminum compound of di-tertiary-butylsalicylic acid [BONTRON E88 (produced by Orient Chemical Industries Co., Ltd.)] were prepared. These were introduced into an attritor (produced by Mitsui Mining Company, Limited) and agitated at 200 rpm at 25° C. for 180 minutes by using zirconia beads with a radius of 1.25 mm (140 parts by mass) to prepare a masterbatch dispersion solution.

On the other hand, 450 parts by mass of 0.1M-$Na_3PO_4$ aqueous solution was put into 710 parts by mass of ion-exchanged water and warmed to 60° C., and then 67.7 parts by mass of 1.0M-$CaCl_2$ aqueous solution was gradually added to obtain an aqueous medium containing a calcium phosphate compound.

Masterbatch dispersion solution 40 parts by mass
Styrene 49.5 parts by mass
n-Butyl acrylate 16.5 parts by mass
Hydrocarbon wax 9 parts by mass (Fischer-Tropsch Wax, the peak temperature of maximum endothermic peak=78° C., Mw=750)
Saturated polyester resin 1 5.0 parts by mass The above material was warmed to 65° C. and uniformed, dissolved, and dispersed at 5,000 rpm with the T.K. Homomixer (produced by Tokushu Kika Kogyo Co., Ltd.). 7.1 parts by mass of 70% toluene solution of a polymerization initiator 1,1,3,3-tetramethylbutyl peroxy-2-ethylhexanoate was dissolved into the above materials to prepare a polymerizable monomer composition.

The polymerizable monomer composition was put into the aqueous medium and agitated at 12,000 rpm for 10 minutes with the T.K. Homomixer at a temperature of 65° C. in an $N_2$ atmosphere to granulate the polymerizable monomer composition. After that, the material was heated to a temperature of 67° C. while being agitated with a paddle agitator blade and, when a polymerization conversion rate of a polymerizable vinyl monomer reached 90%, 0.1 mol/liter of aqueous sodium hydroxide was added to adjust the pH of the aqueous dispersion medium to 9. Furthermore, the aqueous dispersion medium was heated to 80° C. at a temperature increase rate of 40° C./h and subjected to a reaction for four hours. After the polymerization reaction, the remaining monomer in toner particles was distilled away under reduced pressure. After the aqueous medium was cooled, the aqueous medium was added with hydrochloric acid to be adjusted to a pH of 1.4 and agitated for six hours to dissolve calcium phosphate salt. After the toner particles were filtered out and washed by water, the toner particles were dried for 48 hours at a temperature of 40° C. The obtained dried product was subjected to strict classification and removal of ultra fine powder and coarse powder at the same time with a multi-division classifier (Elbow-Jet Air Classifier produced by Nittetsu Mining Co., Ltd.) to obtain toner particles 1 with a weight average particle diameter (D4) of 6.5 μm and an average circularity of 0.981.

<Example of Manufacturing Metal Titanate Fine Particles>

Metatitanic acid obtained through a sulfuric acid method was subjected to deferrization and bleaching, then added with aqueous sodium hydroxide to be adjusted to a pH of 9.0, subjected to desulfurization, then neutralized by using hydrochloric acid to a pH of 5.8, and subjected to filtration and washing. The washed cake was added with water to obtain 1.85 mol/L of $TiO_2$ slurry and added with hydrochloric acid to be adjusted to a pH of 1.0, and then subjected to deflocculation.

1.88 mol of the metatitanic acid subjected to desulfurization and deflocculation was extracted as TiO2 and put into a 3 L reaction container. After the deflocculated metatitanic acid slurry was added with 2.16 mol of aqueous strontium chloride such that an Sr/Ti mol ratio was 1.15, the concentration of TiO2 was adjusted to 1.039 mol/L. Subsequently, the slurry was warmed to 90° C. while being agitated and blended, 45 minutes was put into adding 440 mL of 10 N mol/L aqueous sodium hydroxide, then agitation was continued at 95° C. for an hour, and the reaction was ended.

The reaction slurry was cooled to 50° C., added with hydrochloric acid until the pH became 5.0, and agitated for 20 minutes. The obtained precipitation was subjected to decantation washing, filtered and separated, and then dried for eight hours in a 120° C. atmosphere.

Subsequently, 300 g of the dried product was put into a dry particle composing machine (NOBILTA NOB-130, MADE BY Hosokawa Micron Corporation). The treatment was performed at a treatment temperature of 30° C. with a rotary treatment blade set at 90 m/sec for 10 minutes.

Furthermore, the dried product was added with hydrochloric acid to be adjusted to a pH of 0.1, and agitated for an hour. The obtained precipitation was subjected to decantation washing.

The slurry containing the precipitation was adjusted to 40° C. and added with hydrochloric acid to be adjusted to a pH of 2.5. Subsequently, the solid content was added with 4.6 percent by mass isobutyltrimethoxysilane and 4.6 percent by mass trifluoropropyl trimethoxysilane, agitated and blended for an hour, and agitated and held for 10 hours. The obtained material was added with 5N aqueous sodium hydroxide to be adjusted to a pH of 6.5, agitated for an hour, then filtered and washed, and the obtained cake was dried for eight hours in a 120° C. atmosphere to obtain metal titanate fine particles.

<Preparation of Toner a>

For 100 parts by mass of toner particles 1, 1.0 part by mass of RX300 (produced by Nippon Aerosil Co., Ltd.) that are silica fine particles and 0.2 parts by mass of metal titanate fine particles were blended in a dry condition for 12 minutes under the condition of 3600 rpm with a Henschel mixer FM10C (produced by Mitsui Mining Company, Limited) to obtain Toner B. The TE was 180 mJ. The content of silica particles (external additive) was 2.0 percent by mass. The coverage with silica particles was 48%.

(Toner b)

The TE of toner b was 200 mJ. This is the toner (polymerized toner) manufactured by an emulsion polymerization aggregation method as follows.

<Preparation of Binder Resin Particle Dispersion Solution>

89.5 parts of styrene, 9.2 parts of butyl acrylate, 1.3 parts of acrylic acid, and 3.2 parts of n-lauryl mercaptan were blended and dissolved. This solution was added with an aqueous solution obtained by blending 1.5 parts of NEOGEN RK (produced by Dai-ichi Kogyo Seiyaku Co., Ltd.) with 150 parts of ion-exchanged water and dispersed.

Furthermore, while the solution was being slowly agitated for 10 minutes, the solution was added with an aqueous solution obtained by blending 0.3 parts of potassium persulfate with 10 parts of ion-exchanged water.

After nitrogen substitution, the solution was subjected to emulsion polymerization at 70° C. for six hours. After completion of the polymerization, the reaction solution was cooled to room temperature and added with ion-exchanged water to obtain a binder resin particle dispersion solution with a solid content concentration of 12.5 percent by mass and a volume-based median diameter of 0.2 μm.

<Preparation of Release Agent Dispersion Solution>

100 parts of a release agent (behenyl behenate, melting point: 72.1° C.) and 15 parts of NEOGEN RK were blended with 385 parts of ion-exchanged water and dispersed for about an hour with a wet-type jet-mill JN100 (produced by JOKO CO., LTD.) to obtain a release agent dispersion solution. The solid content concentration of the release agent dispersion solution was 20 percent by mass.

<Preparation of Colorant Dispersion Solution>

100 parts of carbon black (Nipex 35) and 15 parts of NEOGEN RK were blended with 885 parts of ion-exchanged water and dispersed for about an hour with the wet-type jet-mill JN100 to obtain a colorant dispersion solution.

<Preparation of Toner Particles 2>

265 parts of binder resin particle dispersion solution, 10 parts of release agent dispersion solution, and 10 parts of colorant dispersion solution were put in a container and dispersed with a homogenizer (ULTRA-TURRAX T50 produced by IKA).

The temperature in the container was adjusted to 30° C. while the solution was being agitated, and added with 1 mol/L of aqueous sodium hydroxide to be adjusted to a pH of 8.0.

Ten minutes was put into adding an aqueous solution obtained by dissolving 0.25 parts of aluminum chloride in 10.0 parts of ion-exchanged water as a coagulant under agitation at 30° C. An increase in temperature was started after being left standing for three minutes, the temperature was increased to 50° C., and generation of aggregated particles was performed. At the time when the weight average particle diameter (D4) became 6.0 μm, particle growth was stopped by adding 0.90 parts of sodium chloride and 5.0 parts of NEOGEN RK.

1 mol/L of aqueous sodium hydroxide was added to adjust the pH to 9.0, and the temperature was increased to 95° C. to spheroidize aggregated particles. When the average circularity reached 0.980, a decrease in temperature was started to be cooled to 30° C. to obtain a toner-particle dispersion solution.

The obtained toner-particle dispersion solution was added with hydrochloric acid to be adjusted to a pH of 1.5 or lower, agitated and left standing for an hour, and then subjected to solid-liquid separation with a pressure filter to obtain toner cake.

The toner cake was reslurried with ion-exchanged water into a dispersion solution again and subjected to solid-liquid separation with the above-described filter. Reslurrying and solid-liquid separation were repeated until the electric conductivity of the filtrate became lower than or equal to 5.0 μS/cm, and then finally subjected solid-liquid separation to obtain toner cake.

The obtained toner cake was dried with a flash dryer Flash Jet Dryer (produced by SEISHIN ENTERPRISE Co., Ltd.). The drying conditions were set to a blowing temperature of 90° C. and a dryer outlet temperature of 40° C., and a toner cake supply speed was adjusted to a speed such that an outlet temperature does not deviate from 40° C. according to the moisture content of toner cake. Furthermore, fine and coarse particles were cut with the multi-division classifier using the Coanda effect to obtain toner particles 2. The weight average particle diameter (D4) of the toner particles 2 was 7.5 μm.

<Example of Manufacturing of Silica Fine Particles 1>

Primary particles of untreated dry silica with a number mean particle diameter of 18 nm were put into a reactor with an agitator, and heated to 200° C. in a fluidized state due to agitation.

The inside of the reactor was replaced with nitrogen gas, the reactor was hermetically sealed, 25 parts of dimethyl silicone oil (viscosity=100 mm$^2$/s) was sprayed to 100 parts of dry silica, and agitated for 30 minutes. After that, the material was increased to 250° C. in temperature while being agitated, the material was taken out after agitation for further two hours, and subjected to shredding to obtain silica fine particles 1. The degree of hydrophobicity of the silica fine particles 1 was 90 (percent by volume).

<Preparation of Toner b>

For the obtained toner particles 2 (100 parts), hydrotalcite (DHT-4A, 0.3 parts) and the silica fine particles 1 (1.2 parts) were externally added and blended with FM10C (produced by NIPPON COKE & ENGINEERING Co., Ltd.) to obtain toner b.

External additive conditions were such that the charge amount of toner particles: 2.0 kg, rotation speed: 66.6 s-1, and external addition time: 12 minutes. The TE was 200 mJ. The content of silica particles (external additive) was 2.2 percent by mass. The coverage with silica particles was 42%.

(Toner c)

The TE of toner c was 120 mJ. This is the toner (polymerized toner) manufactured by an emulsion polymerization aggregation method as follows.

<Preparation of Binder Resin Particle Dispersion Solution>

89.5 parts of styrene, 9.2 parts of butyl acrylate, 1.3 parts of acrylic acid, and 3.2 parts of n-lauryl mercaptan were blended and dissolved. This solution was added with an aqueous solution obtained by blending 1.5 parts of NEOGEN RK (produced by Dai-ichi Kogyo Seiyaku Co., Ltd.) and 3.0 parts of ethylene glycol surfactant with 150 parts of ion-exchanged water and dispersed.

Furthermore, while the solution was being slowly agitated for 10 minutes, the solution was added with an aqueous solution obtained by blending 0.3 parts of potassium persulfate with 10 parts of ion-exchanged water.

After nitrogen substitution, the solution was subjected to emulsion polymerization at 70° C. for six hours. After completion of the polymerization, the reaction solution was cooled to room temperature and added with ion-exchanged water to obtain a binder resin particle dispersion solution with a solid content concentration of 12.5 percent by mass and a volume-based median diameter of 0.2 μm.

<Preparation of Release Agent Dispersion Solution>

100 parts of release agent (hydrocarbon wax (Fischer-Tropsch wax, the peak temperature of maximum endothermic peak=78° C., Mw=750)) and 15 parts of NEOGEN RK were blended with 385 parts of ion-exchanged water, and dispersed for about an hour with a wet-type jet-mill JN100 (produced by JOKO CO., LTD.) to obtain a release agent dispersion solution. The solid content concentration of the release agent dispersion solution was 20 percent by mass.

<Preparation of Colorant Dispersion Solution>

100 parts of carbon black (Nipex 35) and 15 parts of NEOGEN RK were blended with 885 parts of ion-exchanged water and dispersed for about an hour with the wet-type jet-mill JN100 to obtain a colorant dispersion solution.

<Preparation of Toner Particles 3>

265 parts of binder resin particle dispersion solution, 10 parts of release agent dispersion solution, and 10 parts of colorant dispersion solution were put in a container and dispersed with a homogenizer (ULTRA-TURRAX T50 produced by IKA).

The temperature in the container was adjusted to 30° C. while the solution was being agitated, and added with 1 mol/L of aqueous sodium hydroxide to be adjusted to a pH of 8.0.

Ten minutes was put into adding an aqueous solution obtained by dissolving 0.25 parts of aluminum chloride in 10.0 parts of ion-exchanged water as a coagulant under agitation at 30° C. An increase in temperature was started after being left standing for three minutes, the temperature was increased to 50° C., and generation of aggregated particles was performed. At the time when the weight average particle diameter (D4) became 7.0 μm, particle growth was stopped by adding 0.90 parts of sodium chloride and 5.0 parts of NEOGEN RK.

1 mol/L of aqueous sodium hydroxide was added to adjust the pH to 9.0, and the temperature was increased to 95° C. to spheroidize aggregated particles. When the average circularity reached 0.960, a decrease in temperature was started to be cooled to 30° C. to obtain a toner-particle dispersion solution.

The obtained toner-particle dispersion solution was added with hydrochloric acid to be adjusted to a pH of 1.5 or lower, agitated and left standing for an hour, and then subjected to solid-liquid separation with a pressure filter to obtain toner cake.

The toner cake was reslurried with ion-exchanged water into a dispersion solution again and subjected to solid-liquid separation with the above-described filter. Reslurrying and solid-liquid separation were repeated until the electric conductivity of the filtrate became lower than or equal to 5.0 μS/cm, and then finally subjected solid-liquid separation to obtain toner cake.

The obtained toner cake was dried with a flash dryer Flash Jet Dryer (produced by SEISHIN ENTERPRISE Co., Ltd.). The drying conditions were set to a blowing temperature of 90° C. and a dryer outlet temperature of 40° C., and a toner cake supply speed was adjusted to a speed such that an outlet temperature does not deviate from 40° C. according to the moisture content of toner cake. Furthermore, fine and coarse particles were cut with the multi-division classifier using the Coanda effect to obtain toner particles 3. The particle diameter of the toner particles 3 was 7.5 μm.

<Preparation of Toner c>

For toner particles 3 (100 parts by mass), silica particles RX300 (produced by Nippon Aerosil Co., Ltd.) (1.5 parts by mass) were blended in a dry condition for 12 minutes under the condition of 3600 rpm with a Henschel mixer FM10C (produced by Mitsui Mining Company, Limited) to obtain toner c. The TE was 120 mJ. The content of silica particles (external additive) was 1.5 percent by mass. The coverage with silica particles was 43%.

(Toner d)

The TE of toner d was 300 mJ. This is the toner (ground toner) manufactured by a grinding method as follows.

<Preparation of Toner Particles 4>

Binder resin A: 80.0 parts (styrene acrylic resin of which the mass ratio of styrene and n-butyl acrylate is 78:22; Mw=180000, Tg=58° C.)

Binder resin B: 20.0 parts (styrene acrylic resin of which the mass ratio of styrene and n-butyl acrylate is 90:10; Mw=5300, Tg=58° C.)

Hydrocarbon wax (paraffin wax HNP-9 NIPPON SEIRO CO., LTD.): 5.0 parts 3,5-Di-tert-butylsalicylic acid aluminum compound: 0.5 parts Carbon black: 5.0 parts After the above materials were blended at a rotation speed of 20s-1 for a rotation time 5 min with a Henschel mixer (FM-75, produced by Mitsui Mining Company, Limited), the materials were kneaded (the number of times of kneading is two) with a biaxial kneader (PCM-30, produced by Ikegai Co., Ltd.) set to a temperature of 130° C. The obtained kneaded product was cooled to 25° C. and roughly ground to less than or equal to 1 mm with a hammer mill to obtain a roughly ground product. The obtained roughly ground product was finely ground with a mechanical grinder (T-250, produced by Turbo Kogyo Co., Ltd.). The finely ground product was classified with the multi-division classifier using the Coanda effect to obtain toner particles 4 with a particle diameter of 8.9 μm.

<Preparation of Toner d>

For toner particles 4 (100 parts by mass), silica particles RX300 (produced by Nippon Aerosil Co., Ltd.) (1.1 parts by mass) were blended in a dry condition for 12 minutes under the condition of 3600 rpm with a Henschel mixer FM10C (produced by Mitsui Mining Company, Limited) to obtain toner d. The TE was 300 mJ. The content of silica particles (external additive) was 1.1 percent by mass. The coverage with silica particles was 55%.

(Toner e)

The TE of toner e was 350 mJ. This is the toner (ground toner) manufactured by the same grinding method as toner d.

<Preparation of Toner Particles 5>

Toner particles 5 with a particle diameter of 9.6 μm were obtained with about the same creation means as the toner particles 4.

<Preparation of Toner e>

For toner particles 5 (100 parts by mass), silica particles RX300 (produced by Nippon Aerosil Co., Ltd.) (1.5 parts by mass) were blended in a dry condition for 12 minutes under the condition of 3600 rpm with a Henschel mixer FM10C (produced by Mitsui Mining Company, Limited) to obtain toner e. The TE was 300 mJ. The content of silica particles (external additive) was 1.5 percent by mass. The coverage with silica particles was 38%.

[Dischargeability of Toner]

To discharge toner in the containing portion 101 of the toner pack 100 of the present embodiment from the discharge port 102*a* of the nozzle 102 to outside the toner pack 100, the user needs to press the containing portion 101, as shown in FIG. 9C.

Incidentally, the toner pack 100 is desired to be compact in size in consideration of transport efficiency and space efficiency for displaying products. Then, in consideration of supply efficiency, the inside of the compact toner pack 100 is preferably filled with a large amount of toner. However, it has been understood that, if the filling amount of toner is too large for the toner containing volume of the toner pack 100, toner is difficult to be discharged from the toner pack even when the containing portion 101 is pressed and toner dischargeability significantly decreases.

It has been understood that toner dischargeability of the toner pack 100 varies depending on the filling amount of toner to the total volume of the toner pack 100, which is the sum of the volume of the containing portion 101 in which toner can be contained and the volume of the nozzle 102 in which toner can be contained, and the configuration of the nozzle for receiving toner from the containing portion 101 and discharging the toner. The relationship among these will be described with reference to FIGS. 6A to 6D, and 11A to 11E to 16.

Initially, the definition of toner dischargeability will be described. As described above, when the pack-side shutter 203 is in the open position and toner can be discharged from the discharge port 102*a*, the user performs discharge operation for discharging toner from the toner pack 100. The discharge operation described here is presumably, for example, as shown in FIG. 9C, facilitating discharge of toner from the toner pack 100 by, in a state where one side of the containing portion 101 is supported with four fingers other than a thumb, pressing the other side of the containing portion 101 with the thumb with a force of about 10 kgf to 15 kgf in the second direction Y (FIG. 6B) to compress the containing portion 101. At this time, the user repeatedly presses the containing portion 101 until discharge of toner completes on the assumption that operation to sequentially press the upper part, middle part, and lower part of the containing portion 101 of the toner pack 100 (FIGS. 9A, 9B, and 9C) in a posture mounted at the mounting portion 106 is defined as one set. At this time, it is assumed that toner dischargeability is better as time required to complete discharge of toner in the toner pack 100 shortens for the user. Here, it is determined that toner dischargeability is good (GOOD) when all the toner in the toner pack 100 can be discharged by discharge operation in 20 seconds; whereas it is determined that toner dischargeability is not good (NOT GOOD) when toner still remains in the toner pack after a lapse of 20 seconds. However, a small amount of toner remaining inside the containing portion 101 or adhering to the flow channel 102*k* of the nozzle 102 is not regarded as remaining toner.

Here, an experiment on toner dischargeability was carried out by using four toner packs (a toner pack 100, a toner pack 200, a toner pack 300, and a toner pack 400) respectively having different nozzles. The procedure of the experiment is as follows. A toner containing space V has a total volume [$cm^3$] of the toner pack, which is the sum of the inner volume of the containing portion and the inner volume of the nozzle in a state where the discharge port is shut.

(i) The toner containing space V is filled with 75.4 g of toner.

(ii) A filling amount per unit volume ([$g/cm^3$]) is adjusted by progressively decreasing air in the toner containing space V to deform the containing portion, to reduce (iii) the volume of the toner containing space V.

(iv) The volume of the toner containing space V is measured, discharge operation is performed on the toner pack that has reached a desired filling amount per unit volume, and toner dischargeability is determined.

To avoid clogging of toner in the nozzle 102 at the time of deaeration, deaeration is performed such that the nozzle of the toner pack is located on the upper side. Thus, it is possible to bring toner and air close to a uniformly mixed state without toner in the toner containing space V locally clogging the nozzle.

(First Toner Pack)

A discharge experiment was carried out by using the toner pack 200 as a first toner pack T1 filled with toner a. FIG. 11A is a perspective view of the toner pack 200. FIG. 11B is a front view of the toner pack 200. FIG. 11C is a sectional view taken along the line XIC-XIC in FIG. 11B. FIG. 11D is an enlarged view of an area around the nozzle of the toner pack 200 of FIG. 11C. FIG. 11E is a top view of a coupling member 207 and a nozzle 202 when viewed from a containing portion 201 side.

The configuration of the toner pack 200 will be described. The toner pack 200 includes the containing portion 201, the coupling member 207, and the nozzle 202.

The containing portion 201 has a side part 201*a*, a bottom part 201*b* (closed part), and an opening 201*c* defined by an inner peripheral surface 201*d*. The containing portion 201 has the same configuration as the containing portion 101 of the first embodiment.

As shown in FIG. 11D, the nozzle 202 has a receiving port 202*e* that has a square shape, 5 mm on a side (Area Se1=25 $mm^2$) and that is open in the direction of the central axis A (first direction X). The receiving port 202*e* is the shaded area of FIG. 11D. The receiving port 202*e* is a through-hole surrounded by an inner peripheral surface 202*n* and has a thickness t (a length in the direction of the central axis A of the inner peripheral surface 202*n*) of 1.5 mm. The thickness t can be ignored as the length of the flow channel of the nozzle 202 because the thickness is sufficiently small for the size of the receiving port 202*e*. The nozzle 202 further has an engaged surface 202*m* and an upper surface 202*p* (top surface). The engaged surface 202*m* is an outer peripheral surface of which the center coincides with the central axis A. The upper surface 202*p* extends in a direction (the second direction Y and the third direction Z) orthogonal to the central axis A (first direction X) and faces upward when the toner pack 200 is oriented in the above-described predetermined orientation.

The coupling member 207 is a member that couples the containing portion 201 to the nozzle 202 and has the same configuration as the coupling member 107 of the present embodiment. The coupling member 207 has an engagement surface 207*b*, a fixing surface 207*c* (a welding surface or a bonding surface), and an upper surface 207*p* (top surface). The engagement surface 207*b* is an inner peripheral surface of which the center coincides with the central axis A and engages with the engaged surface 202*m* of the nozzle 202. The fixing surface 207*c* is a surface fixed (welded or bonded) to the inner peripheral surface 201*d* of the containing portion 201. The upper surface 207*p* is connected to the engagement surface 207*b* and the fixing surface 207*c* and faces upward (toward the containing portion 201) when the toner pack 200 is oriented in the above-described predetermined orientation.

The upper surface 202*p* of the nozzle 202 and the upper surface 207*p* of the coupling member 207 are located at substantially the same level in a height direction and are surfaces extending in the second direction Y and the third direction Z orthogonal to the central axis A (first direction X). Therefore, the upper surface 202*p* and the upper surface 207*p* close part of the opening 201*c* of the containing portion 201.

The results of a discharge experiment carried out by using the above-described toner a with the toner pack 200 described above are shown below.

Toner filling amount 0.571 [g/$cm^3$]: Toner dischargeability is good (GOOD)

Toner filling amount 0.612 [g/$cm^3$]: Toner dischargeability is not good (NOT GOOD)

From the results, when the area S1 of the receiving port 202*e* of the nozzle 202 is greater than or equal to 25 $mm^2$ and the toner filling amount is less than or equal to 0.571 [g/$cm^3$], toner dischargeability is good. In other words, when the filling amount is greater than or equal to 0.612 [g/$cm^3$] and the area S1 of the receiving port is less than or equal to the area 25 $mm^2$, good toner dischargeability is not obtained even with any nozzle. In the flow channel, when the length falls within the range less than or equal to 1.5 mm, discharge may be performed even when a region in which a minimum sectional area is 25 $mm^2$ is included.

(Second Toner Pack)

A second toner pack T2 is exactly the same as the above-described toner pack 100, and only the parts not described above will be described with reference to FIGS. 6A to 6D. An area Se2 of the receiving port 102*e* of the nozzle 102 of the toner pack 100 is 594 $mm^2$. The receiving port 102*e* is the shaded area in FIG. 6D. An area So2 of the discharge port 102*a* shown in FIG. 6A is 217 $mm^2$. In other words, the area Se2 of the receiving port 102*e* is greater than the area So2 of the discharge port 102*a*. A length L102 (FIG. 6C) in the first direction X from the receiving port 102*e* to the lower end of the discharge port 102*a* is 43 mm. A minimum sectional area Smin2 of the flow channel 102*k* is the dashed line part of FIG. 6C and is 115 $mm^2$. The minimum sectional area Smin2 is a cross section passing through the upper end of the discharge port 102*a* and the first inclined surface 102*g*1.

The upward-facing upper surface 107*p* of the coupling member 107 and the upward-facing upper surface 102*p* of the nozzle 102 are located at the same level or substantially the same level and are surfaces extending in the second direction Y and the third direction Z orthogonal to the direction of the central axis A (first direction X). Therefore, the upper surface 107*p* and the upper surface 102*p* close part of the opening 101*c* of the containing portion 101.

The results of the discharge experiment carried out by using the toner pack 100 filled with toner a described above are shown below.

Toner filling amount 0.625 [g/$cm^3$]: Toner dischargeability is good (GOOD)

Toner filling amount 0.654 [g/$cm^3$]: Toner dischargeability is not good (NOT GOOD)

(Third Toner Pack)

The above-described discharge experiment was carried out by using the toner pack 300 as a third toner pack T3 filled with toner a and toner c. FIG. 12A is a perspective view of the toner pack 300. FIG. 12B is a front view of the toner pack 300. FIG. 12C is a sectional view taken along the line XIIC-XIIC in FIG. 12B. FIG. 12D is an enlarged sectional view of an area around the nozzle of the toner pack 300 of FIG. 12C. FIG. 12E is a top view of a coupling member 307 and a nozzle 302 when viewed from the containing portion 301 side.

The configuration of the toner pack 300 will be described. The toner pack 300 includes the containing portion 301, the coupling member 307, and the nozzle 302.

The containing portion 301 has a side part 301*a*, a bottom part 301*b* (closed part), and an opening 301*c* defined by an inner peripheral surface 301*d*. The containing portion 301 has the same configuration as the containing portion 101 of the present embodiment.

As shown in FIG. 12E, the nozzle 302 has a receiving port 302*e* that has a square shape, 8.66 mm on a side (Area Se3=75 $mm^2$) and that is open in the direction of the central axis A (first direction X). The receiving port 302*e* is the shaded area in FIG. 12E. As shown in FIG. 12D, the nozzle 302 has a discharge port 302*a* that is orthogonal to the first direction X and that is open at a side surface in the second direction Y. A sectional area So3 of the discharge port 302*a* is also 75 $mm^2$. The nozzle 302 has a flow channel 302*k* (passage) that connects the receiving port 302*e* with the discharge port 302*a* and through which toner passes. Toner in the containing portion 301 is discharged to outside the toner pack 300 via the receiving port 302*e*, the flow channel 302*k*, and the discharge port 302*a* of the nozzle 302. The sectional area of the flow channel 302*k* is 75 $mm^2$ in any region. In other words, the minimum sectional area of the flow channel 302*k* is 75 mm². A length L301 in the first direction X from the receiving port 302*e* to the lower end of the discharge port 302*a* is 50 mm.

As shown in FIGS. 12D and 12E, the nozzle 302 further has an engaged surface 302*m* and an upper surface 302*p* (top surface). The engaged surface 302*m* is an outer peripheral surface of which the center coincides with the central axis A. The upper surface 302*p* extends in a direction (the second direction Y and the third direction Z) orthogonal to the central axis A and faces upward when the toner pack 300 is oriented in the above-described predetermined orientation.

The coupling member 307 is a member that couples the containing portion 301 to the nozzle 302 and has the same configuration as the coupling member 107 of the present embodiment. The coupling member 307 has an engagement surface 307*b*, a fixing surface 307*c* (a welding surface or a bonding surface), and an upper surface 307*p* (top surface). The engagement surface 307*b* is an inner peripheral surface of which the center coincides with the central axis A and engages with the engaged surface 302*m* of the nozzle 302.

The fixing surface 307*c* is fixed (welded or bonded) to the inner peripheral surface 301*d* of the containing portion 301. The upper surface 302*p* is connected to the engagement surface 307*b* and the fixing surface 307*c* and faces upward (toward the containing portion 301) when the toner pack 300 is oriented in the above-described predetermined orientation.

The upper surface 302*p* of the nozzle 302 and the upper surface 307*p* of the coupling member 307 are located at the same level or substantially the same level and are surfaces extending in the second direction Y and the third direction Z orthogonal to the direction of the central axis A (first direction X). Therefore, the upper surface 302*p* and the upper surface 307*p* close part of the opening 301*c* of the containing portion 301.

The results of the above-described discharge experiment carried out by using the toner pack 300 filled with toner a are shown below.

Toner filling amount 0.559 [g/cm³]: Toner dischargeability is good (GOOD)

Toner filling amount 0.602 [g/cm³]: Toner dischargeability is not good (NOT GOOD)

The results of the above-described discharge experiment carried out by using the toner pack 300 filled with toner b are shown below.

Toner filling amount 0.547 [g/cm³]: Toner dischargeability is good (GOOD)

Toner filling amount 0.609 [g/cm³]: Toner dischargeability is not good (NOT GOOD)

The results of the above-described discharge experiment carried out by using the toner pack 300 filled with toner c are shown below.

Toner filling amount 0.555 [g/cm³]: Toner dischargeability is good (GOOD)

Toner filling amount 0.614 [g/cm³]: Toner dischargeability is not good (NOT GOOD)

The results of the above-described discharge experiment carried out by using the toner pack 300 filled with toner d are shown below.

Toner filling amount 0.555 [g/cm³]: Toner dischargeability is good (GOOD)

Toner filling amount 0.612 [g/cm³]: Toner dischargeability is not good (NOT GOOD)

The results of the above-described discharge experiment carried out by using the toner pack 300 filled with toner e are shown below.

Toner filling amount 0.533 [g/cm³]: Toner dischargeability is not good (NOT GOOD)

(Fourth Toner Pack)

The above-described discharge experiment was carried out by using the toner pack 400 as a fourth toner pack T4 filled with toner a. FIG. 13A is a perspective view of the toner pack 400. FIG. 13B is a front view of the toner pack 400. FIG. 13C is a sectional view taken along the line XIIIC-XIIIC in FIG. 13B. FIG. 13D is an enlarged sectional view of an area around the nozzle of the toner pack 300 of FIG. 13C. FIG. 13E is a top view of a coupling member 407 and a nozzle 402 when viewed from the containing portion 401 side.

The configuration of the toner pack 400 will be described. The toner pack 400 includes the containing portion 401, the coupling member 407, and the nozzle 402.

The containing portion 401 has a side part 401*a*, a bottom part 401*b* (closed part), and an opening 401*c* defined by an inner peripheral surface 401*d*. The containing portion 401 has the same configuration as the containing portion 101 of the present embodiment.

As shown in FIG. 13E, the nozzle 402 has a receiving port 402*e* that has a square shape, 20 mm on a side (Area Se4=400 mm²) and that is open in the direction of the central axis A (first direction X). The receiving port 402*e* is the shaded area in FIG. 13E.

As shown in FIG. 13D, the nozzle 402 has a discharge port 402*a* that is orthogonal to the first direction X and that is open at a side surface in the second direction Y. A sectional area So4 (FIG. 13A) of the discharge port 402*a* is also 400 mm². The nozzle 402 has a flow channel 402*k* (passage) that connects the receiving port 402*e* with the discharge port 402*a* and through which toner passes. Toner in the containing portion 401 is discharged to outside the toner pack 400 via the receiving port 402*e*, the flow channel 402*k*, and the discharge port 402*a* of the nozzle 402. The sectional area of the flow channel 402*k* is 400 mm² in any region. In other words, the minimum sectional area of the flow channel 402*k* is 400 mm². A length L401 (FIG. 13D) in the first direction X from the receiving port 402*e* to the lower end of the discharge port 402*a* is 30 mm.

The nozzle 402 further has an engaged surface 402*m* and an upper surface 402*p* (top surface). The engaged surface 402*m* is an outer peripheral surface of which the center coincides with the central axis A. The upper surface 402*p* extends in a direction orthogonal to the central axis A and faces upward when the toner pack 400 is oriented in the above-described predetermined orientation.

The coupling member 407 is a member that couples the containing portion 401 to the nozzle 402 and has the same configuration as the coupling member 107 of the present embodiment. The coupling member 407 has an engagement surface 407*b*, a fixing surface 407*c* (a welding surface or a bonding surface), and an upper surface 407*p* (top surface). The engagement surface 407*b* is an inner peripheral surface of which the center coincides with the central axis A and engages with the engaged surface 402*m* of the nozzle 402.

The fixing surface 402*c* is fixed (welded or bonded) to the inner peripheral surface 401*d* of the containing portion 401. The upper surface 407*p* is connected to the engagement surface 407*b* and the fixing surface 407*c* and faces upward (toward the containing portion 401) when the toner pack 400 is oriented in the above-described predetermined orientation.

The upper surface 402*p* of the nozzle 402 and the upper surface 407*p* of the coupling member 407 are located at the same level or substantially the same level and are surfaces extending in the second direction Y and the third direction Z orthogonal to the direction of the central axis A (first direction X). Therefore, the upper surface 402*p* and the upper surface 407*p* close part of the opening 401*c* of the containing portion 401.

The results of the above-described discharge experiment carried out by using the toner pack 400 filled with toner a are shown below.

Toner filling amount 0.674 [g/cm$^3$]: Toner dischargeability is good (GOOD)

Figure 16:
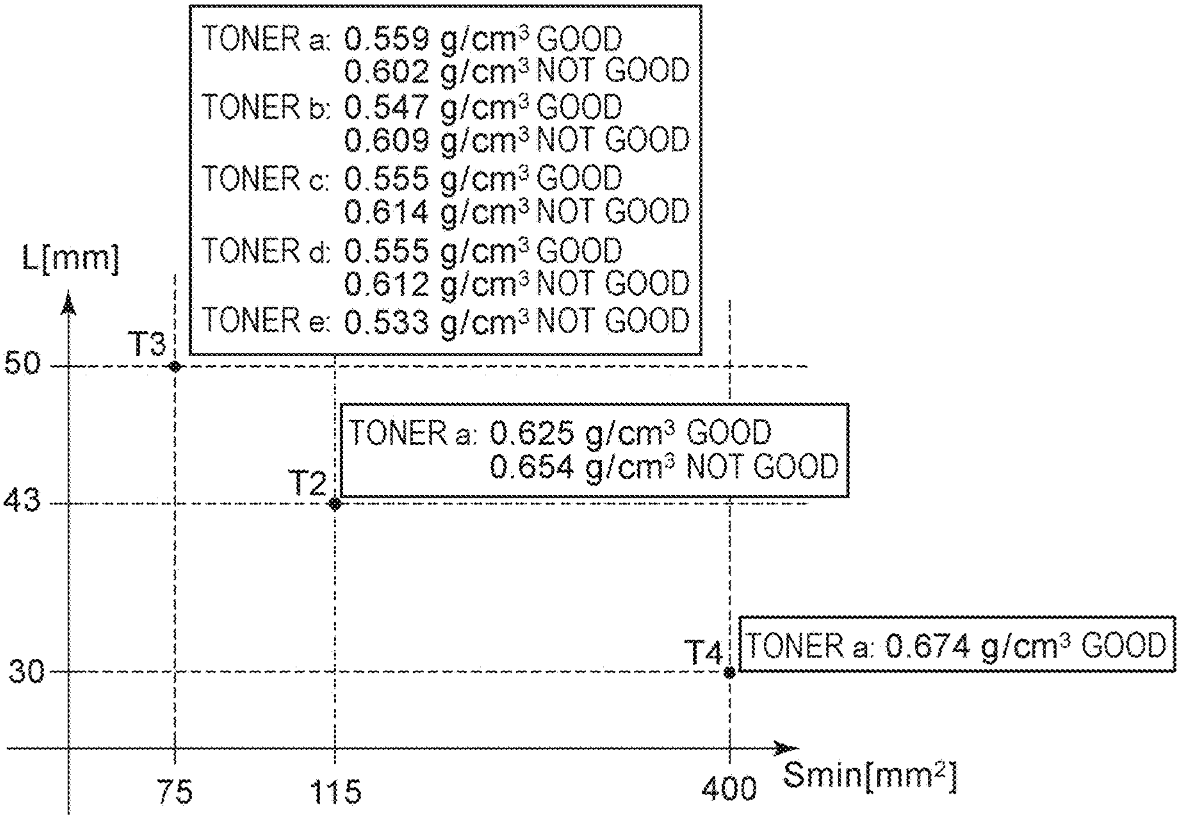
FIG. 16 is a graph that shows the results of a toner discharge experiment according to a second embodiment.

FIG. 16 shows the results of the toner dischargeability experiments of the second toner pack T2 (toner pack 100), the third toner pack T3 (toner pack 300), and the fourth toner pack T4 (toner pack 400), described above. The abscissa axis of the graph of FIG. 16 represents a minimum sectional area Smin in the flow channel of the nozzle, and the ordinate axis represents a length L in the first direction X from the receiving port to the lower end of the discharge port. L and Smin of each toner pack are as follows.

Second toner pack T2: Smin=115 mm$^2$, L=43 mm

Third toner pack T3: Smin=75 mm$^2$, L=50 mm

Fourth toner pack T4: Smin=400 mm$^2$, L=30 mm

When these are arranged in order of good toner dischargeability and descending order of the upper limit of toner filling amount in a case where toner a is used, the order is T4, T2, and T3. In other words, it is found that, as L reduces, and as Smin increases, good toner dischargeability can be maintained even when the toner filling amount is increased.

Secondly, it is found that, from the experiments using the third toner pack T3, there is almost no difference in toner dischargeability among toner c having a TE of 120 mJ, toner a having a TE of 180 mJ, toner b having a TE of 200 mJ, and toner d having a TE of 300 mJ. Furthermore, toner dischargeability was checked by using toner a and toner b at a toner filling amount of 0.35 [g/cm$^3$], there was almost no difference. Therefore, it is presumable that the influence of toner difference on toner dischargeability is small at least between 120 mJ and 300 mJ of the TE of toner.

From the above experimental results, in the graph of FIG. 16, among the toner packs T2, T3, T4 subjected to the experiments, T3 has the most disadvantageous configuration in relation to toner dischargeability; however, good toner dischargeability can be maintained when the toner filling amount is made less than or equal to 0.547 [g/cm$^3$] where the TE ranges from 120 mJ to 300 mJ (higher than or equal to 120 mJ and lower than or equal to 300 mJ). Because it is presumable that dischargeability is more advantageous as the TE decreases, good toner dischargeability can be maintained when the toner filling amount is made less than or equal to 0.547 [g/cm$^3$] by using polymerized toner or using toner with a TE lower than or equal to 300 mJ in the range in which it is more advantageous in toner dischargeability than T3 (L≤50 mm and Smin≥75 mm$^2$).

As for L, in consideration that the nozzle needs to have a length greater than or equal to 30 mm for ensuring sealing performance, it is possible to maintain good toner dischargeability when the toner filling amount is made less than or equal to 0.547 [g/cm$^3$] in the range in which 30 mm≤L≤50 mm (greater than or equal to 30 mm and less than or equal to 50 mm) and Smin≥75 mm$^2$.

In a case using toner a, the toner filling amount of the first toner pack T1 (toner pack 200) at which dischargeability is good is 0.571 [g/cm$^3$], and the toner filling amount of the third toner pack T3 (toner pack 300) at which dischargeability is good is 0.559 [g/cm$^3$]. Therefore, it is found that the first toner pack T1 is better in toner dischargeability than the third toner pack T3. It is presumable that the toner filling amount of the first toner pack T1 at which toner dischargeability is good in a case using toner b, toner c, or toner d is greater than the filling amount of the third toner pack T3 at which toner dischargeability is good in a case using a corresponding one of toners. The filling amount smallest among the filling amounts of the third toner pack T3 at which toner dischargeability is good in a case using these toners is 0.547 [g/cm$^3$] in a case using toner b. Therefore, when the toner filling amount of the first toner pack T1 is made less than or equal to 0.547 [g/cm$^3$], it is presumable that toner dischargeability is good even in a case where any one of toner a, toner b, toner c, and toner d of which the TEs are lower than or equal to 300 mJ. Similarly, when the toner filling amount of the first toner pack T1 is made less than or equal to 0.547 [g/cm$^3$], it is presumable that toner dischargeability is good even in a case where any one of toner a, toner b, and toner c that are polymerized toners.

From the experimental results of the first toner pack T1, the region in which the sectional area is greater than or equal to 25 mm$^2$ and less than or equal to 75 mm$^2$ as long as the length is less than or equal to 1.5 mm in the flow channel.

[Mechanism of Change in Toner Dischargeability Depending on Toner Filling Amount]

A mechanism of change in toner dischargeability depending on a toner filling amount will be described with reference to FIG. 15. FIG. 15 is a conceptual diagram at the time when the user presses the side part 101*a* of the toner pack 100 with thumbs and fingers. The description will be made on the assumption that toner is uniformly disposed in any region in the containing portion 101 of the toner pack 100.

When the user presses the side part 101*a* of the containing portion 101 with a pressure P1, the pressure P1 attenuates from the pressure P1 and propagates to toner before the receiving port 102*e* of the nozzle 102 in the containing portion 101 as a lower pressure P2. With this pressure P2, toner just above the receiving port 102*e* moves from the containing portion 101 to the flow channel 102*k* via the receiving port 102*e*. However, toner blocked and stopped by the upper surface 102*p* of the nozzle 102 and the upper surface 107*p* of the coupling member 107 becomes a bridge-shaped state of balance straddling the receiving port 102*e* with a frictional force F between the particles of toner. Toner particles in the bridge-shaped state of balance are piled up in multiple layers.

At this time, in a case where the toner filling amount of the toner pack 100 is large, even when the state of balance of toner is intended to be collapsed with the pressure P2 propagated as a result of user's pressing of the containing portion 101, there is a small gap between particles of toner, and there is small room for the pressed toner particles to move, so toner is difficult to collapse. As a result, it is presumably difficult to move toner in a state of balance from the receiving port 102*e* to the flow channel 102*k* of the nozzle 102.

On the other hand, when the toner filling amount is small, there is room for toner pressed with the pressure P2 to move, so it is possible to move and collapse toner in a state of balance. As a result, it is presumably possible for toner to move from the receiving port 102*e* to the flow channel 102*k* of the nozzle 102.

In the present embodiment, toner a, toner b, and toner c, used in the experiments, all are non-magnetic monocomponent and have a specific gravity of 1.08 [g/cm$^3$]. The filling amount is the ratio (d/a) of the weight d [g] of toner filled to the volume a [cm$^3$] of the containing portion 101.

When the specific gravity varies depending on toner, the filling amount is desirably considered with a bulk density converted by specific gravity. For example, in the case of magnetic toner, the specific gravity is greater than that of non-magnetic monocomponent toner, and the filling amount can be considered with a value converted as follows. For example, in the case of the one having a specific gravity of 1.40 [g/cm$^3$], Filling amount 0.547 [g/cm$^3$]×1.40 [g/cm$^3$]/1.08 [g/cm$^3$]=0.709 [g/cm$^3$]. In this case, toner dischargeability is good when the filling amount is less than 0.709 [g/cm$^3$]. Dischargeability gets better when the filling amount is further reduced. Then, the filling amount is preferably less than or equal to 0.50 [g/cm$^3$] and more preferably less than or equal to 0.45 [g/cm$^3$]. On the other hand, when the filling amount is too small, there are concerns that, for example, the size of the containing portion 101 increases to fill a predetermined amount of toner or toner supply is needed multiple times because only a small amount of toner is filled. Then, the filling amount is preferably greater than or equal to 0.30 [g/cm$^3$] and more preferably greater than or equal to 0.35 [g/cm$^3$]. In other words, the filling amount is suitably set, for example, within the range greater than or equal to 0.30 [g/cm$^3$] and less than or equal to 0.50 [g/cm$^3$] and more suitably set within the range greater than or equal to 0.35 [g/cm$^3$] and less than or equal to 0.45 [g/cm$^3$]. With such a configuration, the user is able to smoothly discharge toner by pressing the containing portion 101 without taking time more than necessary.

Configuration examples of the present embodiment are summarized as follows. The invention according to the present embodiment is not limited to the following configuration examples.

Configuration Example 1

A toner container filled with toner includes: a bag configured to contain the toner and having an opening; a discharge member provided to align with the bag in a first direction, the discharge member having a receiving port and a discharge port, the receiving port being configured to receive the toner in the bag via the opening, the discharge port being configured to discharge the toner, received from the receiving port, to outside the toner container; and a shutting member shutting the discharge port. The toner is a polymerized toner. The receiving port is provided on an inner side with respect to the opening in a second direction orthogonal to the first direction, the receiving port is open in the first direction, the receiving port has an area greater than or equal to 25 mm$^2$. The discharge member has a fixing portion to which the opening of the bag is fixed and a surface extending in a direction that intersects with the first direction between the fixing portion and the receiving port. A filling amount [g] of the toner to a total volume [cm$^3$] up to which the toner in the toner container is allowed to be contained is less than or equal to 0.547 [g/cm$^3$].

Configuration Example 2

A toner container filled with toner includes: a bag configured to contain the toner and having an opening; a discharge member provided to align with the bag in a first direction, the discharge member having a receiving port and a discharge port, the receiving port being configured to receive the toner in the bag via the opening, the discharge port being configured to discharge the toner, received from the receiving port, to outside the toner container; and a shutting member shutting the discharge port. The toner contains silica particles. In a volution powder flow tester, a value of Total Energy measured when a propeller blade is caused to enter a surface of a powder layer of the toner, prepared by applying a vertical load of 88 kPa in a measurement container, while the propeller blade is being rotated at a peripheral speed of 100 mm/sec at an outermost edge of the propeller blade is less than or equal to 300 mJ. The receiving port is provided on an inner side with respect to the opening in a second direction orthogonal to the first direction, the receiving port is open in the first direction, the receiving port has an area greater than or equal to 25 mm$^2$. The discharge member has a fixing portion to which the opening of the bag is fixed and a surface extending in a direction that intersects with the first direction between the fixing portion and the receiving port. A filling amount [g] of the toner to a total volume [cm$^3$] up to which the toner in the toner container is allowed to be contained is less than or equal to 0.547 [g/cm$^3$].

Configuration Example 3

In the toner container according to Configuration Example 1 or 2, the toner contained in the bag is configured to be discharged from the discharge port to outside the toner container in a manner such that the bag is pressed from outside the bag in a state where the shutting member is not shutting the discharge port.

Configuration Example 4

In the toner container according to any one of Configuration Examples 1 to 3, the bag has a part of which a width in a direction orthogonal to the first direction narrows toward the receiving port in the first direction.

Configuration Example 5

In the toner container according to any one of Configuration Examples 1 to 4, the discharge member has a passage for allowing the toner to pass through from the receiving port toward the discharge port, and, in a case where the toner container is oriented in a predetermined orientation in which the first direction is oriented in a gravitational direction and the discharge member is located below the bag, the discharge port is open in the second direction below the receiving port, a length in the first direction from the receiving port of the passage to a lower end of the discharge port is greater than or equal to 30 mm and less than or equal to 50 mm, a minimum sectional area of the passage is greater than or equal to 75 mm$^2$, and an area of the receiving port and an area of the discharge port each are greater than or equal to 75 mm$^2$.

Configuration Example 6

In the toner container according to Configuration Example 5, the bag has a part of which a width in the second direction narrows as approaching the receiving port in the first direction.

Configuration Example 7

In the toner container according to Configuration Example 5 or 6, the area of the receiving port is wider than the area of the discharge port.

Configuration Example 8

In the toner container according to any one of Configuration Examples 5 to 7, in a case where the toner container is oriented in the predetermined orientation, the passage has an inclined surface inclined in a direction to approach the discharge port toward a lower side.

Configuration Example 9

In the toner container according to any one of Configuration Examples 1 to 8, the bag is formed by pouching a sheet, and the discharge member is made of a resin.

Configuration Example 10

In the toner container according to Configuration Example 9, the sheet is a polypropylene sheet.

Configuration Example 11

In the toner container according to any one of Configuration Examples 1 to 10, an inner peripheral surface of the opening of the bag is welded to an outer peripheral surface serving as the fixing portion extending in the first direction of the discharge member.

Configuration Example 12

In the toner container according to any one of Configuration Examples 5 to 8, the discharge member includes a nozzle having the receiving port, the passage, the discharge port, and an engaged surface, and a coupling member having the fixing portion and an engagement surface that engages with the engaged surface of the nozzle, the coupling member coupling the bag to the nozzle.

Configuration Example 13

In the toner container according to any one of Configuration Examples 1 to 12, the shutting member is a shutter capable of rotating about a rotational axis between a shut position to shut the discharge port of the discharge member and an open position to open the discharge port, and the shutter is configured such that the rotational axis extends in the first direction.

Configuration Example 14

In the toner container according to Configuration Example 2, the toner is a ground toner.

Embodiments of the present invention are not limited to the above-described embodiments. Various changes or modifications are applicable without departing from the spirit and scope of the present invention. Therefore, the following claims are attached to show the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A toner container filled with toner, the toner container comprising:

a bag configured to contain the toner and having an opening;

a discharge member provided to align with the bag in a first direction, the discharge member having a receiving port, a discharge port, and a passage, the receiving port being configured to receive the toner in the bag through the opening of the bag, the discharge port being configured to discharge the toner, received from the receiving port, to outside the toner container, the passage allowing the toner to pass through from the receiving port toward the discharge port; and a shutting member shutting the discharge port, wherein the receiving port is provided on an inner side with respect to the opening of the bag in a second direction orthogonal to the first direction, the receiving port is open in the first direction, the receiving port has an area greater than or equal to 25 $mm^2$, wherein the discharge member has (i) a fixing portion to which the opening of the bag is fixed and (ii) a surface extending in a direction that intersects with the first direction between the fixing portion and the receiving port, wherein, in a case where the toner container is oriented in a predetermined orientation in which the first direction is oriented in a gravitational direction and the discharge member is located below the bag, the discharge port is provided below the receiving port and is open in the second direction, and wherein a filling amount [g] of the toner with respect to a total volume [$cm^3$] up to which the toner in the toner container is allowed to be contained is less than or equal to 0.547 [$g/cm^3$].

2. The toner container according to claim 1, wherein the toner contained in the bag is configured to be discharged from the discharge port to outside the toner container in a manner such that the bag is pressed from an outer side of the bag in a state where the shutting member is not shutting the discharge port.

3. The toner container according to claim 1, wherein the bag has a part of which a width in a direction orthogonal to the first direction narrows as approaching the receiving port in the first direction.

4. The toner container according to claim 1, wherein a length of the passage in the first direction from the receiving port to a lower end of the discharge port is greater than or equal to 30 mm and less than or equal to 50 mm, a minimum sectional area of the passage is greater than or equal to 75 $mm^2$, and an area of the receiving port and an area of the discharge port are each greater than or equal to 75 $mm^2$.

5. The toner container according to claim 4, wherein the bag has a part of which a width in the second direction narrows as approaching the receiving port in the first direction.

6. The toner container according to claim 4, wherein the area of the receiving port is greater than the area of the discharge port.

7. The toner container according to claim 4, wherein, in a case where the toner container is oriented in the predetermined orientation, the passage has an inclined surface inclined in a direction to approach the discharge port toward a lower side.

8. The toner container according to claim 1, wherein the bag is formed by sealing the edges of a sheet through thermocompression bonding, and the discharge member is made of a resin.

9. The toner container according to claim 8, wherein the sheet is a polypropylene sheet.

10. The toner container according to claim 1, wherein an inner peripheral surface of the opening of the bag is welded to an outer peripheral surface serving as the fixing portion extending in the first direction of the discharge member.

11. The toner container according to claim 4, wherein the discharge member includes a nozzle having the receiving port, the passage, the discharge port, and an engaged surface, and a coupling member having the fixing portion and an engagement surface that engages with the engaged surface of the nozzle, the coupling member coupling the bag to the nozzle.

12. The toner container according to claim 1, wherein the shutting member is a shutter capable of rotating about a rotational axis between a shut position to shut the discharge port of the discharge member and an open position to open the discharge port, and the shutter is configured such that the rotational axis extends in the first direction.

13. The toner container according to claim 1, wherein a cohesion degree of the toner is less than or equal to 63%.

* * * * *